US011861382B2

(12) United States Patent
Zheng et al.

(10) Patent No.: US 11,861,382 B2
(45) Date of Patent: Jan. 2, 2024

(54) APPLICATION STARTING METHOD AND APPARATUS, AND ELECTRONIC DEVICE

(71) Applicant: HUAWEI TECHNOLOGIES CO., LTD., Guangdong (CN)

(72) Inventors: Yanhua Zheng, Shanghai (CN); Zhihao Zhang, Shenzhen (CN); Jia Xu, Shenzhen (CN); Sheng Li, Shanghai (CN); Jingjing Dong, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/192,062

(22) Filed: Mar. 29, 2023

(65) Prior Publication Data

US 2023/0244508 A1 Aug. 3, 2023

Related U.S. Application Data

(63) Continuation of application No. PCT/CN2021/114811, filed on Aug. 26, 2021.

(30) Foreign Application Priority Data

Sep. 30, 2020 (CN) .......................... 202011066538.4

(51) Int. Cl.
*G06F 9/451* (2018.01)
*G06F 3/0483* (2013.01)

(52) U.S. Cl.
CPC ............ *G06F 9/451* (2018.02); *G06F 3/0483* (2013.01)

(58) Field of Classification Search
CPC ................................ G06F 9/451; G06F 3/0483
USPC .......................................................... 715/764
See application file for complete search history.

(56) References Cited

U.S. PATENT DOCUMENTS

| | | | |
|---|---|---|---|
| 9,720,981 B1* | 8/2017 | Boguraev | G06F 16/683 |
| 10,216,370 B2* | 2/2019 | Barrus | G06F 3/04842 |
| 10,498,854 B2* | 12/2019 | Porat | G06F 9/5061 |
| 10,579,599 B2* | 3/2020 | Nigam | G06F 8/65 |
| 11,126,444 B2* | 9/2021 | Deutch | G06F 3/0486 |
| 11,138,191 B1* | 10/2021 | De Boer | G06F 16/2465 |
| 11,269,808 B1* | 3/2022 | Yuan | G06F 16/164 |
| 11,314,761 B1* | 4/2022 | Yestrau | G06F 3/0482 |
| 11,567,785 B2* | 1/2023 | Faulkner | G06F 8/38 |
| 11,615,082 B1* | 3/2023 | Shrigondekar | H04L 43/16 |
| | | | 707/769 |

(Continued)

*Primary Examiner* — William D Titcomb
(74) *Attorney, Agent, or Firm* — WOMBLE BOND DICKINSON (US) LLP

(57) ABSTRACT

Embodiments of this application provide an application starting method and apparatus, and an electronic device. For any application that is installed in the electronic device and that supports multi-window display, based on configurations of an application layer and an application framework layer in a software system of the electronic device, the electronic device that supports a floating window and split-screen display may have a single-application multi-instance feature. In this way, the Dock triggers any application to start the multi-instance feature of the application, and the electronic device may simultaneously display a plurality of windows of the application on a display in a plurality of window combination forms, so that multi-instance coordination processing and operation may be performed on a same application.

20 Claims, 21 Drawing Sheets

(56) References Cited

U.S. PATENT DOCUMENTS

| | | | |
|---|---|---|---|
| 2005/0210412 A1* | 9/2005 | Matthews | G06F 9/451 |
| | | | 715/837 |
| 2013/0198692 A1* | 8/2013 | Lin | G06F 3/0481 |
| | | | 715/835 |
| 2015/0142728 A1* | 5/2015 | Nigam | G06F 16/23 |
| | | | 707/609 |
| 2017/0031532 A1* | 2/2017 | Vasudevan | G06F 9/44 |
| 2018/0046941 A1* | 2/2018 | Sule | G06N 20/00 |
| 2019/0121482 A1* | 4/2019 | Lee | G06F 3/0488 |
| 2020/0257435 A1* | 8/2020 | Bar-Yehuda | G06F 3/04883 |
| 2020/0264743 A1* | 8/2020 | Chi | G06F 9/451 |
| 2021/0160355 A1* | 5/2021 | Min | G06F 1/1683 |
| 2022/0045919 A1* | 2/2022 | Hardin | H04L 43/04 |
| 2022/0334715 A1* | 10/2022 | Cho | G06F 3/04817 |

\* cited by examiner

APPLICATION STARTING METHOD AND APPARATUS, AND ELECTRONIC DEVICE

CROSS-REFERENCE TO RELATED APPLICATIONS

This application is a continuation of International Application No. PCT/CN2021/114811, filed on Aug. 26, 2021, which claims priority to Chinese Patent Application No. 202011066538.4, filed on Sep. 30, 2020. The disclosures of the aforementioned applications are hereby incorporated by reference in their entireties.

TECHNICAL FIELD

Embodiments of this application relate to the field of electronic technologies, and in particular, to an application starting method and apparatus, and an electronic device.

BACKGROUND

With continuous development of large-screen technologies, a user spends an increasingly long time in learning and working by using an electronic device such as a mobile phone, a foldable screen, or a tablet computer. However, currently, the electronic device cannot run a same application in different windows. Consequently, use of the application is limited, and operating experience on a PC cannot be provided for a user, and a requirement of the user for efficiently processing a task cannot be met. In addition, even if the application is modified to implement the foregoing functions, a heavy workload is caused, and costs of R&D, maintenance, and the like of the application are increased.

SUMMARY

Embodiments of this application provide an application starting method and apparatus, and an electronic device, to run a same application by using a plurality of instances, so that a user can use the same application to a maximum extent, operating experience of the user on a PC is continued, and office efficiency and working efficiency are improved.

According to a first aspect, an embodiment of this application provides an application starting method, where the method is applied to an electronic device, the electronic device includes a first application, a second application, a first software module, a second software module, and a third software module, and the first application is different from the second application.

The method includes: the electronic device displays a first interface of the first application, where the first interface includes an icon of the second application; in response to receiving a first operation performed on the icon of the second application, the first application sends a first message to the first software module, and the first application sends a second message to the second software module; in response to receiving the first message, the first software module sends a third message to the first application, where the third message carries a first configuration item of the second application and a starting mode of a main entry activity of the second application; in response to receiving the second message, the second software module sends a fourth message to the first application, where the fourth message carries a task list, and the task list is used to store a task corresponding to an application in the electronic device; when determining that a task corresponding to a first instance of the second application exists in the task list, the first configuration item indicates that the second application supports a multi-instance feature, the second application supports starting of the multi-instance feature by using the main entry activity, and a starting mode of the main entry activity is a first mode, the first application sends a fifth message to the second software module, where the fifth message carries an identifier of the main entry activity and a first identifier, and the first identifier is used to request to establish a first task stack; in response to receiving the fifth message, the second software module establishes the first task stack based on the identifier of the main entry activity and the first identifier, where the first task stack is different from a task stack corresponding to the second application in the task list; the second software module sends a sixth message to the third software module, where the sixth message carries the identifier of the main entry activity and an identifier of the first task stack; and in response to receiving the sixth message, the third software module starts the main entry activity in the first task stack based on the identifier of the main entry activity and the identifier of the first task stack, to run a second instance of the second application.

According to the method provided in the first aspect, the multi-instance feature of the second application can be triggered by the first application, and one instance of the second application is started each time by using the main entry activity of the second application, so that the electronic device implements two or more instances of the second application, thereby improving speed and efficiency of running a same application by the electronic device, maximizing continuation of an operating habit of a user on a PC, improving office efficiency and working efficiency of the user, and bringing experience closer to that on a desktop-level operating system to the user.

In an embodiment, the method includes: the first application sends the fifth message to the second software module, where the fifth message carries the identifier of the main entry activity, the first identifier, and a first window mode, and the first window mode is related to a type of the first operation; in response to receiving the fifth message, the second software module establishes the first task stack based on the identifier of the main entry activity, the first identifier, and the first window mode; the second software module sends the sixth message to the third software module, where the sixth message carries the identifier of the main entry activity, the identifier of the first task stack, and the first window mode; and in response to receiving the sixth message, the third software module starts the main entry activity in the first task stack based on the identifier of the main entry activity, the identifier of the first task stack, and the first window mode, where a page display manner of the main entry activity is related to the first window mode.

In an embodiment, when the type of the first operation is a tap operation, the window mode is displaying a page in a window form; or when the type of the first operation is a drag operation, the window mode is displaying a page on a full screen or a split screen.

Therefore, manners in which the electronic device displays the second instance of the second application vary with different types of the first operation. In this way, the electronic device may simultaneously display a plurality of windows of the second application on the display in a plurality of window combination forms, so that multi-instance coordination processing and operation may be performed on a same application in the plurality of windows, thereby improving speed and efficiency of running a same application by the electronic device, maximizing continuation of an operating habit of a user on a PC, improving office efficiency and working efficiency of the user, and bringing experience closer to that on a desktop-level operating system to the user.

In an embodiment, when the first instance of the second application and the second instance of the second application are running in the electronic device, the method includes: the electronic device displays, in a first area of a display, a page corresponding to the first instance of the second application in a window form, and displays, in a second area of the display, a page corresponding to the second instance of the second application in a window form; or the electronic device displays, on a full screen, a page corresponding to the first instance of the second application, and displays, in a third area of the display, a page corresponding to the second instance of the second application in a window form; or the electronic device displays, in a fourth area of the display, a page corresponding to the first instance of the second application, and displays, in a fifth area of the display, a page corresponding to the second instance of the second application, where the fourth area and the fifth area do not overlap; or the electronic device displays, in a sixth area of the display, a page corresponding to the first instance of the second application, displays, in a seventh area of the display, a page corresponding to the second instance of the second application, and displays, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the electronic device displays, in a ninth area of the display, a page corresponding to the first instance of the second application, displays, in a tenth area of the display, a page corresponding to a third application, and displays, in an eleventh area of the display, a page corresponding to the second instance of the second application in a window form, where the ninth area and the tenth area do not overlap, and the third application is different from both the first application and the second application.

In this way, the electronic device may implement a plurality of instances of the second application in window combination forms such as "split screen+floating window", "full screen+floating window", "floating window+floating window", "left split screen+right split screen", and "left split screen+right split screen+floating window". This provides rich window forms for the user, and meets various use requirements of the user.

In an embodiment, when the electronic device displays the page corresponding to the second instance of the second application in the window form, the page includes a first control and a second control, and the first control is different from the second control; and the method further includes: when receiving a second operation performed on the first control, the electronic device displays, on a full screen in response to the second operation, the page corresponding to the second instance of the second application; and when receiving a third operation performed on the second control, the electronic device closes, in response to the third operation, the page corresponding to the second instance of the second application.

Therefore, when a page corresponding to any instance of the second application is displayed in a floating manner, based on a user's intention, the electronic device can not only quickly close the page corresponding to the any instance of the second application, but also switch to a full screen to display the page corresponding to the any instance of the second application.

In an embodiment, the first interface is located in a side area of the display. In this way, the first application can be quickly started, and the electronic device can easily implement a new instance of the second application from the first interface of the first application, without blocking page content currently displayed by the electronic device.

In an embodiment, the method further includes: when determining that the task corresponding to the first instance of the second application exists in the task list, and the first configuration item indicates that the second application does not support the multi-instance feature, the first application shields the first operation; or when determining that the task corresponding to the first instance of the second application exists in the task list, the first configuration item indicates that the second application supports the multi-instance feature, and the second application does not support starting of the multi-instance feature by using the main entry activity, the first application shields the first operation.

In an embodiment, the method further includes: when the task corresponding to the instance of the second application does not exist in the task list, the first application starts the second application.

In an embodiment, the first application is a sidebar application Dock, the second application is any application other than the sidebar application Dock, the first software module is a package manager, the second software module is an activity manager, the third software module is a multi-window task manager, the first mode is standard or singleTop, and the second mode is singleTask.

In an embodiment, the method further includes: the first software module sends a twelfth message to the second application, where the twelfth message is used to request a configuration file of the second application; and the second application sends a thirteenth message to the first software module, where the thirteenth message carries the first configuration item of the second application and the starting mode of the main entry activity of the second application. In this way, the first software module can obtain the configuration file of the second application in a timely manner.

According to a second aspect, an embodiment of this application provides an application starting method, where the method is applied to an electronic device, the electronic device includes a first application, a second application, a first software module, a second software module, and a third software module, and the first application is different from the second application.

The method includes: the electronic device displays a first interface of the first application, where the first interface includes an icon of the second application; in response to receiving a first operation performed on the icon of the second application, the first application sends a first message to the first software module, and the first application sends a second message to the second software module; in response to receiving the first message, the first software module sends a third message to the first application, where the third message carries a first configuration item of the second application and a starting mode of a main entry activity of the second application; in response to receiving the second message, the second software module sends a fourth message to the first application, where the fourth message carries a task list, and the task list is used to store a task corresponding to an application in the electronic device; when determining that a task corresponding to a first instance of the second application exists in the task list, the first configuration item indicates that the second application supports a multi-instance feature, the second application supports starting of the multi-instance feature by using the main entry activity, a starting mode of the main entry activity is a second mode, and the third message further carries an identifier of a first entry activity, the first application sends a seventh message to the second software module, where the seventh message carries the identifier of the first entry activity and a second identifier, the first mode is different from the second mode, the first entry activity is an entry activity other than the main entry activity, and the second identifier is used to request to establish a second task stack; in response to receiving the seventh message, the second software module establishes the second task stack based on the identifier of the first entry activity and the second identifier, where the second task stack is different from a task stack corresponding to the second application in the task list; the second software module sends an eighth message to the third software module, where the eighth message carries the identifier of the first entry activity and an identifier of the second task stack; and in response to receiving the eighth message, the third software module starts the first entry activity in the second task stack based on the identifier of the first entry activity and the identifier of the second task stack, to run a second instance of the second application.

According to the method provided in the second aspect, the multi-instance feature of the second application can be triggered by the first application, and one instance of the second application is started each time by using the first entry activity of the second application, so that the electronic device implements two or more instances of the second application, thereby improving speed and efficiency of running a same application by the electronic device, maximizing continuation of an operating habit of a user on a PC, improving office efficiency and working efficiency of the user, and bringing experience closer to that on a desktop-level operating system to the user.

In an embodiment, the method includes: the first application sends the seventh message to the second software module, where the seventh message carries the identifier of the first entry activity, the second identifier, and a second window mode, and the second window mode is related to a type of the first operation; in response to receiving the seventh message, the second software module establishes the second task stack based on the identifier of the first entry activity, the second identifier, and the second window mode; the second software module establishes the eighth message to the third software module, where the eighth message carries the identifier of the first ingress activity, an identifier of the second task stack, and the second window mode; and in response to receiving the eighth message, the third software module starts the first entry activity in the second task stack based on the identifier of the first entry activity, the identifier of the second task stack, and the second window mode, where a page display manner of the first entry activity is related to the second window mode.

In an embodiment, when the type of the first operation is a tap operation, the window mode is displaying a page in a window form; or when the type of the first operation is a drag operation, the window mode is displaying a page on a full screen or a split screen.

Therefore, manners in which the electronic device displays the second instance of the second application vary with different types of the first operation. In this way, the electronic device may simultaneously display a plurality of windows of the second application on the display in a plurality of window combination forms, so that multi-instance coordination processing and operation may be performed on a same application in the plurality of windows, thereby improving speed and efficiency of running a same application by the electronic device, maximizing continuation of an operating habit of a user on a PC, improving office efficiency and working efficiency of the user, and bringing experience closer to that on a desktop-level operating system to the user.

In an embodiment, when the first instance of the second application and the second instance of the second application are running in the electronic device, the method includes: the electronic device displays, in a first area of a display, a page corresponding to the first instance of the second application in a window form, and displays, in a second area of the display, a page corresponding to the second instance of the second application in a window form; or the electronic device displays, on a full screen, a page corresponding to the first instance of the second application, and displays, in a third area of the display, a page corresponding to the second instance of the second application in a window form; or the electronic device displays, in a fourth area of the display, a page corresponding to the first instance of the second application, and displays, in a fifth area of the display, a page corresponding to the second instance of the second application, where the fourth area and the fifth area do not overlap; or the electronic device displays, in a sixth area of the display, a page corresponding to the first instance of the second application, displays, in a seventh area of the display, a page corresponding to the second instance of the second application, and displays, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the electronic device displays, in a ninth area of the display, a page corresponding to the first instance of the second application, displays, in a tenth area of the display, a page corresponding to a third application, and displays, in an eleventh area of the display, a page corresponding to the second instance of the second application in a window form, where the ninth area and the tenth area do not overlap, and the third application is different from both the first application and the second application.

In this way, the electronic device may implement a plurality of instances of the second application in window combination forms such as "split screen+floating window", "full screen+floating window", "floating window+floating window", "left split screen+right split screen", and "left split screen+right split screen+floating window". This provides rich window forms for the user, and meets various use requirements of the user.

In an embodiment, when the electronic device displays the page corresponding to the second instance of the second application in the window form, the page includes a first control and a second control, and the first control is different from the second control; and the method further includes: when receiving a second operation performed on the first control, the electronic device displays, on a full screen in response to the second operation, the page corresponding to the second instance of the second application; and when receiving a third operation performed on the second control, the electronic device closes, in response to the third operation, the page corresponding to the second instance of the second application.

Therefore, when a page corresponding to any instance of the second application is displayed in a floating manner, based on a user's intention, the electronic device can not only quickly close the page corresponding to the any instance of the second application, but also switch to a full screen to display the page corresponding to the any instance of the second application.

In an embodiment, the first interface is located in a side area of the display. In this way, the first application can be quickly started, and the electronic device can easily implement a new instance of the second application from the first interface of the first application, without blocking page content currently displayed by the electronic device.

In an embodiment, the method further includes: when determining that the task corresponding to the first instance of the second application exists in the task list, and the first configuration item indicates that the second application does not support the multi-instance feature, the first application shields the first operation; or when determining that the task corresponding to the first instance of the second application exists in the task list, the first configuration item indicates that the second application supports the multi-instance feature, and the second application does not support starting of the multi-instance feature by using the main entry activity, the first application shields the first operation.

In an embodiment, the method further includes: when the task corresponding to the instance of the second application does not exist in the task list, the first application starts the second application.

In an embodiment, the first application is a sidebar application Dock, the second application is any application other than the sidebar application Dock, the first software module is a package manager, the second software module is an activity manager, the third software module is a multi-window task manager, the first mode is standard or singleTop, and the second mode is singleTask.

In an embodiment, the method further includes: the first software module sends a twelfth message to the second application, where the twelfth message is used to request a configuration file of the second application; and the second application sends a thirteenth message to the first software module, where the thirteenth message carries the first configuration item of the second application and the starting mode of the main entry activity of the second application. In this way, the first software module can obtain the configuration file of the second application in a timely manner.

According to a third aspect, an embodiment of this application provides an application starting method, where the method is applied to an electronic device, the electronic device includes a first application, a second application, a first software module, a second software module, and a third software module, and the first application is different from the second application.

The method includes: the electronic device displays a first interface of the first application, where the first interface includes an icon of the second application; in response to receiving a first operation performed on the icon of the second application, the first application sends a first message to the first software module, and the first application sends a second message to the second software module; in response to receiving the first message, the first software module sends a third message to the first application, where the third message carries a first configuration item of the second application and a starting mode of a main entry activity of the second application; in response to receiving the second message, the second software module sends a fourth message to the first application, where the fourth message carries a task list, and the task list is used to store a task corresponding to an application in the electronic device; when determining that a task corresponding to a first instance of the second application exists in the task list, the first configuration item indicates that the second application supports the multi-instance feature, the second application supports starting of the multi-instance feature by using the main entry activity, a starting mode of the main entry activity is a second mode, and the third message does not carry an identifier of the first entry activity, the first application sends a ninth message to the second application, where the ninth message carries a third identifier, the first mode is different from the second mode, the first entry activity is an entry activity other than the main entry activity, and the third identifier is used to request the second application to start a new instance of the second application; in response to receiving the ninth message, the second application sends a tenth message to the second software module, where the tenth message carries an identifier of a second entry activity and a fourth identifier, the second entry activity is any entry activity, and the fourth identifier is used to request to establish a third task stack; in response to receiving the tenth message, the second software module establishes the third task stack based on the identifier of the second entry activity and the fourth identifier, where the third task stack is different from a task stack corresponding to the second application in the task list; the second software module sends an eleventh message to the third software module, where the eleventh message carries the identifier of the second entry activity and an identifier of the third task stack; and in response to receiving the eleventh message, the third software module starts the second entry activity in the third task stack based on the identifier of the second entry activity and the identifier of the third task stack, to run a second instance of the second application.

According to the method provided in the second aspect, the multi-instance feature of the second application can be triggered by the first application, and one instance of the second application is started each time by using the second entry activity specified by the second application, so that the electronic device implements two or more instances of the second application, thereby improving speed and efficiency of running a same application by the electronic device, maximizing continuation of an operating habit of a user on a PC, improving office efficiency and working efficiency of the user, and bringing experience closer to that on a desktop-level operating system to the user.

In an embodiment, the method includes: the first application sends the ninth message to the second application, where the ninth message carries the third identifier and a third window mode, and the third window mode is related to a type of the first operation; in response to receiving the ninth message, the second application sends the tenth message to the second software module, where the tenth message carries the identifier of the second entry activity, the fourth identifier, and the third window mode; in response to receiving the tenth message, the second software module establishes the third task stack based on the identifier of the second entry activity, the fourth identifier, and the third window mode; the second software module sends the eleventh message to the third software module, where the eleventh message carries the identifier of the second entry activity, the identifier of the third task stack, and the third window mode; and in response to receiving the eleventh message, the third software module starts the second entry activity in the third task stack based on the identifier of the second entry activity, the identifier of the third task stack, and the third window mode, where a page display manner of the second entry activity is related to the third window mode.

When a quantity of task stacks is less than or equal to a maximum value, the second application may send the tenth message to the second software module. Generally, each time the second application sends the tenth message to the second software module, the second application performs recording once, so as to determine an accumulated quantity of times as the quantity of task stacks. The maximum value can be set according to an actual situation.

In an embodiment, when the type of the first operation is a tap operation, the window mode is displaying a page in a window form; or when the type of the first operation is a drag operation, the window mode is displaying a page on a full screen or a split screen.

Therefore, manners in which the electronic device displays the second instance of the second application vary with different types of the first operation. In this way, the electronic device may simultaneously display a plurality of windows of the second application on the display in a plurality of window combination forms, so that multi-instance coordination processing and operation may be performed on a same application in the plurality of windows, thereby improving speed and efficiency of running a same application by the electronic device, maximizing continuation of an operating habit of a user on a PC, improving office efficiency and working efficiency of the user, and bringing experience closer to that on a desktop-level operating system to the user.

In an embodiment, when the first instance of the second application and the second instance of the second application are running in the electronic device, the method includes: the electronic device displays, in a first area of a display, a page corresponding to the first instance of the second application in a window form, and displays, in a second area of the display, a page corresponding to the second instance of the second application in a window form; or the electronic device displays, on a full screen, a page corresponding to the first instance of the second application, and displays, in a third area of the display, a page corresponding to the second instance of the second application in a window form; or the electronic device displays, in a fourth area of the display, a page corresponding to the first instance of the second application, and displays, in a fifth area of the display, a page corresponding to the second instance of the second application, where the fourth area and the fifth area do not overlap; or the electronic device displays, in a sixth area of the display, a page corresponding to the first instance of the second application, displays, in a seventh area of the display, a page corresponding to the second instance of the second application, and displays, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the electronic device displays, in a ninth area of the display, a page corresponding to the first instance of the second application, displays, in a tenth area of the display, a page corresponding to a third application, and displays, in an eleventh area of the display, a page corresponding to the second instance of the second application in a window form, where the ninth area and the tenth area do not overlap, and the third application is different from both the first application and the second application.

In this way, the electronic device may implement a plurality of instances of the second application in window combination forms such as "split screen+floating window", "full screen+floating window", "floating window+floating window", "left split screen+right split screen", and "left split screen+right split screen+floating window". This provides rich window forms for the user, and meets various use requirements of the user.

In an embodiment, when the electronic device displays the page corresponding to the second instance of the second application in the window form, the page includes a first control and a second control, and the first control is different from the second control; and the method further includes: when receiving a second operation performed on the first control, the electronic device displays, on a full screen in response to the second operation, the page corresponding to the second instance of the second application; and when receiving a third operation performed on the second control, the electronic device closes, in response to the third operation, the page corresponding to the second instance of the second application.

Therefore, when a page corresponding to any instance of the second application is displayed in a floating manner, based on a user's intention, the electronic device can not only quickly close the page corresponding to the any instance of the second application, but also switch to a full screen to display the page corresponding to the any instance of the second application.

In an embodiment, the first interface is located in a side area of the display. In this way, the first application can be quickly started, and the electronic device can easily implement a new instance of the second application from the first interface of the first application, without blocking page content currently displayed by the electronic device.

In an embodiment, the method further includes: when determining that the task corresponding to the first instance of the second application exists in the task list, and the first configuration item indicates that the second application does not support the multi-instance feature, the first application shields the first operation; or when determining that the task corresponding to the first instance of the second application exists in the task list, the first configuration item indicates that the second application supports the multi-instance feature, and the second application does not support starting of the multi-instance feature by using the main entry activity, the first application shields the first operation.

In an embodiment, the method further includes: when the task corresponding to the instance of the second application does not exist in the task list, the first application starts the second application.

In an embodiment, the first application is a sidebar application Dock, the second application is any application other than the sidebar application Dock, the first software module is a package manager, the second software module is an activity manager, the third software module is a multi-window task manager, the first mode is standard or singleTop, and the second mode is singleTask.

In an embodiment, the method further includes: the first software module sends a twelfth message to the second application, where the twelfth message is used to request a configuration file of the second application; and the second application sends a thirteenth message to the first software module, where the thirteenth message carries the first configuration item of the second application and the starting mode of the main entry activity of the second application. In this way, the first software module can obtain the configuration file of the second application in a timely manner.

According to a fourth aspect, an embodiment of this application provides an application starting apparatus, including: a display module, configured to display a first interface of a first application, where the first interface includes an icon of a second application, and the first application is different from the second application; the first application, configured to: in response to receiving a first operation performed on an icon of the second application, send a first message to a first software module, and send a second message to a second software module; the first software module, configured to: in response to receiving the first message, send a third message to the first application, where the third message carries a first configuration item of the second application and a starting mode of a main entry activity of the second application; the second software module, configured to: in response to receiving the second message, send a fourth message to the first application, where the fourth message carries a task list, and the task list is used to store a task corresponding to an application in the electronic device; the first application, configured to: when determining that a task corresponding to a first instance of the second application exists in the task list, the first configuration item indicates that the second application supports a multi-instance feature, the second application supports starting of the multi-instance feature by using the main entry activity, and a starting mode of the main entry activity is a first mode, send a fifth message to the second software module, where the fifth message carries an identifier of the main entry activity and a first identifier, and the first identifier is used to request to establish a first task stack; the second software module, further configured to: in response to receiving the fifth message, establish the first task stack based on the identifier of the main entry activity and the first identifier, where the first task stack is different from a task stack corresponding to the second application in the task list; the second software module, further configured to send a sixth message to a third software module, where the sixth message carries the identifier of the main entry activity and an identifier of the first task stack; and the third software module, further configured to: in response to receiving the sixth message, start the main entry activity in the first task stack based on the identifier of the main entry activity and the identifier of the first task stack, to run a second instance of the second application.

In an embodiment, the first application is configured to send the fifth message to the second software module, where the fifth message carries the identifier of the main entry activity, the first identifier, and a first window mode, and the first window mode is related to a type of the first operation; the second software module is configured to: in response to receiving the fifth message, establish the first task stack based on the identifier of the main entry activity, the first identifier, and the first window mode; the second software module is configured to send the sixth message to the third software module, where the sixth message carries the identifier of the main entry activity, the identifier of the first task stack, and the first window mode; and the third software module is configured to: in response to receiving the sixth message, start the main entry activity in the first task stack based on the identifier of the main entry activity, the identifier of the first task stack, and the first window mode, where a page display manner of the main entry activity is related to the first window mode.

In an embodiment, when the type of the first operation is a tap operation, the window mode is displaying a page in a window form; or when the type of the first operation is a drag operation, the window mode is displaying a page on a full screen or a split screen.

In an embodiment, when the first instance of the second application and the second instance of the second application are run in the electronic device, the display module is configured to: display, in a first area of a display, a page corresponding to the first instance of the second application in a window form, and display, in a second area of the display, a page corresponding to the second instance of the second application in a window form; or the display module is configured to: display, on a full screen, a page corresponding to the first instance of the second application, and display, in a third area of the display, a page corresponding to the second instance of the second application in a window form; or the display module is configured to: display, in a fourth area of the display, a page corresponding to the first instance of the second application, and display, in a fifth area of the display, a page corresponding to the second instance of the second application, where the fourth area and the fifth area do not overlap; or the display module is configured to: display, in a sixth area of the display, a page corresponding to the first instance of the second application, display, in a seventh area of the display, a page corresponding to the second instance of the second application, and display, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the display module is configured to: display, in a ninth area of the display, a page corresponding to the first instance of the second application, display, in a tenth area of the display, a page corresponding to a third application, and display, in an eleventh area of the display, a page corresponding to the second instance of the second application in a window form, where the ninth area and the tenth area do not overlap, and the third application is different from both the first application and the second application.

In an embodiment, when the display apparatus displays the page corresponding to the second instance of the second application in the window form, the page includes a first control and a second control, and the first control is different from the second control; the display apparatus is further configured to: when receiving a second operation performed on the first control, display, on a full screen in response to the second operation, the page corresponding to the second instance of the second application; and the display apparatus is further configured to: when receiving a third operation performed on the second control, close, in response to the third operation, the page corresponding to the second instance of the second application.

In an embodiment, the first interface is located in a side area of the display.

In an embodiment, the first application is further configured to: when determining that the task corresponding to the first instance of the second application exists in the task list, and the first configuration item indicates that the second application does not support the multi-instance feature, shield the first operation; or the first application is further configured to: when determining that the task corresponding to the first instance of the second application exists in the task list, the first configuration item indicates that the second application supports the multi-instance feature, and the second application does not support starting of the multi-instance feature by using the main entry activity, shield the first operation.

In an embodiment, the first application is further configured to: when the task corresponding to the instance of the second application does not exist in the task list, start the second application.

In an embodiment, the first application is a sidebar application Dock, the second application is any application other than the sidebar application Dock, the first software module is a package manager, the second software module is an activity manager, the third software module is a multi-window task manager, the first mode is standard or singleTop, and the second mode is singleTask.

In an embodiment, the first software module is further configured to send a twelfth message to the second application, where the twelfth message is used to request a configuration file of the second application; and the second application is further configured to: in response to receiving the twelfth message, send a thirteenth message to the first software module, where the thirteenth message carries the first configuration item of the second application and the starting mode of the main entry activity of the second application.

For beneficial effects of the application starting apparatus provided in the fourth aspect and an embodiment of the fourth aspect, refer to beneficial effects brought by the first aspect and an embodiment of the first aspect. Details are not described herein again.

According to a fifth aspect, an embodiment of this application provides an application starting apparatus, including: a display apparatus, configured to display a first interface of a first application, where the first interface includes an icon of a second application, and the first application is different from the second application; the first application, configured to: in response to receiving a first operation performed on an icon of the second application, send a first message to a first software module, and send a second message to a second software module; the first software module, configured to: in response to receiving the first message, send a third message to the first application, where the third message carries a first configuration item of the second application and a starting mode of a main entry activity of the second application; the second software module, configured to: in response to receiving the second message, send a fourth message to the first application, where the fourth message carries a task list, and the task list is used to store a task corresponding to an application in the electronic device; the first application, further configured to: when determining that a task corresponding to a first instance of the second application exists in the task list, the first configuration item indicates that the second application supports a multi-instance feature, the second application supports starting of the multi-instance feature by using the main entry activity, a starting mode of the main entry activity is a second mode, and the third message further carries an identifier of a first entry activity, send a seventh message to the second software module, where the seventh message carries the identifier of the first entry activity and a second identifier, the first mode is different from the second mode, the first entry activity is an entry activity other than the main entry activity, and the second identifier is used to request to establish a second task stack; the second software module, further configured to: in response to receiving the seventh message, establish the second task stack based on the identifier of the first entry activity and the second identifier, where the second task stack is different from a task stack corresponding to the second application in the task list; the second software module, further configured to send an eighth message to the third software module, where the eighth message carries the identifier of the first entry activity and an identifier of the second task stack; and the third software module, further configured to: in response to receiving the eighth message, start the first entry activity in the second task stack based on the identifier of the first entry activity and the identifier of the second task stack, to run a second instance of the second application.

In an embodiment, the first application is configured to send the seventh message to the second software module, where the seventh message carries the identifier of the first entry activity, the second identifier, and a second window mode, and the second window mode is related to a type of the first operation; the second software module is configured to: in response to receiving the seventh message, establish the second task stack based on the identifier of the first entry activity, the second identifier, and the second window mode; the second software module is configured to send the eighth message to the third software module, where the eighth message carries the identifier of the first ingress activity, an identifier of the second task stack, and the second window mode; and the third software module is configured to: in response to receiving the eighth message, start the first entry activity in the second task stack based on the identifier of the first entry activity, the identifier of the second task stack, and the second window mode, where a page display manner of the first entry activity is related to the second window mode.

In an embodiment, when the type of the first operation is a tap operation, the window mode is displaying a page in a window form; or when the type of the first operation is a drag operation, the window mode is displaying a page on a full screen or a split screen.

In an embodiment, when the first instance of the second application and the second instance of the second application are run in the electronic device, the display module is configured to: display, in a first area of a display, a page corresponding to the first instance of the second application in a window form, and display, in a second area of the display, a page corresponding to the second instance of the second application in a window form; or the display module is configured to: display, on a full screen, a page corresponding to the first instance of the second application, and display, in a third area of the display, a page corresponding to the second instance of the second application in a window form; or the display module is configured to: display, in a fourth area of the display, a page corresponding to the first instance of the second application, and display, in a fifth area of the display, a page corresponding to the second instance of the second application, where the fourth area and the fifth area do not overlap; or the display module is configured to: display, in a sixth area of the display, a page corresponding to the first instance of the second application, display, in a seventh area of the display, a page corresponding to the second instance of the second application, and display, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the display module is configured to: display, in a ninth area of the display, a page corresponding to the first instance of the second application, display, in a tenth area of the display, a page corresponding to a third application, and display, in an eleventh area of the display, a page corresponding to the second instance of the second application in a window form, where the ninth area and the tenth area do not overlap, and the third application is different from both the first application and the second application.

In an embodiment, when the display apparatus displays the page corresponding to the second instance of the second application in the window form, the page includes a first control and a second control, and the first control is different from the second control; the display apparatus is further configured to: when receiving a second operation performed on the first control, display, on a full screen in response to the second operation, the page corresponding to the second instance of the second application; and the display apparatus is further configured to: when receiving a third operation performed on the second control, close, in response to the third operation, the page corresponding to the second instance of the second application.

In an embodiment, the first interface is located in a side area of the display.

In an embodiment, the first application is further configured to: when determining that the task corresponding to the first instance of the second application exists in the task list, and the first configuration item indicates that the second application does not support the multi-instance feature, shield the first operation; or the first application is further configured to: when determining that the task corresponding to the first instance of the second application exists in the task list, the first configuration item indicates that the second application supports the multi-instance feature, and the second application does not support starting of the multi-instance feature by using the main entry activity, shield the first operation.

In an embodiment, the first application is further configured to: when the task corresponding to the instance of the second application does not exist in the task list, start the second application.

In an embodiment, the first application is a sidebar application Dock, the second application is any application other than the sidebar application Dock, the first software module is a package manager, the second software module is an activity manager, the third software module is a multi-window task manager, the first mode is standard or singleTop, and the second mode is singleTask.

In an embodiment, the first software module is further configured to send a twelfth message to the second application, where the twelfth message is used to request a configuration file of the second application; and the second application is further configured to: in response to receiving the twelfth message, send a thirteenth message to the first software module, where the thirteenth message carries the first configuration item of the second application and the starting mode of the main entry activity of the second application.

For beneficial effects of the application starting apparatus provided in the fifth aspect and an embodiment of the fifth aspect, refer to beneficial effects brought by the second aspect and an embodiment of the second aspect. Details are not described herein again.

According to a sixth aspect, an embodiment of this application provides an application starting apparatus, including: a display apparatus, configured to display a first interface of a first application, where the first interface includes an icon of a second application, and the first application is different from the second application; the first application, configured to: in response to receiving a first operation performed on an icon of the second application, send a first message to a first software module, and send a second message to a second software module; the first software module, configured to: in response to receiving the first message, send a third message to the first application, where the third message carries a first configuration item of the second application and a starting mode of a main entry activity of the second application; the second software module, configured to: in response to receiving the second message, send a fourth message to the first application, where the fourth message carries a task list, and the task list is used to store a task corresponding to an application in the electronic device; the first application, further configured to: when determining that a task corresponding to a first instance of the second application exists in the task list, the first configuration item indicates that the second application supports the multi-instance feature, the second application supports starting of the multi-instance feature by using the main entry activity, a starting mode of the main entry activity is a second mode, and the third message does not carry an identifier of the first entry activity, send a ninth message to the second application, where the ninth message carries a third identifier, the first mode is different from the second mode, the first entry activity is an entry activity other than the main entry activity, and the third identifier is used to request the second application to start a new instance of the second application; the second application, configured to: in response to receiving the ninth message, send a tenth message to the second software module, where the tenth message carries an identifier of a second entry activity and a fourth identifier, the second entry activity is any entry activity, and the fourth identifier is used to request to establish a third task stack; the second software module, further configured to: in response to receiving the tenth message, establish the third task stack based on the identifier of the second entry activity and the fourth identifier, where the third task stack is different from a task stack corresponding to the second application in the task list; the second software module, further configured to send an eleventh message to the third software module, where the eleventh message carries the identifier of the second entry activity and an identifier of the third task stack; and the third software module, configured to: in response to receiving the eleventh message, start the second entry activity in the third task stack based on the identifier of the second entry activity and the identifier of the third task stack, to run a second instance of the second application.

In an embodiment, the first application is configured to send the ninth message to the second application, where the ninth message carries the third identifier and a third window mode, and the third window mode is related to a type of the first operation; the second application is configured to: in response to receiving the ninth message, send the tenth message to the second software module, where the tenth message carries the identifier of the second entry activity, the fourth identifier, and the third window mode; the second software module is configured to: in response to receiving the tenth message, establish the third task stack based on the identifier of the second entry activity, the fourth identifier, and the third window mode; the second software module is configured to send the eleventh message to the third software module, where the eleventh message carries the identifier of the second entry activity, the identifier of the third task stack, and the third window mode; and the third software module is configured to: in response to receiving the eleventh message, start the second entry activity in the third task stack based on the identifier of the second entry activity, the identifier of the third task stack, and the third window mode, where a page display manner of the second entry activity is related to the third window mode.

In an embodiment, when the type of the first operation is a tap operation, the window mode is displaying a page in a window form; or when the type of the first operation is a drag operation, the window mode is displaying a page on a full screen or a split screen.

In an embodiment, when the first instance of the second application and the second instance of the second application are run in the electronic device, the display module is configured to: display, in a first area of a display, a page corresponding to the first instance of the second application in a window form, and display, in a second area of the display, a page corresponding to the second instance of the second application in a window form; or the display module is configured to: display, on a full screen, a page corresponding to the first instance of the second application, and display, in a third area of the display, a page corresponding to the second instance of the second application in a window form; or the display module is configured to: display, in a fourth area of the display, a page corresponding to the first instance of the second application, and display, in a fifth area of the display, a page corresponding to the second instance of the second application, where the fourth area and the fifth area do not overlap; or the display module is configured to: display, in a sixth area of the display, a page corresponding to the first instance of the second application, display, in a seventh area of the display, a page corresponding to the second instance of the second application, and display, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the display module is configured to: display, in a ninth area of the display, a page corresponding to the first instance of the second application, display, in a tenth area of the display, a page corresponding to a third application, and display, in an eleventh area of the display, a page corresponding to the second instance of the second application in a window form, where the ninth area and the tenth area do not overlap, and the third application is different from both the first application and the second application.

In an embodiment, when the display apparatus displays the page corresponding to the second instance of the second application in the window form, the page includes a first control and a second control, and the first control is different from the second control; the display apparatus is further configured to: when receiving a second operation performed on the first control, display, on a full screen in response to the second operation, the page corresponding to the second instance of the second application; and the display apparatus is further configured to: when receiving a third operation performed on the second control, close, in response to the third operation, the page corresponding to the second instance of the second application.

In an embodiment, the first interface is located in a side area of the display.

In an embodiment, the first application is further configured to: when determining that the task corresponding to the first instance of the second application exists in the task list, and the first configuration item indicates that the second application does not support the multi-instance feature, shield the first operation; or the first application is further configured to: when determining that the task corresponding to the first instance of the second application exists in the task list, the first configuration item indicates that the second application supports the multi-instance feature, and the second application does not support starting of the multi-instance feature by using the main entry activity, shield the first operation.

In an embodiment, the first application is further configured to: when the task corresponding to the instance of the second application does not exist in the task list, start the second application.

In an embodiment, the first application is a sidebar application Dock, the second application is any application other than the sidebar application Dock, the first software module is a package manager, the second software module is an activity manager, the third software module is a multi-window task manager, the first mode is standard or singleTop, and the second mode is singleTask.

In an embodiment, the first software module is further configured to send a twelfth message to the second application, where the twelfth message is used to request a configuration file of the second application; and the second application is further configured to: in response to receiving the twelfth message, send a thirteenth message to the first software module, where the thirteenth message carries the first configuration item of the second application and the starting mode of the main entry activity of the second application.

For beneficial effects of the application starting apparatus provided in the sixth aspect and an embodiment of the sixth aspect, refer to beneficial effects brought by the third aspect and an embodiment of the third aspect. Details are not described herein again.

According to a seventh aspect, this application provides an electronic device, including: a memory and a processor, where the memory is configured to store a program instruction; and the processor is configured to invoke the program instruction in the memory, so that the electronic device performs the application starting method according to any one of the first aspect or an embodiment of the first aspect, or the processor is configured to invoke the program instruction in the memory, so that the electronic device performs the application starting method according to any one of the second aspect or an embodiment of the second aspect, or the processor is configured to invoke the program instruction in the memory, so that the electronic device performs the application starting method according to any one of the third aspect or an embodiment of the third aspect.

According to an eighth aspect, this application provides a chip system, where the chip system is applied to an electronic device including a memory, a display, and a sensor. The chip system includes a processor. When the processor executes a computer instruction stored in the memory, the electronic device performs the application starting method according to any one of the first aspect or an embodiment of the first aspect, or the electronic device performs the application starting method according to any one of the second aspect or an embodiment of the second aspect, or the electronic device performs the application starting method according to any one of the third aspect or an embodiment of the third aspect.

According to a ninth aspect, this application provides a computer readable storage medium, where the computer readable storage medium stores a computer program. When the computer program is executed by a processor, an electronic device is enabled to implement the application starting method according to any one of the first aspect and an embodiment of the first aspect; or when the computer program is executed by a processor, an electronic device is enabled to implement the application starting method according to any one of the second aspect and an embodiment of the second aspect; or when the computer program is executed by a processor, an electronic device is enabled to implement the application starting method according to any one of the third aspect and an embodiment of the third aspect.

According to a tenth aspect, this application provides a computer program product, including: an executable instruction, where the executable instruction is stored in a readable storage medium; at least one processor of an electronic device may read the executable instruction from the readable storage medium; and the at least one processor executes the executable instruction, so that the electronic device implements the application starting method according to any one of the first aspect and an embodiment of the first aspect, or the at least one processor executes the executable instruction, so that the electronic device implements the application starting method according to any one of the second aspect and an embodiment of the second aspect, or the at least one processor executes the executable instruction, so that the electronic device implements the application starting method according to any one of the third aspect or an embodiment of the third aspect.

DESCRIPTION OF EMBODIMENTS

Figure 1:
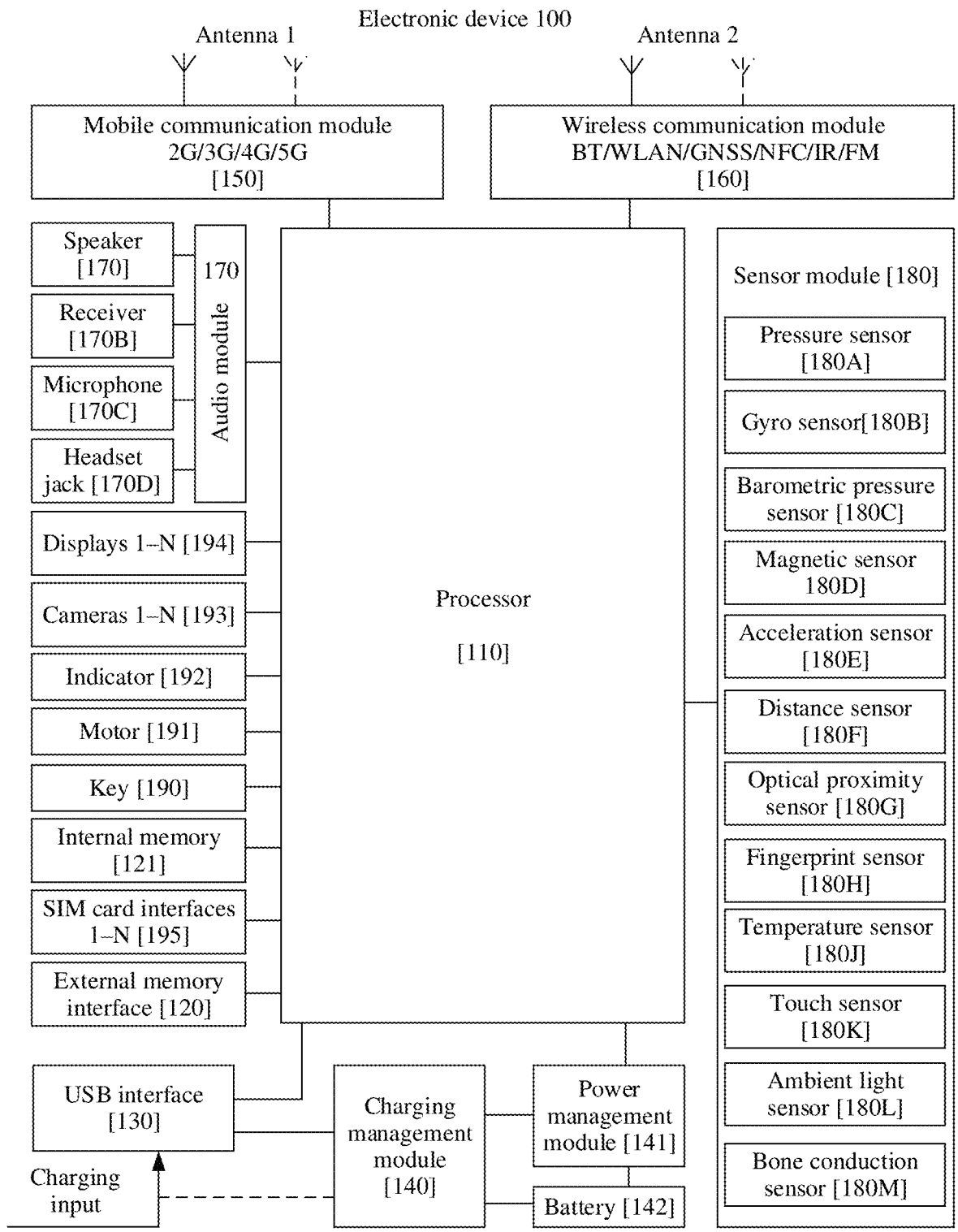
FIG. 1 is a schematic diagram of a structure of an electronic device according to an embodiment of this application.

In embodiments of this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "I" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent: a, b, c, a combination of a and b, a combination of a and c, a combination of b and c, or a combination of a, b and c, where each of a, b, and c may be in a singular form or a plural form. In addition, terms "first" and "second" are merely used for a purpose of description, and shall not be understood as an indication or implication of relative importance. The terms "center", "vertical", "horizontal", "up", "down", "left", "right", "front", "back", and the like indicate an orientation or a position relationship based on an orientation or a position relationship shown in the accompanying drawings, and are merely intended to facilitate description of the embodiments and simplify description of this application, but do not indicate or imply that a specified apparatus or element needs to have an orientation and be constructed and operated in an orientation, which therefore cannot be understood as a limitation on embodiments of this application.

Embodiments of this application provide an application starting method and apparatus, and an electronic device. For any application that is installed in an electronic device and that supports multi-window display, based on configurations of an application layer and an application framework layer in a software system of the electronic device, the electronic device that supports a floating window and split-screen display may have a single-application multi-instance feature. In this way, the Dock triggers any application to start the multi-instance feature of the application, and the electronic device may simultaneously display a plurality of windows of the application on a display in a plurality of window combination forms, so that multi-instance coordination processing and operation may be performed on a same application, thereby improving speed and efficiency of running the same application by the electronic device, maximizing continuation of an operating habit of a user on a personal computer (PC), improving office efficiency and working efficiency of the user, and bringing experience closer to that on a desktop-level operating system to the user.

The electronic device may be a device such as a tablet computer, a mobile phone (such as a foldable screen mobile phone or a large-screen mobile phone), a notebook computer, a wearable device, a vehicle-mounted device, an augmented reality (AR)/virtual reality (VR) device, an ultra-mobile personal computer (UMPC), a netbook, a personal digital assistant (PDA), a smart television, a smart screen, a high-definition television, a 4K television, a smart speaker, or a smart projector. A type of the electronic device is not limited in an embodiment of the application.

The following uses an example in which the electronic device is a tablet computer to describe an electronic device according to an embodiment of this application with reference to FIG. 1.

FIG. 1 is a schematic diagram of a structure of an electronic device according to an embodiment of this application. As shown in FIG. 1, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display 194 by using the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It can be understood that an interface connection relationship between modules illustrated in this application is merely an example for description, and does not constitute a limitation on the structure of the electronic device 100. In some other embodiments, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may further be configured to monitor parameters such as a battery capacity, a battery cycle count, and a battery health state (electric leakage or impedance). In some other embodiments, the power management module 141 may alternatively be disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (WLAN) (for example, a wireless fidelity (Wi-Fi) network), Bluetooth (bluetooth, BT), a global navigation satellite system (GNSS), frequency modulation (FM), a near field communication (NFC) technology, an infrared (IR) technology, or the like and that is applied to the electronic device 100. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications GSM), a general packet radio service (GPRS), code division multiple access (CDMA), wideband code division multiple access (WCDMA), time division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information based on a structure of a biological neural network, for example, based on a transfer mode between human brain neurons; and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (for example, audio data or an address book) created during use of the electronic device 100, and the like. In addition, the internal memory 121 may include a high-speed random access memory, or may include a nonvolatile memory such as at least one disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed in a same touch position but have different touch operation intensity may be corresponding to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, x, y, and z axes) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100, and When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED), and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio play) may be corresponding to different vibration feedback effects. The motor 191 may also be corresponding to different vibration feedback effects for touch operations performed on different areas of the display 194. Different application scenarios (for example, a time reminder, information receiving, an alarm clock, and a game) may also be corresponding to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. A type of an operating system of the electronic device is not limited in an embodiment of the application, for example, an Android system, a Linux system, a Windows system, an iOS system, or a HarmonyOS (harmony operating system, HarmonyOS).

In an embodiment of the application, a layered architecture of the Android system is used as an example to describe a software architecture of the electronic device 100.

The following describes some terms of the Android system in embodiments of this application, to facilitate understanding by one of ordinary skilled in the art.

1. An activity (Activity) is a display component of an Android APP. The activity provides a window for interacting with a user and displaying content of the APP. An activity is usually corresponding to a separate window. The window may be full of a display area of the electronic device, or may be smaller than a display area of the electronic device and float above another window. An APP usually includes a plurality of loosely related activities. Generally, the APP may specify an activity as a main entry activity, which is an activity presented to the user when the user starts the APP for the first time. Correspondingly, a window presented by the main entry activity is a home page in the APP.

In the APP, an entry activity other than the main entry activity is referred to as a sub-entry activity. The sub-entry activity and the main entry activity may be in a same stack (which can be understood as a same task (Task)), or may not be in a same stack as the main entry activity. This is not limited in an embodiment of the application, provided that both the sub-entry activity and the main entry activity may be corresponding to a same APP.

A child activity inherits a behavior attribute of a parent activity. The parent activity starts the child activity, and the child activity obtains data. When the child activity is closed, the child activity sends data back to the parent activity, to trigger the parent activity to invoke an event processing function to obtain the data from the child activity.

In an embodiment of the application, a same activity has a same name, and the same activity may be corresponding to a plurality of instances. In an embodiment of the application, an instance identifier (ID) of an activity is used to distinguish between different instances of the same activity, so as to accurately jump to any instance of the activity and delete any instance of the activity. An ID of an instance of the same activity may include but is not limited to at least one representation form such as a digit, a letter, or a character string.

In the following, a plurality of instances of a same activity of an application are illustrated based on an example in which running information of an activity of any application is queried by using a command.

HWTET: / #dumpsys activity activities
ACTIVITY MANAGER ACTIVITIES (dumpsys activity activities)
Display #0 (activities from top to bottom):
 Stack #31: type=standard mode=hwMultiwindow-free-form
 isSleeping=false
 mBounds=Rect(1091, 286-2251, 2465)
  Task id #22
  mBounds=Rect(1091, 286-2251, 2465)
  mMinWidth=-1
  mMinHeight=-1
  mLastNonFullscreenBounds=null
  * TaskRecord{26acf7b #22 A=com.huawei.notepad U=0 StackId=31 sz=2}
   userId=0        effectiveUid=u0a142
    mCallingUid=u0a82
mUserSetupComplete=true
 mCallingPackage=com.huawei.android.launcher
 affinity=com.huawei.notepad
 intent={act=android.intent.action.MAIN
cat=[android.intent.category.LAUNCHER]
 flg=0x10200000
cmp=com.huawei.notepad/com.example.android.notepad.NotePadActivity}
mActivityComponent=com.huawei.notepad/com.example.android.notepad.NotePadActivity
 autoRemoveRecents=false isPersistable=true numFullscreen=2 activityType=1
 rootWasReset=true  mNeverRelinquishIdentity=true
  mReuseTask=false
mLockTaskAuth=LOCK_TASK_AUTH_PINNABLE
 Activities=[ActivityRecord{261b3c9 u0
com.huawei.notepad/com.example.android.
 notepad.NotePadActivity t22},
 ActivityRecord{277cdc9  u0  com.huawei.notepad/com.example.android.notepad.NoteEditor t22 f}]
  askedCompatMode=false       inRecents=true
   isAvailable=true
  mRootProcess=ProcessRecord{26dc5b9     10196:
   com.huawei.notepad/u0a142}
  stackId=31
  hasBeenVisible=true
mResizeMode=RESIZE_MODE_RESIZEABLEV_IA_SDK_VERSION
mSupportsPictureInPicture=false isResizeable=true lastActiveTime=252482707 (inactive for 2s)
 * Hist #1: ActivityRecord{277cdc9 u0 com.huawei.notepad/com.example.android.notepad.NoteEditor t22 f}
  packageName=com.huawei.notepad
    processName=com.huawei.notepad
    launchedFromUid=10142
    launchedFromPackage=com.huawei.notepad
    userId=0
    app=ProcessRecord{26dc5b9 10196: com.huawei.notepad/u0a142}
    Intent { act=android.huawei.intent.action.note.edit cmp=com.huawei.notepad/com.example.android.notepad.NoteEditor (has extras)}
    frontOfTask=false task=TaskRecord{26acf7b #22 A=com.huawei.notepad U=0 StackId=31 sz=2}
    taskAffinity=com.huawei.notepad
  mActivityComponent=com.huawei.notepad/com.example.android.notepad.NoteEditor
    baseDir=/hw_product/app/HwNotePad/HwNotePad.apk
    dataDir=/data/user/0/com.huawei.notepad
    stateNotNeeded=false componentSpecified=true
  mActivityType=standard
    compat={520 dpi always-compat} labelRes=0x7f110002 icon=0x7f080178 theme=0x2060009
    mLastReportedConfigurations:
      mGlobalConfig={1.0 ?mcc?mnc [zh_CN_#Hans] ldltr sw676dp w676dp h724dp 520 dpi lrg hdr port finger -keyb/v/h -nav/h winConfig={mBounds=Rect(0, 0-2200, 2480) mAppBounds=Rect(0, 0-2200, 2480) mWindowingMode=fullscreen mDisplayWindowingMode=fullscreen mActivityType=undefined mAlwaysOnTop=undefined mRotation=ROTATION_0} suim:1 s.1536}
      mOverrideConfig={1.0 ?mcc?mnc [zh_CN_#Hans] ldltr sw356dp w356dp h670dp 520 dpi nrml hdr port finger -keyb/v/h -nav/h winConfig={mBounds=Rect(1091, 286-2251, 2465) mAppBounds=Rect(1091, 286-2251, 2465) mWindowingMode=hwMultiwindow-freeform mDisplayWindowingMode=fullscreen mActivityType=standard mAlwaysOnTop=on mRotation=ROTATION_0} suim:1 s.175}
      CurrentConfiguration={1.0 ?mcc?mnc [zh_CN_#Hans] ldltr sw356dp w356dp h670dp 520 dpi nrml hdr port finger -keyb/v/h -nav/h winConfig={mBounds=Rect(1091, 286-2251, 2465) mAppBounds=Rect(1091, 286-2251, 2465) mWindowingMode=hwMultiwindow-freeform mDisplayWindowingMode=fullscreen mActivityType=standard mAlwaysOnTop=on mRotation=ROTATION_0} suim:1 s.229}
    launchFailed=false launchCount=1 lastLaunchTime=-10m24s276 ms
    haveState=false icicle=null
    state=FINISHING stopped=false delayedResume=false finishing=true
    keysPaused=false inHistory=true visible=true sleeping=false idle=true
    mStartingWindowState=STARTING_WINDOW_SHOWN
    fullscreen=true noDisplay=false immersive=false launchMode=0
    frozenBeforeDestroy=false forceNewConfig=false
    mActivityType=standard
    nowVisible=false lastVisibleTime=-1m20s427 ms
    resizeMode=RESIZE_MODE_RESIZEABLE_VIA_SDK_VERSION
    mLastReportedMultiWindowMode=true
  mLastReportedPictureInPictureMode=false
  * Hist #0: ActivityRecord{261b3c9 u0 com.huawei.notepad/com.example.android.notepad.NotePadActivity t22}
    packageName=com.huawei.notepad
    processName=com.huawei.notepad
    launchedFromUid=10082
  launchedFromPackage=com.huawei.android.launcher
    userId=0
    app=ProcessRecord{26dc5b9 10196: com.huawei.notepad/u0a142}
    Intent { act=android.intent.action.MAIN cat=[android.intent.category.LAUNCHER] flg=0x10200000 cmp=com.huawei.notepad/com.example.android.notepad.NotePadActivity bnds=[908,167][1306,492]}
    frontOfTask=true task=TaskRecord{26acf7b #22 A=com.huawei.notepad U=0 StackId=31 sz=2}
    taskAffinity=com.huawei.notepad
  mActivityComponent=com.huawei.notepad/com.example.android.notepad.NotePadActivity
    baseDir=/hw_product/app/HwNotePad/HwNotePad.apk
    dataDir=/data/user/0/com.huawei.notepad
    stateNotNeeded=false componentSpecified=true
  mActivityType=standard
    compat={520 dpi always-compat} labelRes=0x7f110002 icon=0x7f080178 theme=0x2060009
    mLastReportedConfigurations:
      mGlobalConfig={1.0 ?mcc?mnc [zh_CN_#Hans] ldltr sw676dp w676dp h724dp 520 dpi lrg hdr port finger -keyb/v/h -nav/h winConfig={mBounds=Rect(0, 0-2200, 2480) mAppBounds=Rect(0, 0-2200, 2480) mWindowingMode=fullscreen mDisplayWindowingMode=fullscreen mActivityType=undefined mAlwaysOnTop=undefined mRotation=ROTATION_0} suim:1 s.1536}
      mOverrideConfig={1.0 ?mcc?mnc [zh_CN_#Hans] ldltr sw356dp w356dp h670dp 520 dpi nrml hdr port finger -keyb/v/h -nav/h winConfig={mBounds=Rect(1091, 286-2251, 2465) mAppBounds=Rect(1091, 286-2251, 2465) mWindowingMode=hwMultiwindow-freeform mDisplayWindowingMode=fullscreen mActivityType=standard mAlwaysOnTop=on mRotation=ROTATION_0} suim:1 s.143}
      CurrentConfiguration={1.0 ?mcc?mnc [zh_CN_#Hans] ldltr sw356dp w356dp h670dp 520 dpi nrml hdr port finger -keyb/v/h -nav/h winConfig={mBounds=Rect(1091, 286-2251, 2465) mAppBounds=Rect(1091, 286-2251, 2465) mWindowingMode=hwMultiwindow-freeform mDisplayWindowingMode=fullscreen mActivityType=standard    mAlwaysOnTop=on
  mRotation=ROTATION_0} suim:1 s.145}
    launchFailed=false launchCount=0 lastLaunchTime=−
      21m6s251 ms
    haveState=false icicle=null
    state=RESUMED stopped=false delayedResume=false
      finishing=false
    keysPaused=false    inHistory=true    visible=true
      sleeping=false idle=false
mStartingWindowState=STARTING_WINDOW_
  REMOVED
    fullscreen=true   noDisplay=false   immersive=false
      launchMode=1
    frozenBeforeDestroy=false forceNewConfig=false
    mActivityType=standard
    nowVisible=true lastVisibleTime=−6s43 ms
    resizeMode=RESIZE_MODE_RESIZEABLE_
      VIA_SDK_VERSION
    mLastReportedMultiWindowMode=true
mLastReportedPictureInPictureMode=false
    Running activities (most recent first):
      TaskRecord{26acf7b #22 A=com.huawei.notepad
        U=0 StackId=31 sz=2}
      Run #1: ActivityRecord{261b3c9 u0
com.huawei.notepad/com.example.android.
  notepad.NotePadActivity t22}
      Run #0: ActivityRecord{277cdc9 u0
com.huawei.notepad/com.example.android.notepad.No-
  teEditor t22 f}
    mResumedActivity: ActivityRecord{261b3c9 u0
com.huawei.notepad/com.example.android.
  notepad.NotePadActivity t22}
    mLastPausedActivity: ActivityRecord{277cdc9 u0
com.huawei.notepad/com.example.android.notepad.No-
  teEditor t22 f}
    Stack #23: type=standard mode=hwMultiwindow-free-
      form
    isSleeping=false
    mBounds=Rect(139, 216-1299, 2395)
      Task id #23
        mBounds=Rect(139, 216-1299, 2395)
        mMinWidth=−1
        mMinHeight=−1
        mLastNonFullscreenBounds=Rect(1139, 341-2299,
          2520)
      *    TaskRecord{26acec2    #23
        A=com.huawei.notepad U=0 StackId=23 sz=2}
        userId=0    effectiveUid=u0a142
        mCallingUid=u0a130
mUserSetupComplete=true
    mCallingPackage=com.huawei.hwdockbar
    affinity=com.huawei.notepad
    intent={act=android.intent.action.MAIN
cat=[android.intent.category.LAUNCHER]
    flg=0x18200000 hwFlg=0x20000
cmp=com.huawei.notepad/com.example.android.note-
  pad.NotePadActivity}
mActivityComponent=com.huawei.notepad/com.ex-
  ample.android.notepad.NotePadActivity
    autoRemoveRecents=false isPersistable=true num-
      Fullscreen=2 activityType=1
    rootWasReset=true    mNeverRelinquishIdentity=true
      mReuseTask=false
    mLockTaskAuth=LOCK_TASK_AUTH_PINNABLE
      Activities=[ActivityRecord{26d7279 u0
com.huawei.notepad/com.example.android.
  notepad.NotePadActivity t23}, ActivityRecord{277cd21    u0    com.huawei.notepad/
  com.example.android.notepad.NoteEditor t23}]
    askedCompatMode=false    inRecents=true
      isAvailable=true
    mRootProcess=ProcessRecord{26dc5b9    10196:
      com.huawei.notepad/u0a142}
    stackId=23
    hasBeenVisible=true
mResizeMode=RESIZE_MODE_RESIZEABLE_
  VIA_SDK_VERSION
mSupportsPictureInPicture=false isResizeable=true last-
  ActiveTime=252476699 (inactive for 8s)
  * Hist #1: ActivityRecord{277cd21 u0
com.huawei.notepad/com.example.android.notepad.No-
  teEditor t23}
    packageName=com.huawei.notepad
      processName=com.huawei.notepad
    launchedFromUid=10142
      launchedFromPackage=com.huawei.notepad
      userId=0
    app=ProcessRecord{26dc5b9    10196:    com.
      huawei.notepad/u0a142}
    Intent { act=android.huawei.intent.action.note.edit
cmp=com.huawei.notepad/com.example.android.note-
  pad.NoteEditor (has extras)}
    frontOfTask=false task=TaskRecord{26acec2 #23
A=com.huawei.notepad U=0 StackId=23 sz=2}
    taskAffinity=com.huawei.notepad
mActivityComponent=com.huawei.notepad/com.ex-
  ample.android.notepad.NoteEditor
    baseDir=/hw_product/app/HwNotePad/HwNoteP-
      ad.apk
    dataDir=/data/user/0/com.huawei.notepad
    stateNotNeeded=false componentSpecified=true
mActivityType=standard
    compat={520    dpi    always-compat}
    labelRes=0x7f110002    icon=0x7f080178
      theme=0x2060009
    mLastReportedConfigurations:
      mGlobalConfig={1.0 ?mcc?mnc [zh_CN_#Hans]
        ldltr sw676dp w676dp h724dp 520 dpi lrg hdr port
        finger    -keyb/v/h    -nav/h
        winConfig={mBounds=Rect(0,    0-2200,    2480)
        mAppBounds=Rect(0,    0-2200,    2480)
        mWindowingMode=fullscreen
        mDisplayWindowingMode=fullscreen
        mActivityType=undefined
        mAlwaysOnTop=undefined
        mRotation=ROTATION_0} suim:1 s.1536}
      mOverrideConfig={1.0 ?mcc?mnc [zh_CN_#Hans]
        ldltr sw356dp w356dp h670dp 520 dpi nrml hdr
        port    finger    -keyb/v/h    -nav/h
        winConfig={mBounds=Rect(139,    216-1299,
        2395) mAppBounds=Rect(139, 216-1299, 2395)
        mWindowingMode=hwMultiwindow-freeform
        mDisplayWindowingMode=fullscreen
        mActivityType=standard    mAlwaysOnTop=on
        mRotation=ROTATION_0} suim:1 s.683}
    CurrentConfiguration={1.0    ?mcc?mnc
      [zh_CN_#Hans] ldltr sw356dp w356dp h670dp 520
      dpi nrml hdr port finger -keyb/v/h -nav/h
      winConfig={mBounds=Rect(139, 216-1299, 2395)
      mAppBounds=Rect(139,    216-1299,    2395)
      mWindowingMode=hwMultiwindow-freeform
      mDisplayWindowingMode=fullscreen
      mActivityType=standard    mAlwaysOnTop=on
      mRotation=ROTATION_0} suim:1 s.751} launchFailed=false launchCount=0 lastLaunchTime=−10m21s667 ms
haveState=false icicle=null
state=RESUMED stopped=false delayedResume=false finishing=false
keysPaused=false inHistory=true visible=true sleeping=false idle=true
mStartingWindowState=STARTING_WINDOW_SHOWN
fullscreen=true noDisplay=false immersive=false launchMode=0
frozenBeforeDestroy=false forceNewConfig=false
mActivityType=standard
nowVisible=true lastVisibleTime=−1m20s428 ms
resizeMode=RESIZE_MODE_RESIZEABLE_VIA_SDK_VERSION
mLastReportedMultiWindowMode=true
mLastReportedPictureInPictureMode=false
 *Hist #0:ActivityRecord{26d7279u0 com.huawei.notepad/com.example.android.notepad.NotePadActivity t23}
 packageName=com.huawei.notepad processName=com.huawei.notepad launchedFromUid=10130
launchedFromPackage=com.huawei.hwdockbar userId=0
 app=ProcessRecord{26dc5b9 10196: com.huawei.notepad/u0a142}
 Intent { act=android.intent.action.MAIN
cat=[android.intent.category.LAUNCHER]
flg=0x18200000 hwFlg=0x20000
cmp=com.huawei.notepad/com.example.android.notepad.NotePadActivity}
 frontOfTask=true task=TaskRecord{26acec2 #23 A=com.huawei.notepad U=0 StackId=23 sz=2}
 taskAffinity=com.huawei.notepad
mActivityComponent=com.huawei.notepad/com.example.android.notepad.NotePadActivity
 baseDir=/hw_product/app/HwNotePad/HwNotePad.apk
 dataDir=/data/user/0/com.huawei.notepad
 stateNotNeeded=false componentSpecified=true
mActivityType=standard
 compat={520 dpi always-compat}
 labelRes=0x7f110002 icon=0x7f080178 theme=0x2060009
 mLastReportedConfigurations:
  mGlobalConfig={1.0 ?mcc?mnc [zh_CN_#Hans] ldltr sw676dp w676dp h724dp 520 dpi lrg hdr port finger -keyb/v/h -nav/h
  winConfig={mBounds=Rect(0, 0-2200, 2480) mAppBounds=Rect(0, 0-2200, 2480)
  mWindowingMode=fullscreen
  mDisplayWindowingMode=fullscreen
  mActivityType=undefined
  mAlwaysOnTop=undefined
  mRotation=ROTATION_0} suim:1 s.1536}
  mOverrideConfig={1.0 ?mcc?mnc [zh_CN_#Hans] ldltr sw356dp w356dp h670dp 520 dpi nrml hdr port finger -keyb/v/h -nav/h
  winConfig={mBounds=Rect(13, 263-1173, 2442) mAppBounds=Rect(13, 263-1173, 2442)
  mWindowingMode=hwMultiwindow-freeform
  mDisplayWindowingMode=fullscreen
  mActivityType=standard mAlwaysOnTop=on
  mRotation=ROTATION_0} suim:1 s.165}
 CurrentConfiguration={1.0 ?mcc?mnc [zh_CN_#Hans] ldltr sw356dp w356dp h670dp 520 dpi nrml hdr port finger -keyb/v/h -nav/h
  winConfig={mBounds=Rect(139, 216-1299, 2395) mAppBounds=Rect(139, 216-1299, 2395)
  mWindowingMode=hwMultiwindow-freeform
  mDisplayWindowingMode=fullscreen
  mActivityType=standard mAlwaysOnTop=on
  mRotation=ROTATION_0} suim:1 s.626}
 launchFailed=false launchCount=0 lastLaunchTime=−21m1s900 ms
 haveState=true icicle=Bundle[mParcelledData.dataSize=8352]
 state=STOPPED stopped=true delayedResume=false finishing=false
 keysPaused=false inHistory=true visible=false sleeping=false idle=true
mStartingWindowState=STARTING_WINDOW_REMOVED
 fullscreen=true noDisplay=false immersive=false launchMode=1
 frozenBeforeDestroy=false forceNewConfig=false
 mActivityType=standard
 nowVisible=false lastVisibleTime=−10m22s153 ms
 resizeMode=RESIZE_MODE_RESIZEABLE_VIA_SDK_VERSION
 mLastReportedMultiWindowMode=true
mLastReportedPictureInPictureMode=false
  Running activities (most recent first):
   TaskRecord{26acec2 #23 A=com.huawei.notepad U=0 StackId=23 sz=2}
    Run #1: ActivityRecord{277cd21 u0 com.huawei.notepad/com.example.android.notepad.NoteEditor t23}
    Run #0: ActivityRecord{26d7279 u0 com.huawei.notepad/com.example.android.notepad.NotePadActivity t23}
   mResumedActivity: ActivityRecord{277cd21 u0 com.huawei.notepad/com.example.android.notepad.NoteEditor t23}
   mLastPausedActivity: ActivityRecord{277cd21 u0 com.huawei.notepad/com.example.android.notepad.NoteEditor t23}

Based on the foregoing information, in a task stack whose task stack identifier (Task id) is #22, an ID of an instance whose activity name is "com.huawei.notepad/com.example.android.notepad.NoteEditor" is 277cdc9.

In a task stack whose identifier (Task id) of the task stack is #23, an ID of an instance whose activity name is "com.huawei.notepad/com.example.android.notepad.NoteEditor" is 277cd21.

Therefore, for the same activity, the activity may be corresponding to a plurality of instances, and IDs of different instances are different.

2. There are four activity starting modes (LaunchMode):

Standard mode: Default mode, in which an instance is created and placed in the task stack each time an activity is activated.

singleTop mode: If the instance exists on the top of the task stack, the instance is reused. Otherwise, a new instance is created and placed at the top of the task stack. Even if the instance already exists in the task stack, a new instance is created provided that the instance is not at the top of the stack.

singleTask mode: If the instance already exists in the task stack, the instance is reused. When the instance is reused, the instance is returned to the top of the stack, and an instance above the instance will be removed from the task stack. If the instance does not exist in the task stack, a new instance is created and placed in the task stack.

singleInstance mode: An instance is created in a new task stack, and a plurality of applications share the instance in the task stack. Once an instance in this mode already exists in a task stack, the instance in the task stack will be reused when any application reactivates the instance.

3. A foreground task and a background ask can be switched between each other. The foreground task can respond to a user input when running. The background task does not need to interact with the user during running, and no substantive user interface (UI) processing is required. Therefore, the background task does not disturb the work of the user, and does not consume resources and power of the electronic device too quickly.

4. The single-instance feature can be understood as follows: If an activity is started for a plurality of times, the activity has only one instance. That is, if an instance of the activity exists in the stack, the current activity object is not re-instantiated, but the previous activity object is directly reused, and all other activity objects on the current activity object are removed.

5. The multi-instance feature can be understood as follows: Each time an activity is started, the activity has an instance. That is, if an instance of the activity exists in the stack, the current activity object is re-instantiated instead of reusing the previous activity object.

6. The single-application multi-instance feature allows an application to open a plurality of windows for operation. Each window runs in a task stack. Different windows are corresponding to different task stacks. A window is corresponding to an instance of an activity, and each window is corresponding to a plurality of instances of the same activity. The IDs of the plurality of instances of the same activity are different. In addition, a display manner of the plurality of windows (that is, multi-window display) in an embodiment of the application may be a split-screen manner, a floating window manner, or a split-screen manner and a floating window manner. This is not limited in an embodiment of the application. In addition, a single application mentioned in an embodiment of the application can be understood as a same application.

Figure 2A:
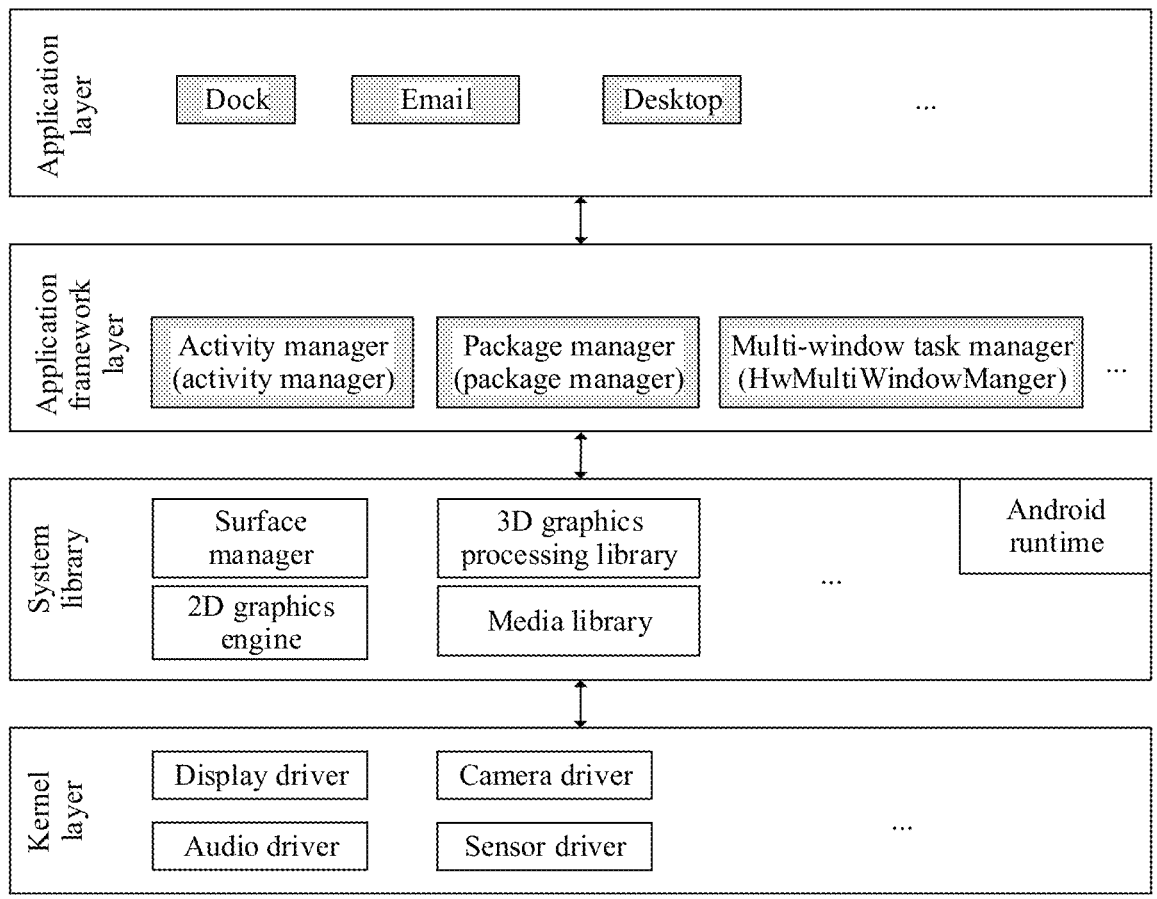
FIG. 2A is a block diagram of a software architecture of an electronic device according to an embodiment of this application.

FIG. 2A is a block diagram of a software architecture of an electronic device according to an embodiment of this application. As shown in FIG. 2A, the layered architecture divides the software system into several layers, and each layer has a clear role and division of work. The layers communicate with each other by using a software interface. In some embodiments, the Android system is divided into four layers, that is, an application layer, an application framework (APP framework) layer, Android runtime and system libraries, and a kernel layer from top to bottom.

The application layer may include a series of application packages.

As shown in FIG. 2A, the application packages may include applications (APP) such as email, camera, gallery, calendar, call, map, navigation, WLAN, Bluetooth, music, video, game, chat, shopping, travel, instant messaging (such as SMS), smart home, and device control.

The smart home applications may be used to control or manage home devices with a networking function. For example, the home device may include an electric light, a television, and an air conditioner. For another example, the home device may further include an anti-theft door lock, a sound box, a floor sweeping robot, a socket, a body fat scale, a desk lamp, an air purifier, a refrigerator, a washing machine, a water heater, a microwave oven, an electric cooker, a curtain, a fan, a television, a set-top box, a door, and a window.

In addition, the application package may further include applications such as a Dock (that is, a sidebar application), a home screen (that is, a desktop), a leftmost screen, a control center, and a notification center.

The leftmost screen may also be referred to as the "minus 1 screen", and refers to a split-screen UI that is displayed when a user slides from the home screen of the electronic device to the leftmost. For example, the leftmost screen may be used to place some quick service functions and notification messages, such as global search, a quick entry (a payment code, WeChat, and the like) of a page of an application, instant information, and reminders (express information, expenditure information, commuting road conditions, taxi hailing information, schedule information, and the like), and followed dynamic information (such as a football platform, a basketball platform, and stock information). The control center is a slide-up message notification bar of the electronic device, that is, the user interface displayed by the electronic device when the user starts to perform a slide-up operation at the bottom of the electronic device. The notification center is a drop-down message notification bar of the electronic device, that is, the user interface displayed by the electronic device when the user starts to perform a drop-down operation at the bottom of the electronic device.

Generally, applications may be classified into system applications and third-party applications. A system application can be understood as an application that is not independent and depends on a software system, for example, a Dock and a desktop. A third-party application is an application other than a system application, and may include but is not limited to a self-developed application of a device vendor and an application of a non-device vendor, such as an electronic device application and a computer application. For ease of description, an example in which the application layer includes three applications, namely Dock, email, and desktop, is used for illustration.

The Dock interface (that is, an interface of the Dock) is a function interface that is in UIs and that is used to start or switch an icon of a running application. An operation such as adding, deleting, or moving an application icon in the Dock may be performed, so that an application that supports a floating window, a split screen, or a full screen is displayed on each UI to the user. There may be a plurality of operations for instructing the user to open the Dock. Generally, in an Android system, the Dock may be invoked by sliding the display of the electronic device inwards from any side edge and then pausing. In this way, the Dock interface may be displayed in a position at a corresponding side edge. In addition, the user may also click/tap a hardware key or a virtual key used to open the Dock. In this way, the Dock interface may be displayed on the screen of the electronic device.

It should be noted that the full-screen display mentioned in an embodiment of the application can be understood as that the electronic device displays any page in all display areas of the display, or can be understood as that the electronic device displays any page in a display area other than an area a that displays parameters such as a time, a signal, and a battery level on the display. The area a is usually located above the display. A full-screen display area may be divided into an area b1 and an area b2. The area b1 and the area b2 do not overlap, and sizes of the area b1 and the area b2 may be equal or unequal. Split-screen display can be understood as that the electronic device displays one page in the area b1 and displays another page in the area b2.

Figure 2B:
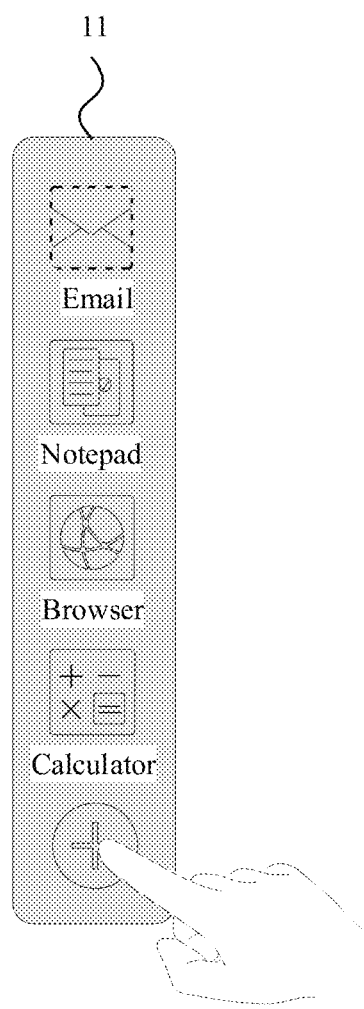
FIG. 2B and FIG. 2C are schematic diagrams of a Dock interface according to an embodiment of this application.
Figure 2C:
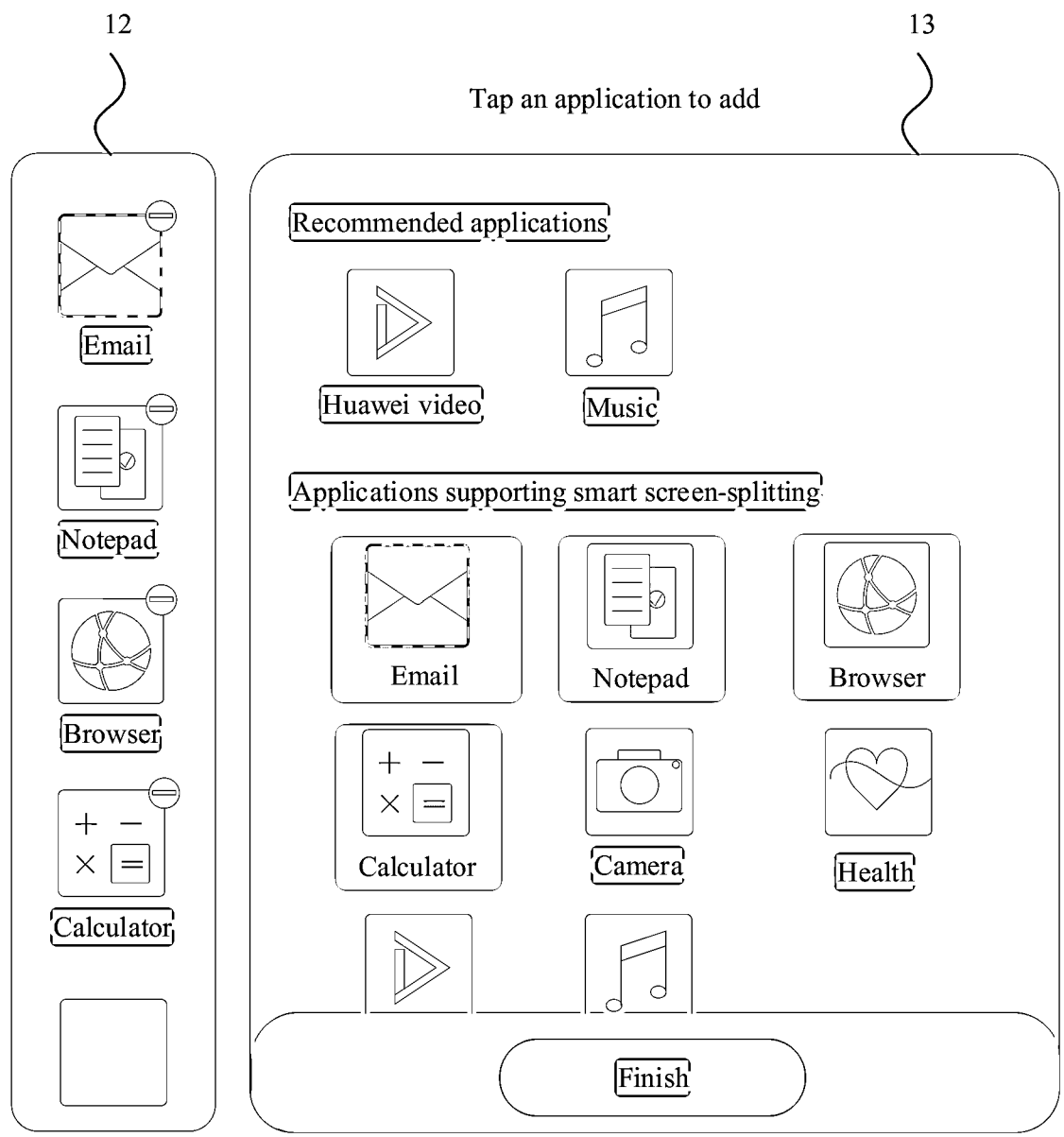

With reference to FIG. 2B and FIG. 2C, the following describes an embodiment of a Dock interface.

FIG. 2B and FIG. 2C are schematic diagrams of an embodiment of a Dock interface.

FIG. 2B shows an example of the Dock interface 11. In an embodiment of the application, parameters such as a layout position (which may be configured based on parameters such as a configuration of the software system and an operation of a user), an interface size, an interface color, and an application icon size of the Dock interface 11 are not limited.

The Dock interface 11 may include but is not limited to icons of a plurality of applications, for example, an icon of an email application, an icon of a Notepad application, an icon of a browser application, an icon of a calculator application, and an adding control.

The adding control may receive an input operation (for example, a tap operation) of the user; and in response to the detected input operation, the tablet computer displays an interface used to add an application.

After detecting an operation that is instructed by the user and that is performed on the adding control, the electronic device may display the text "Tap an application to add", the interface 12, and the interface 13 that are shown in FIG. 2C as an example.

The text "Tap an application to add" is used to instruct the user to tap an application icon on the interface 13 to add the corresponding application icon to the interface 12.

The interface 12 is a preview interface of the Dock interface 11, and is used to store an icon of an added application. In addition, the interface 12 is further used to delete an icon of an added application. For example, an icon "⊖" is arranged in an upper right corner of each application icon. When the user taps an icon "⊖" in an upper right corner of any application icon, the application icon is deleted from the interface 12.

The interface 13 is an interface for adding an application, and is used to provide an application that can be displayed on a split screen in the electronic device. For example, the interface 13 is divided into two areas.

One area is used to display icons of applications that are frequently used by the user. For example, the area is illustrated by using a text "Recommended applications", such as an icon of a Huawei video application, and an icon of a music application.

The other area is used to display icons of all applications that can be displayed on a split screen in the electronic device. For example, the area is illustrated by using a text "Applications supporting smart screen-splitting", such as an icon of an email application, an icon of a Notepad application, an icon of a browser application, an icon of a calculator application, an icon of a camera application, an icon of a health application, an icon of a Huawei video application, and an icon of a music application.

In addition, when an icon of an application on the interface 13 is already added to the interface 12, the icon of the application is dimmed on the interface 13, for example, the icon of the email application, the icon of the Notepad application, the icon of the browser application, and the icon of the calculator application. When an icon of an application on the interface 13 is not added to the interface 12, the icon of the application is normally displayed on the interface 13, for example, the icon of the Huawei video application, the icon of the music application, the icon of the camera application, and the icon of the health application.

It should be noted that parameters such as a layout position (which may be configured based on parameters such as a configuration of the software system and an operation of a user), an interface size, an interface color, and an application icon size of the interface 12 and the interface 13 are not limited to the foregoing implementation.

In an embodiment of the application, the Dock may use any third-party application in a full-screen display manner. For example, the application 1 may be displayed on a full screen by touching and holding an icon of the application 1 on the Dock interface.

The Dock can use a plurality of third-party applications in a floating window or split-screen mode. For example, when the electronic device displays the interface of the application 1, the application 1 and the application 2 may be displayed on split screens by touching and holding the icon of the application 2 on the Dock interface. The display area of the electronic device includes a first area and a second area, and the first area and the second area may be arranged left and right or may be arranged up and down. In addition, sizes of the first area and the second area may be equal or unequal. If the first area and the second area are arranged left and right, and the first area is located on the left side of the second area, when the user drags the icon of the application 2 and leaves the display from the first area of the electronic device, the electronic device may display the application 1 on the left side and display the application 2 on the right side. The floating window of the application 2 may be displayed on the interface of the application 1 by tapping the icon of the application 2 on the Dock interface.

It should be noted that, when the electronic device displays the interface of the application 1, the application 2 may also be displayed on a full screen by touching and holding the icon of the application 2 on the Dock interface. The application 1 and the application 2 may be a same application, or may be different applications.

In an embodiment of the application, the Dock may be used as a starting entry for each third-party application to implement a plurality of instances. The Dock can identify, start, and manage the multi-instance feature based on a metadata rule. Each third-party application needs to explicitly state the metadata rule in a configuration file AndroidManifest.xml of the application. For example, the metadata rule may include but is not limited to: whether the application supports the multi-instance feature, and a starting entry activity of the multi-instance feature that is specified by the application, as shown in Table 1 and Table 2.

TABLE 1

| Whether the application in the metadata rule supports the multi-instance feature | |
|---|---|
| Explicit statement of the application in the configuration file AndroidManifest.xml | Parameter description |
| \<application\><br>\<mata-data<br>android:name="com.huawei.android.multiwindow.multiniistance.enable"<br>android:value="true"\><br>\</meta-data\> | Explicit statement in the "application" field in a meta-data manner |

TABLE 1-continued

Whether the application in the metadata rule supports the multi-instance feature

| Explicit statement of the application in the configuration file AndroidManifest.xml | Parameter description |
|---|---|
| | true: The multi-instance feature is supported. false: The multi-instance feature is not supported. By default, no statement is made, indicating that the multi-instance feature is not supported. |

TABLE 2

Starting entry activity of the multi-instance feature that is specified by the application in the metadata rule

| Explicit statement of the application in the configuration file AndroidManifest.xml | Parameter description |
|---|---|
| <application><br><mata-data<br>android:name="com.huawei.android.multiwindow.multiinistance.level"<br>android:value="0"><br></meta-data> | Explicit statement in the "application" field in a metadata manner 0: The multi-instance feature cannot be started by using the main entry activity. 1: The multi-instance feature can be started by using the main entry activity. By default, no statement is made, indicating that the multi-instance feature cannot be started by using the main entry activity. |

In Table 1, whether the application supports the multi-instance feature may be determined by using a character configured for a configuration item "com.huawei.android-.multiwindow.multiinistance.enable" in the configuration file AndroidManifest.xml of the application.

If the character configured for the configuration item "com.huawei.android.multiwindow.multiinistance.enable" is "true", the application supports the multi-instance feature.

If the character configured for the configuration item "com.huawei.android.multiwindow.multiinistance.enable" is "false" or the configuration file AndroidManifest.xml of the application does not contain the configuration item "com.huawei.android.multiwindow.multiinistance.enable", the application does not support the multi-instance feature.

In Table 2, it can be determined, according to a value configured for a configuration item "com.huawei.android.multiwindow.multiinistance.level" in the configuration file AndroidManifest.xml of the application, whether the application supports starting of the multi-instance feature by using the main entry activity.

If the value configured for "com.huawei.android.multiwindow.multiinistance.level" is "0" or the configuration file AndroidManifest.xml of the application does not contain the configuration item "com.huawei.android.multiwindow.multiinistance.level", the application does not support starting of the multi-instance feature by using the main entry activity.

If the value configured for "com.huawei.android.multiwindow.multiinistance.level" is "1", the application supports starting of the multi-instance feature by using the main entry activity.

It should be noted that, in addition to using the foregoing two configuration items to represent the metadata rule, in an embodiment of the application, one configuration item may also be used to indicate whether the application in the metadata rule supports the multi-instance feature and a starting entry activity of the multi-instance feature that is specified by the application. For example, if a character configured for a configuration item is "true", it may indicate that the application supports the multi-instance feature, and a starting entry activity of the multi-instance feature that is specified by the application supports starting of the multi-instance feature by using the main entry activity. If a character configured for the configuration item is "false", it may indicate that the application does not support the multi-instance feature, or may indicate that the application supports the multi-instance feature, and a starting entry activity of the multi-instance feature that is specified by the application does not support starting of the multi-instance feature by using the main entry activity.

Based on the foregoing description, if the value configured for the configuration item "com.huawei.android.multiwindow.multiinistance.level" is "0" or the configuration file AndroidManifest.xml of the application does not contain the configuration item "com.huawei.android.multiwindow.multiinistance.level", the Dock cannot start a plurality of instances of the application. If the value configured for com.huawei.android.multiwindow.multiinistance.level is "1", the Dock can determine a LaunchMode of the main entry activity of the application. In this case, the electronic device further needs to determine, by using the LaunchMode of the main entry activity of the application, a starting activity of the application, that is, a page displayed on the display of the electronic device when the application is started.

The LaunchMode of the main entry activity of the application may be set to "standard" or "singleTop". In this way, the Dock may use a multi-task (MultiTask) capability in the Android system to start a plurality of instances of the application, and a vendor that develops the application has no additional workload.

It should be noted that if the main entry activity starts an interface of another activity whose launchMode mode is "singleInstance" or "singleTask+specified attribute taskAffinity", the electronic device cannot implement a plurality of instances of the application by using the main entry activity. taskAffinity, that is, task dependency, indicates a name of a task stack required by an activity. By default, names of task stacks required by all activities are package names of applications. In addition, the attribute value of taskAffinity specified by each activity can be different from the package name of the application.

The LaunchMode of the main entry activity of the application may also be set to "singleTask". Considering a high workload of modifying the LaunchMode, an embodiment of the application provides the following two manners.

Manner 1

The application may further specify, by using a configuration item "com.huawei.android.multiwindow.multiinstance.targetactivity" in the configuration file AndroidManifest.xml of the application, that the application supports starting of the multi-instance feature by an entry activity other than the main entry activity, thereby reducing a workload caused by modification of the application. For ease of description, the entry activities other than the main entry activity is referred to as a specified entry activity (referred to as a targetActivity).

In some embodiments, the configuration file AndroidManifest of the application may make a statement by using the following code:

activity
android:name="com.example.demo.MainActivity"
android:resizeableActivity="true">
<meta-data
android:name="com.huawei.android.multiwindow.multiinstance.
targetactivity"

-continued android:value="com.example.demo.SubEntry Activity"
<meta-data>
<intent-filter>
<action android:name="android.intent.action.MAIN"/>
<category android:name="android.intent.category.LAUCHER"/
<intent-filter>
</activity>
<activity
android:name="com.example.demo.SubEntry Activity"
...
</activity>

Manner 2

The multi-instance feature is implemented by the application without depending on the software system of the electronic device.

The application uses the main entry activity as the only external entry of the application. After the main entry activity receives a message (used to indicate a starting intent) sent by the software system of the electronic device, internal management logic of the application triggers starting of the sub-entry activity, so as to start a plurality of instances of the application. The application needs to configure the attribute taskAffinity of the sub-entry activity in the configuration file AndroidManifest.xml of the application, so that the sub-entry activity can be started in different tasks. The sub-entry activity is an entry activity other than the main entry activity. Therefore, the sub-entry activity may also be referred to as a specified entry activity (referred to as a targetActivity).

The application usually reminds the user when a current quantity of tasks reaches a maximum value.

Based on the descriptions in Table 1 and Table 2, for any application, after the application has been started, if the application supports a single-application multi-instance feature, an icon of the application on the Dock interface is in a tappable/draggable state, and the application may be restarted to display a page of the application. After the application is started, if the application does not support the single-application multi-instance feature, the icon of the application on the Dock interface cannot be tapped or dragged (for example, the icon of the application is dimmed or does not respond to the user's tap or drag operation). In this case, the application cannot be started.

The application framework layer provides an application programming interface (API) and a programming framework for an application at the application layer. The application framework layer includes some predefined functions.

As shown in FIG. 2A, the application framework layer may include an activity manager, a package manager, a multi-window task manager, a content provider, a view system, a phone manager, a resource manager, a notification manager, and the like. For ease of description, an example in which the application framework layer includes the activity manager, the package manager, and the multi-window task manager is used for illustration.

The activity manager is configured to manage application task stacks. The activity manager may provide an ActivityManagerService (AMS for short). The AMS is the core service of Android, and is responsible for starting, switching, and scheduling the four components in the software system, and managing and scheduling application processes, and the like.

The package manager is responsible for managing application packages, obtaining application information, and parsing metadata rules.

The multi-window task manager (HwMultiWindowManager) is configured to manage one or more window programs. The multi-window task manager may obtain a size of a display, determine whether there is a status bar, lock the screen, capture the screen, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed on the status bar, an announcement is given, the electronic device vibrates, or the indicator light blinks.

The Android runtime includes a core library and a virtual machine. The Android runtime is responsible for scheduling and management of an Android system.

The core library includes two parts: One part is a function that a java language needs to invoke, and the other part is a core library of the Android system.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An example of an operating process of software and hardware of the electronic device 100 is described below with reference to a scenario in which sound is played by using a smart speaker.

When the touch sensor 180K receives a touch operation, a corresponding hardware interrupt is sent to the kernel layer. The kernel layer processes the touch operation into an original input event (including information such as a touch coordinate and a timestamp of the touch operation). The original input event is stored at the kernel layer. The application framework layer obtains the original input event from the kernel layer, and identifies a control corresponding to the input event. Using that the touch operation is a tap operation, and a control corresponding to the tap operation is a control of a smart speaker icon as an example, an interface at the application framework layer is invoked for a smart speaker application, to start the smart speaker application, then the kernel layer is invoked to start the audio driver, and the speaker 170A converts an audio electrical signal into a sound signal.

It can be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

Based on the foregoing description, for any application (for example, the application 1) in the third-party applications, the electronic device may trigger/start a plurality of instances of the application 1 by using the Dock. This can fully consider a problem that an excessive quantity of single instances causes a resource waste and an excessive quantity of times of invoking the plurality of instances causes an invoking error.

The application 1 has explicitly stated, in the configuration file AndroidManifest.xml of the application 1, that "the application 1 supports a multi-instance feature" and "a starting entry activity of the multi-instance feature that is specified by the application 1". That is, in the configuration file AndroidManifest.xml, "com.huawei.android.multiwindow.multiinistance.enable" is set to "true" and "com.huawei.android.multiwindow.multiinistance.level" is set to "1".

It should be noted that, in addition to using the Dock to trigger/start the function of a single-application multi-instance of the electronic device, the electronic device may also use an application such as a desktop as a starting entry activity of the single-application multi-instance feature.

In an embodiment of the application, the application 1 may perform a coordination operation by using instances in a plurality of window forms, for example, window combination forms such as "split screen+floating window", "full screen+floating window", "floating window+floating window", "left split screen+right split screen", and "left split screen+right split screen+floating window".

Figure 3A:
FIG. 3A to FIG. 3S are schematic diagrams of a human-computer interaction interface according to an embodiment of this application.
Figure 3B:
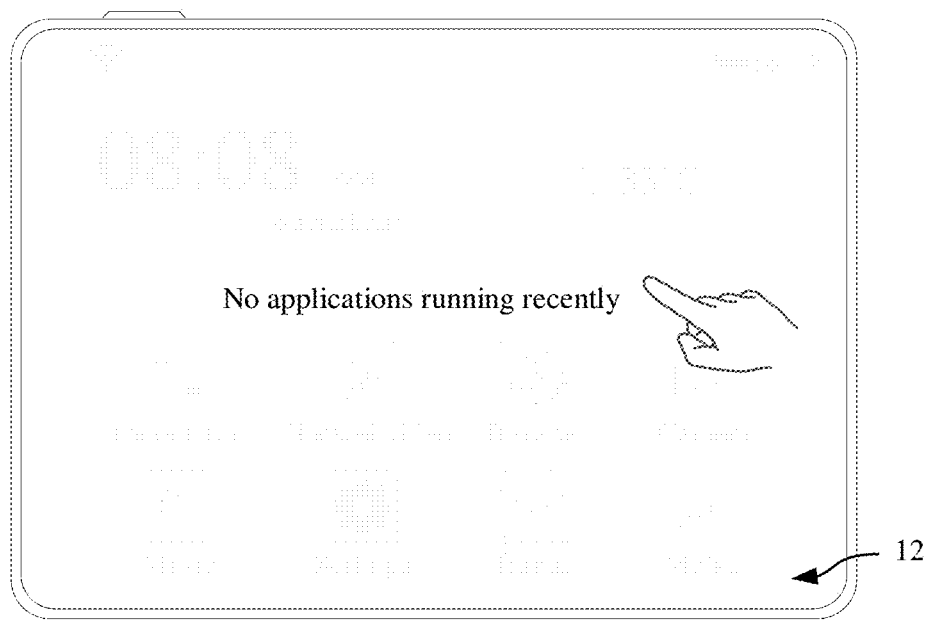
Figure 3A:
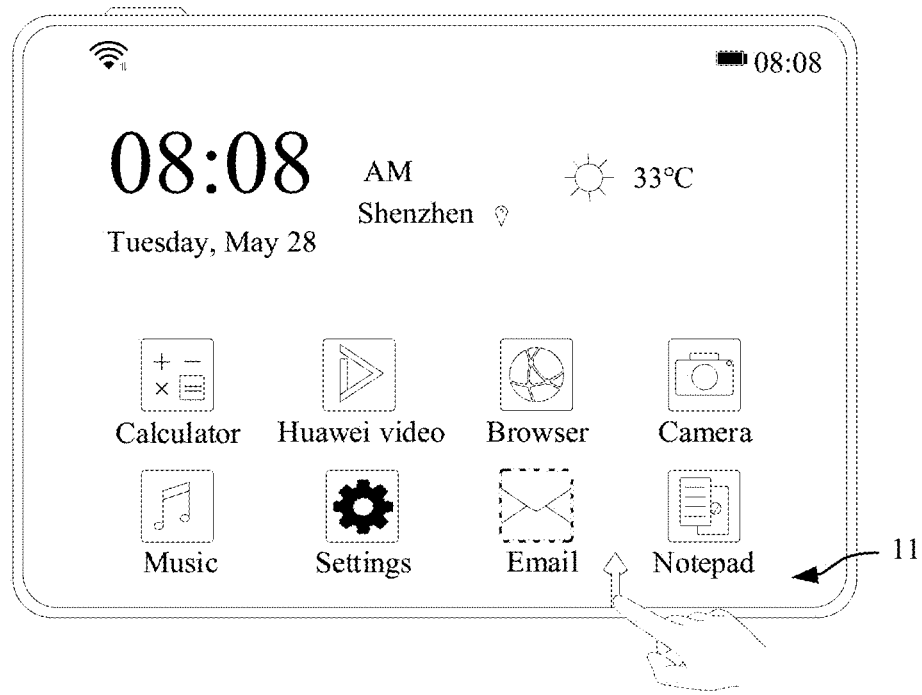
Figure 3B:
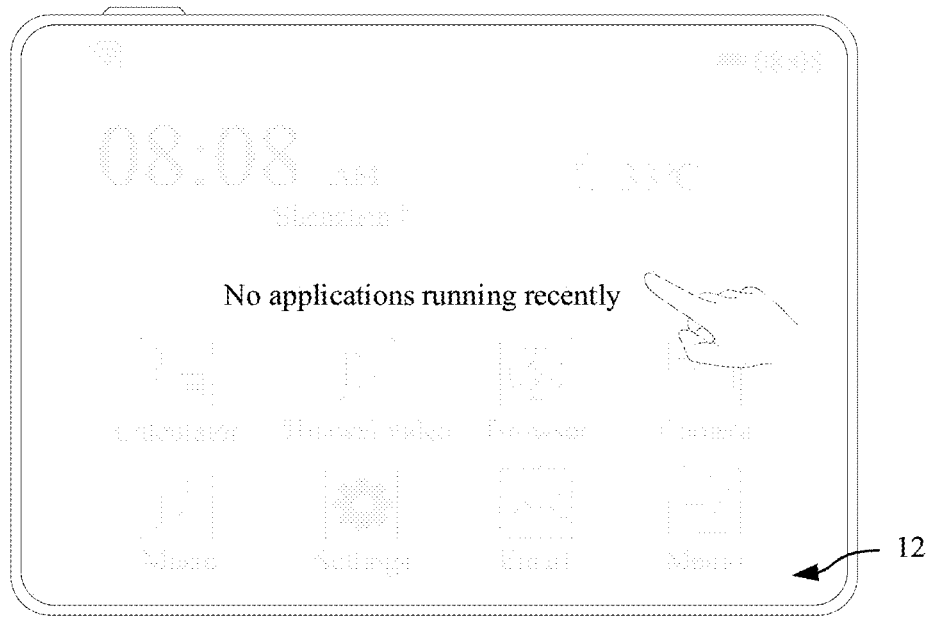
Figure 3C:
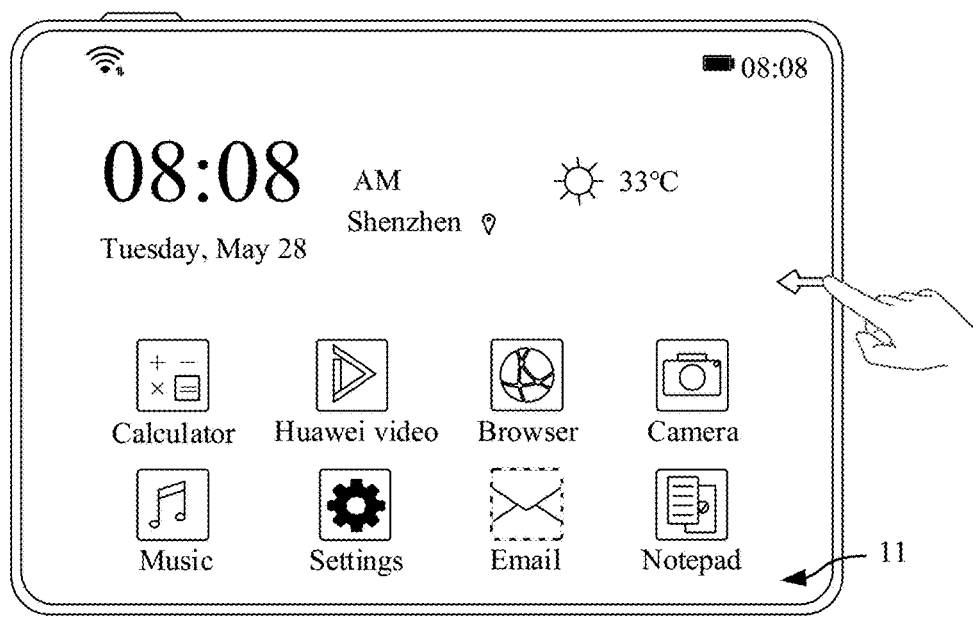
Figure 3D:
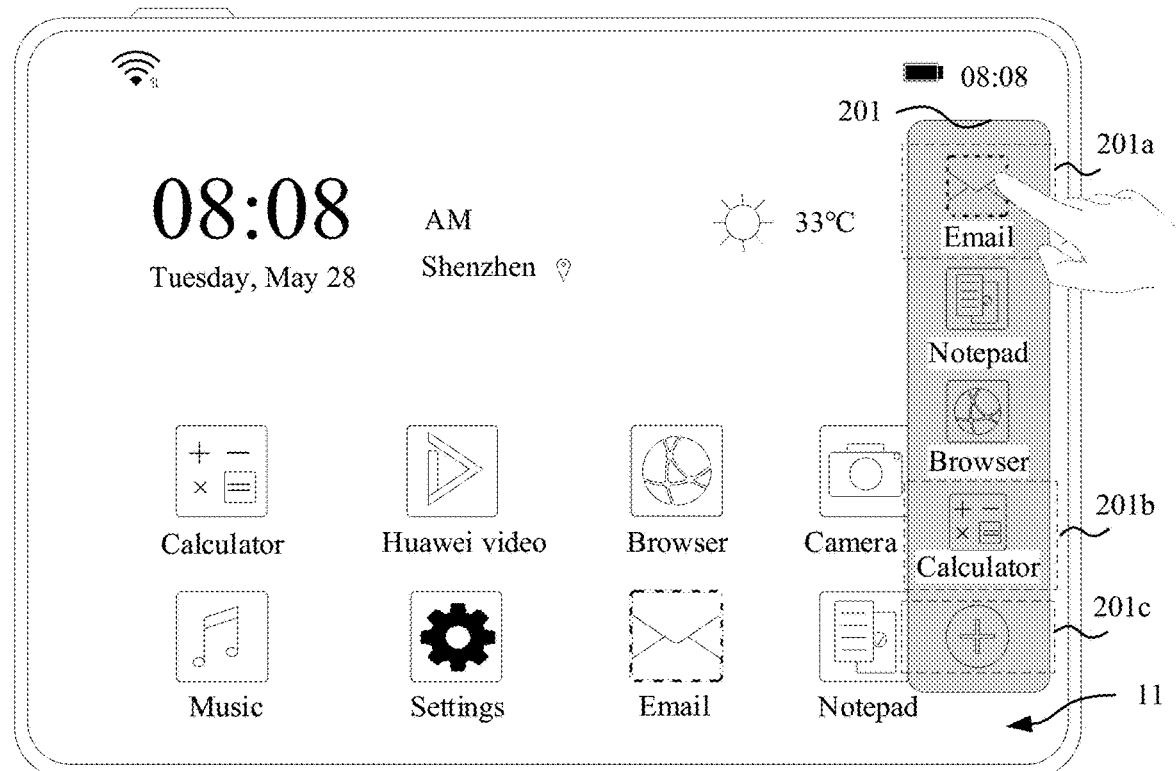
Figure 3E:
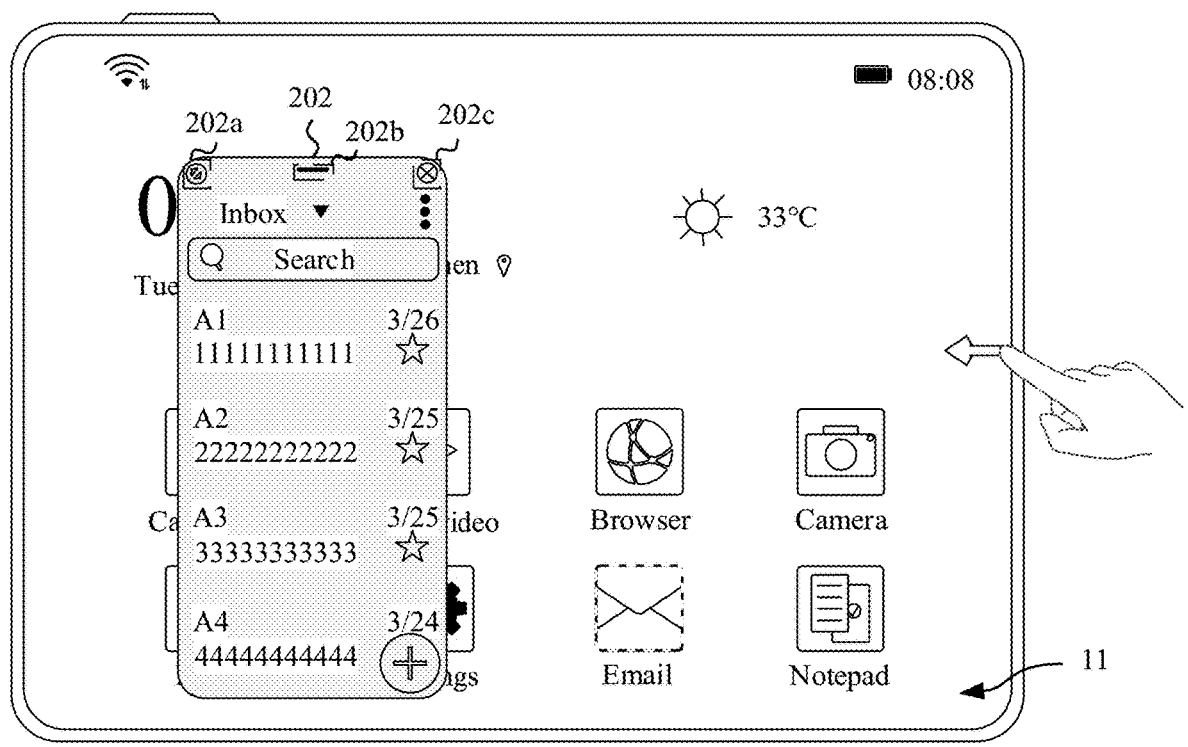
Figure 3F:
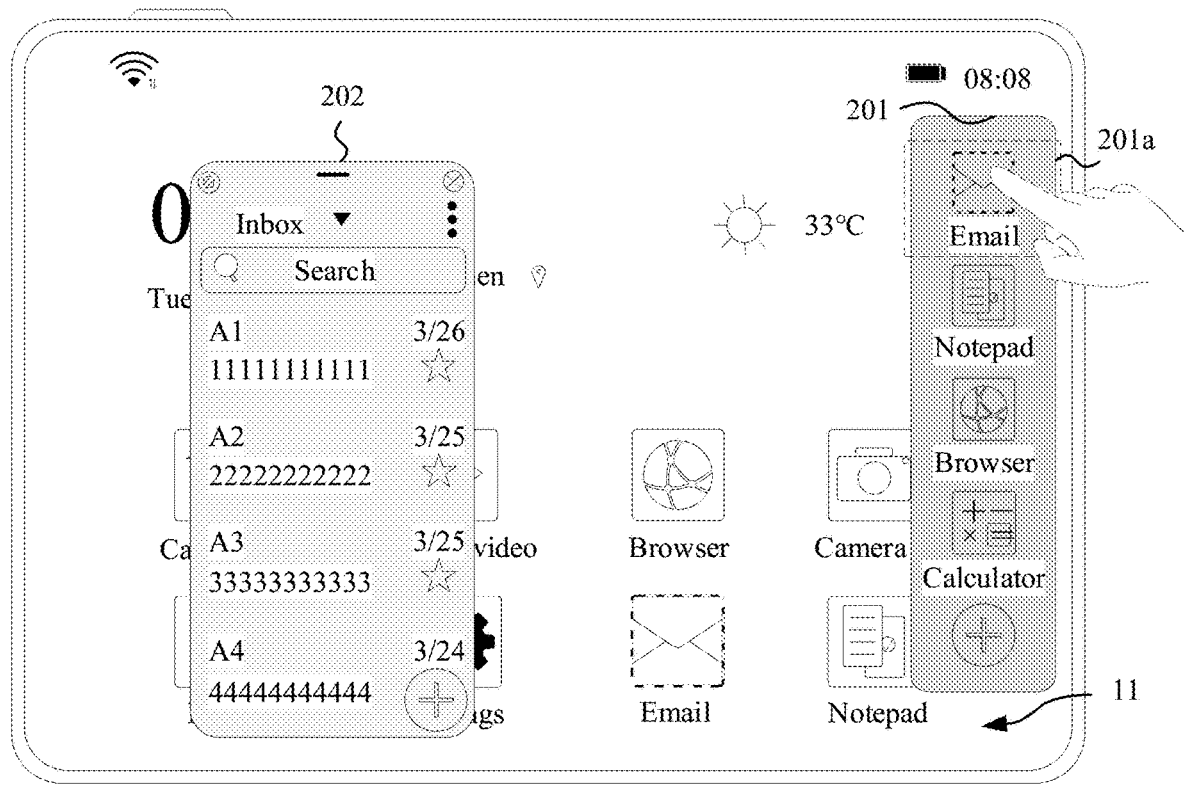
Figure 3G:
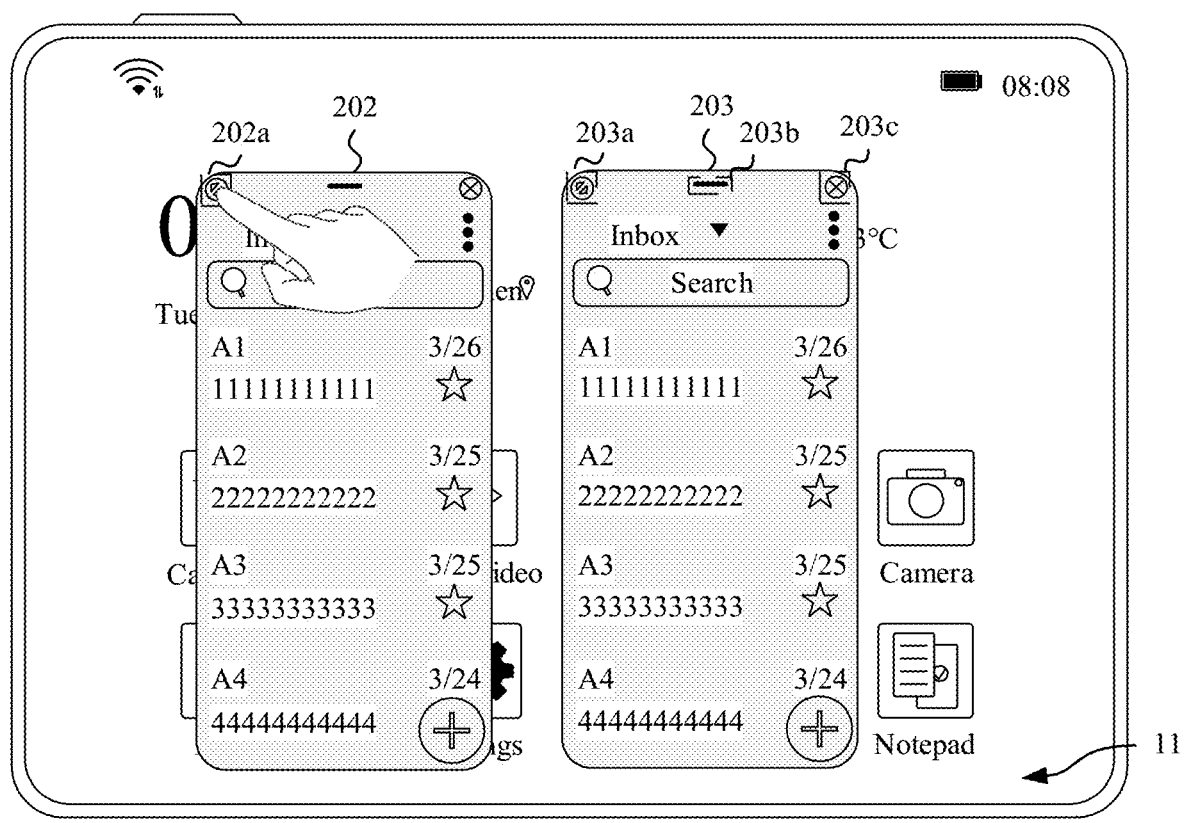
Figure 3H:
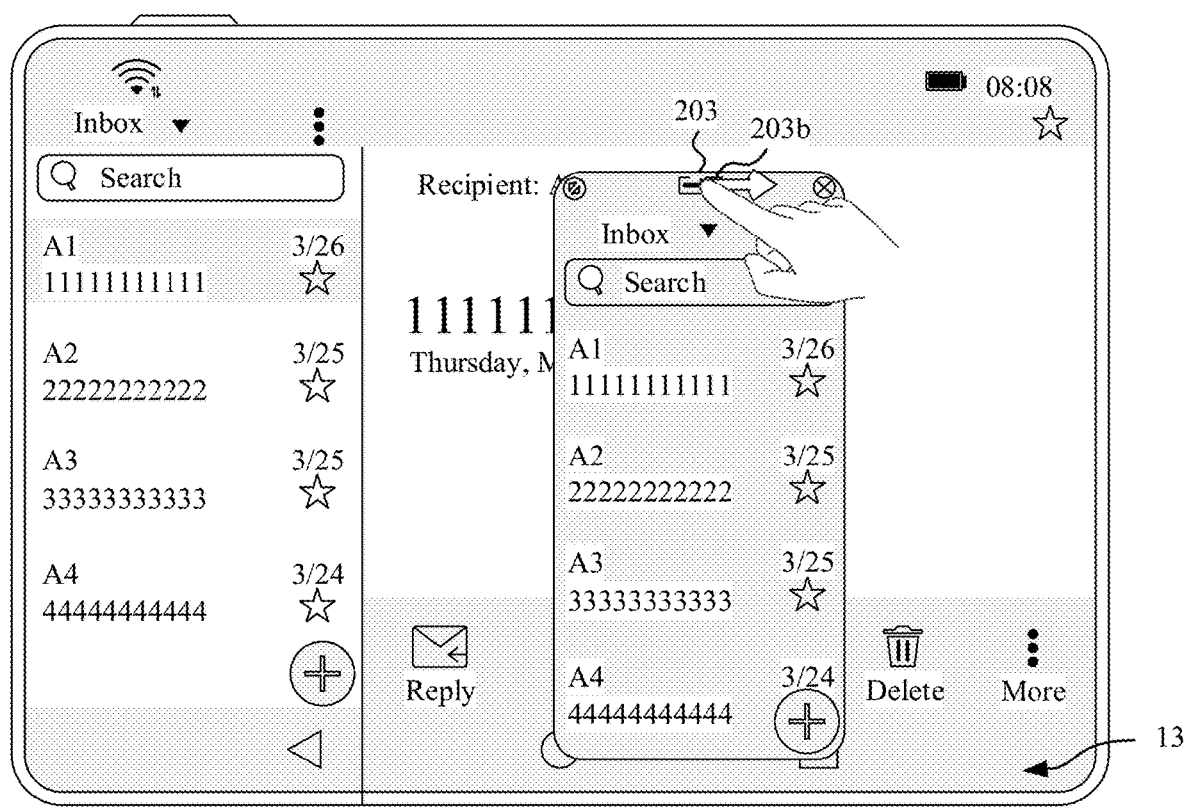
Figure 3I:
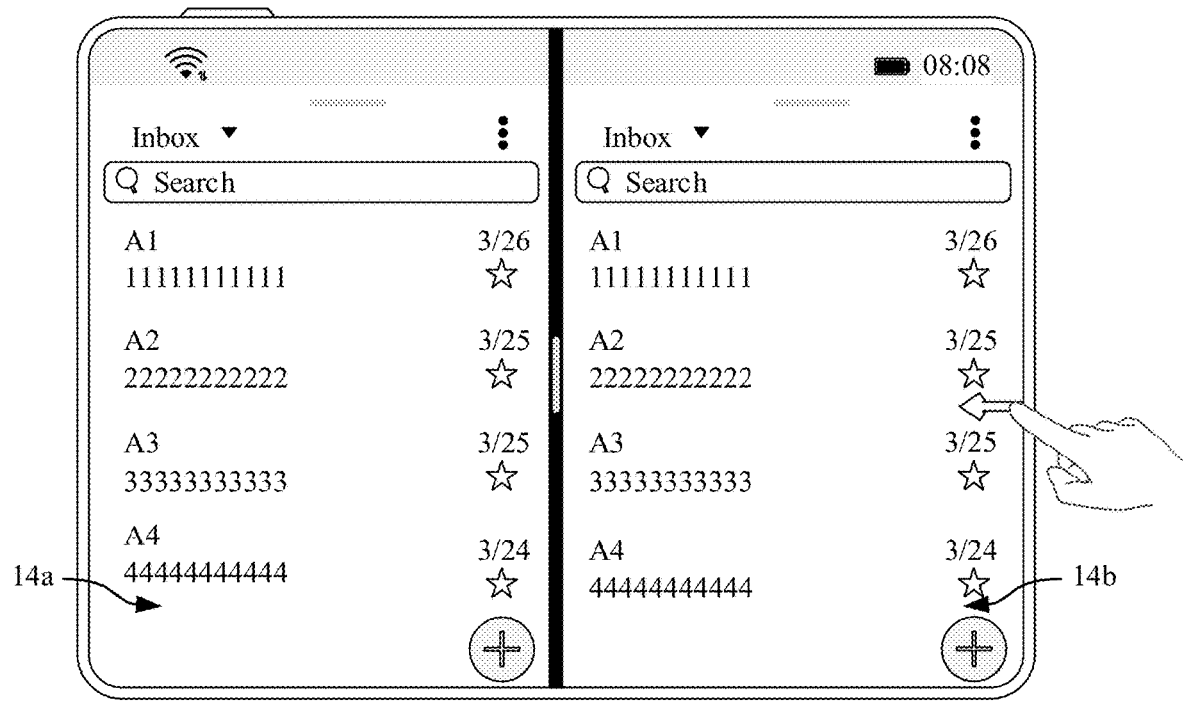
Figure 3J:
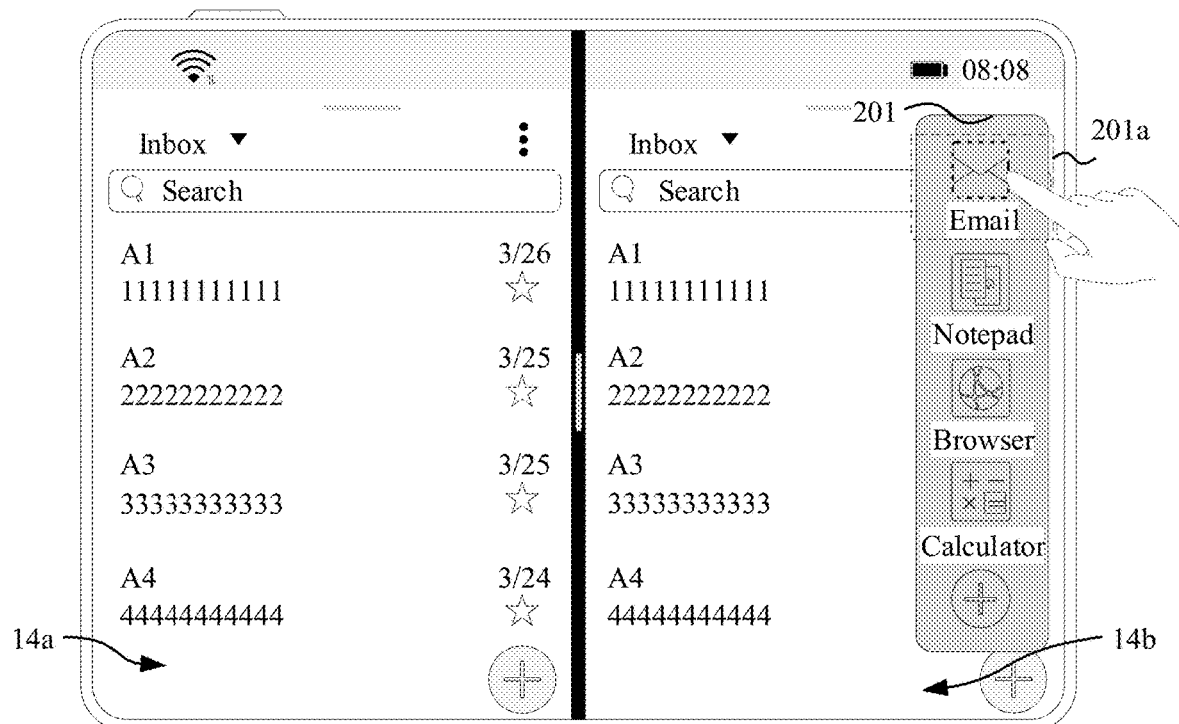
Figure 3K:
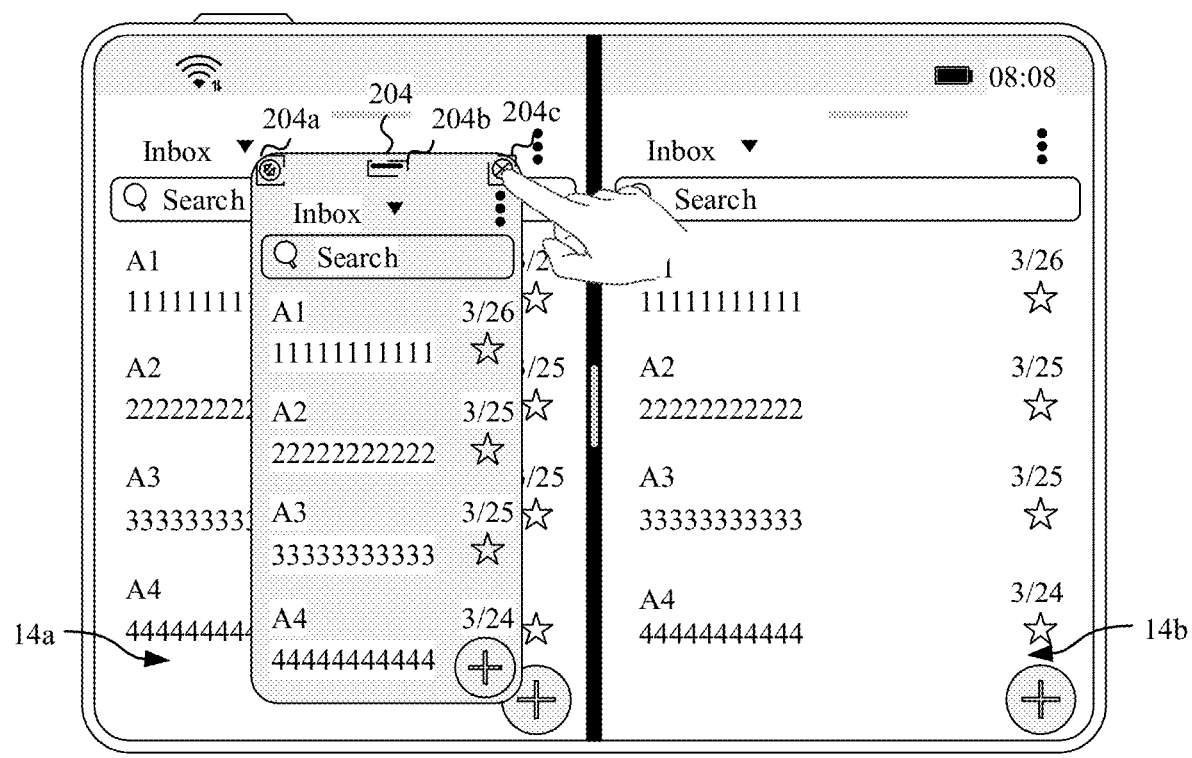
Figure 3L:
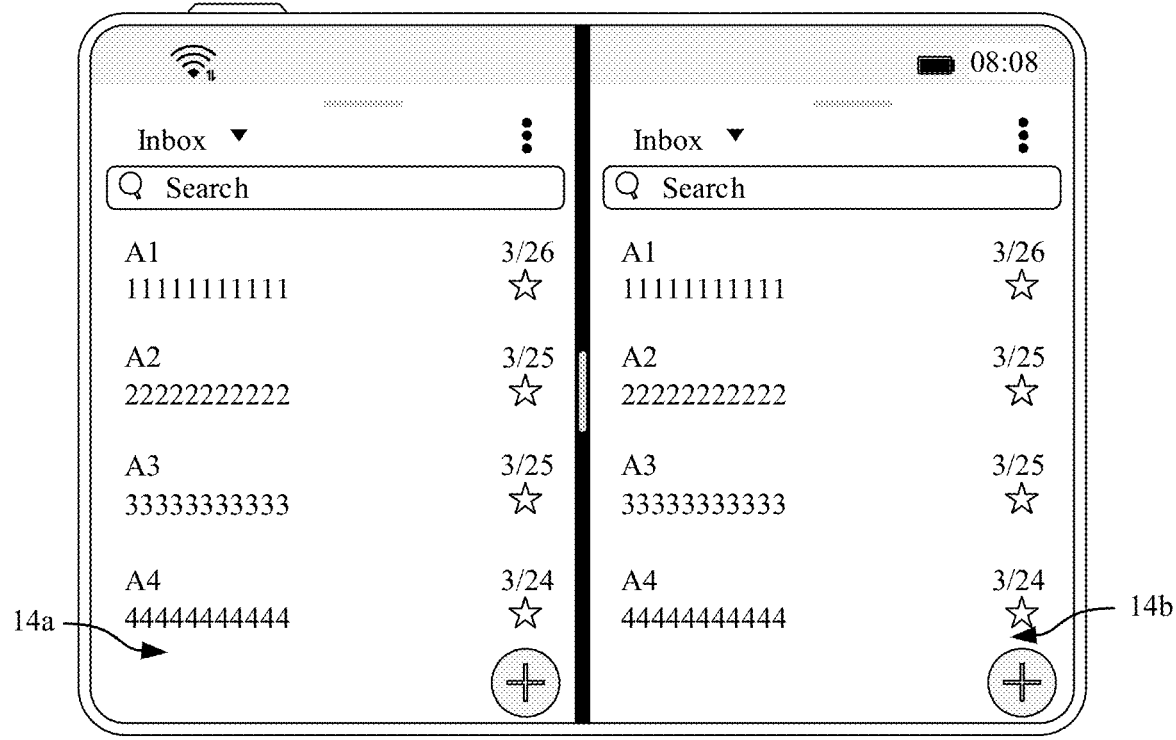
Figure 3M:
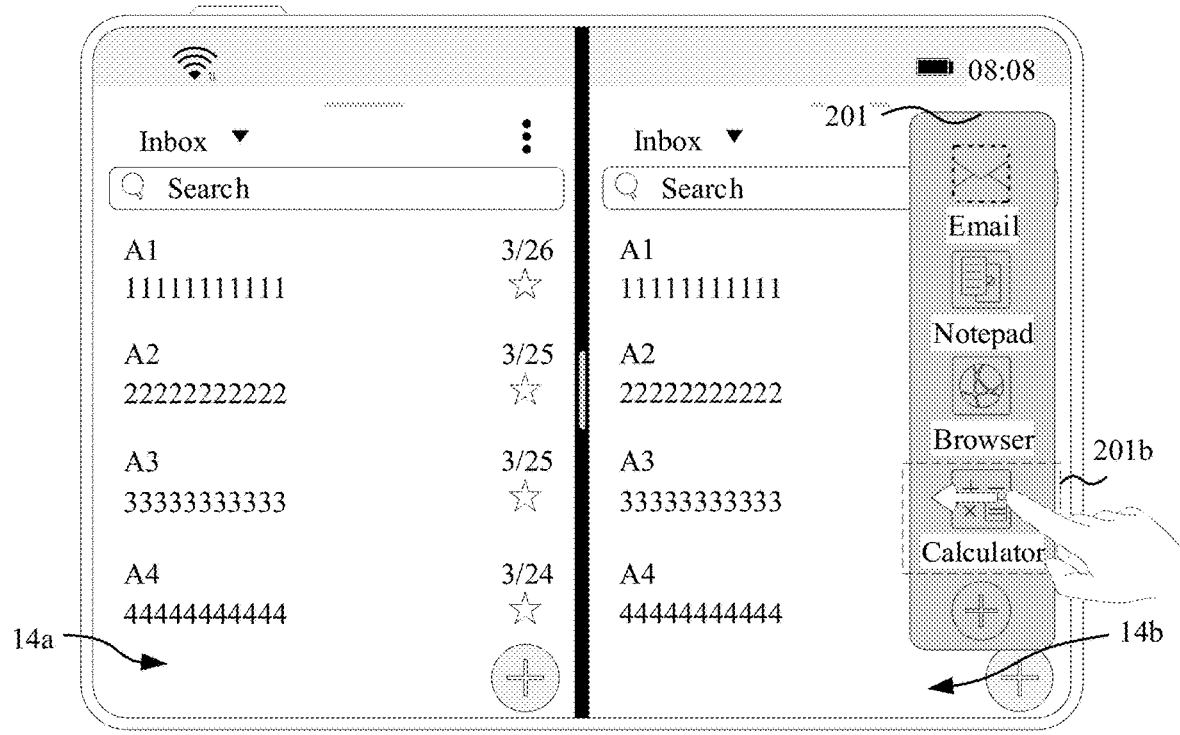
Figure 3N:
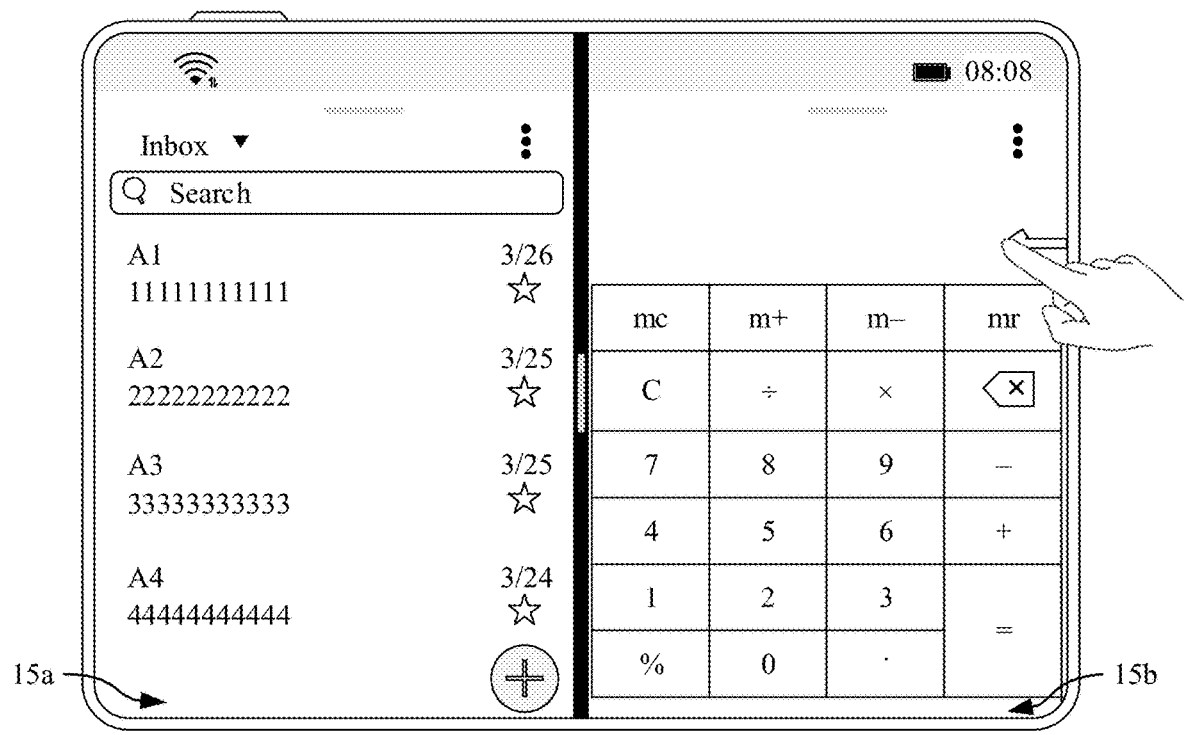
Figure 3O:
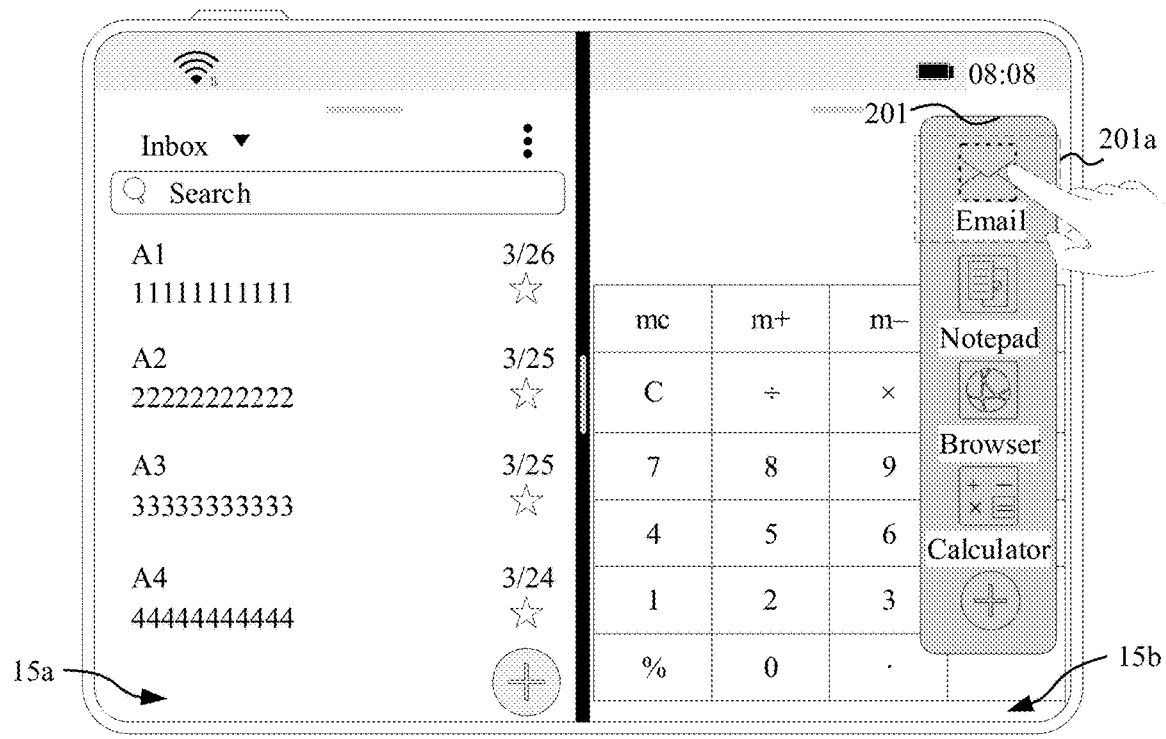
Figure 3P:
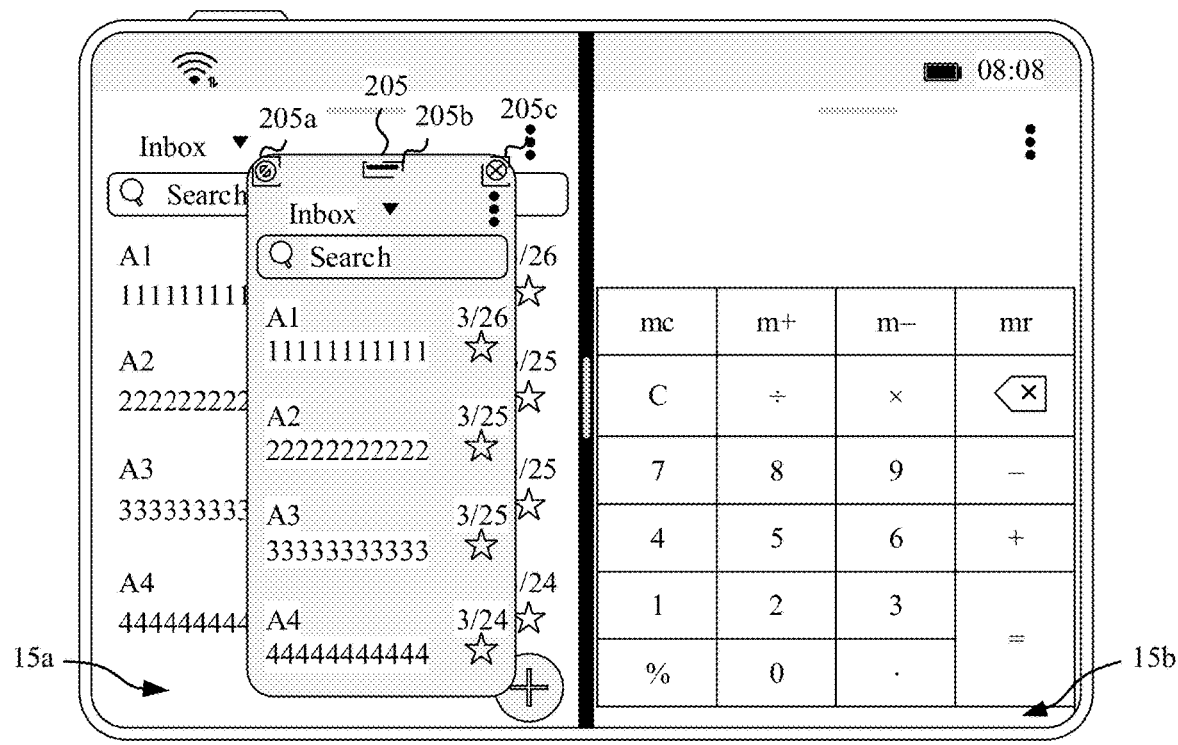
Figure 3Q:
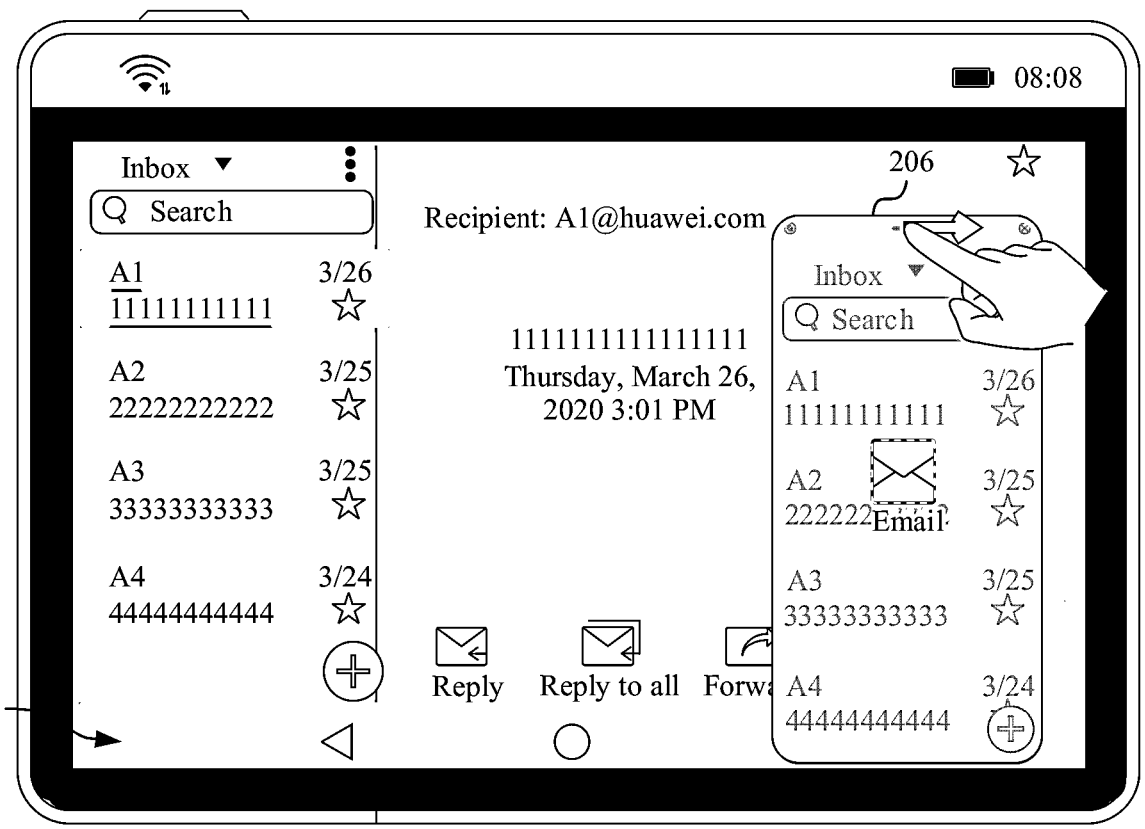
Figure 3R:
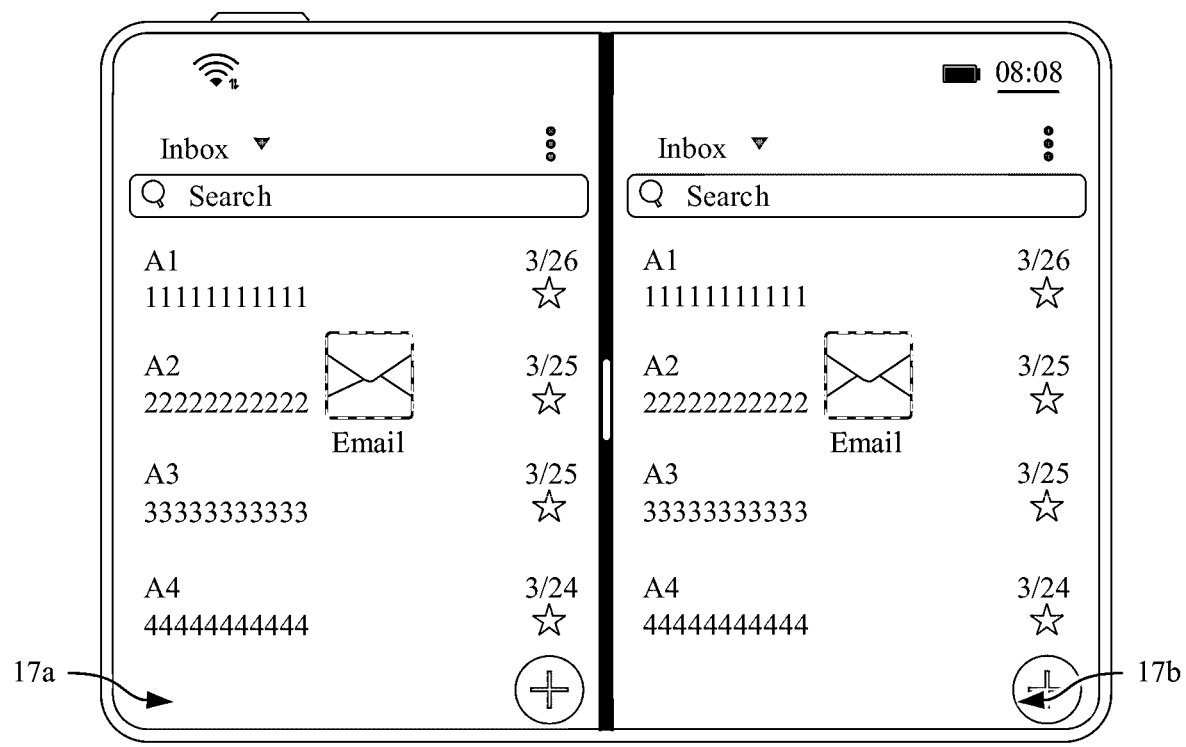
Figure 3S:
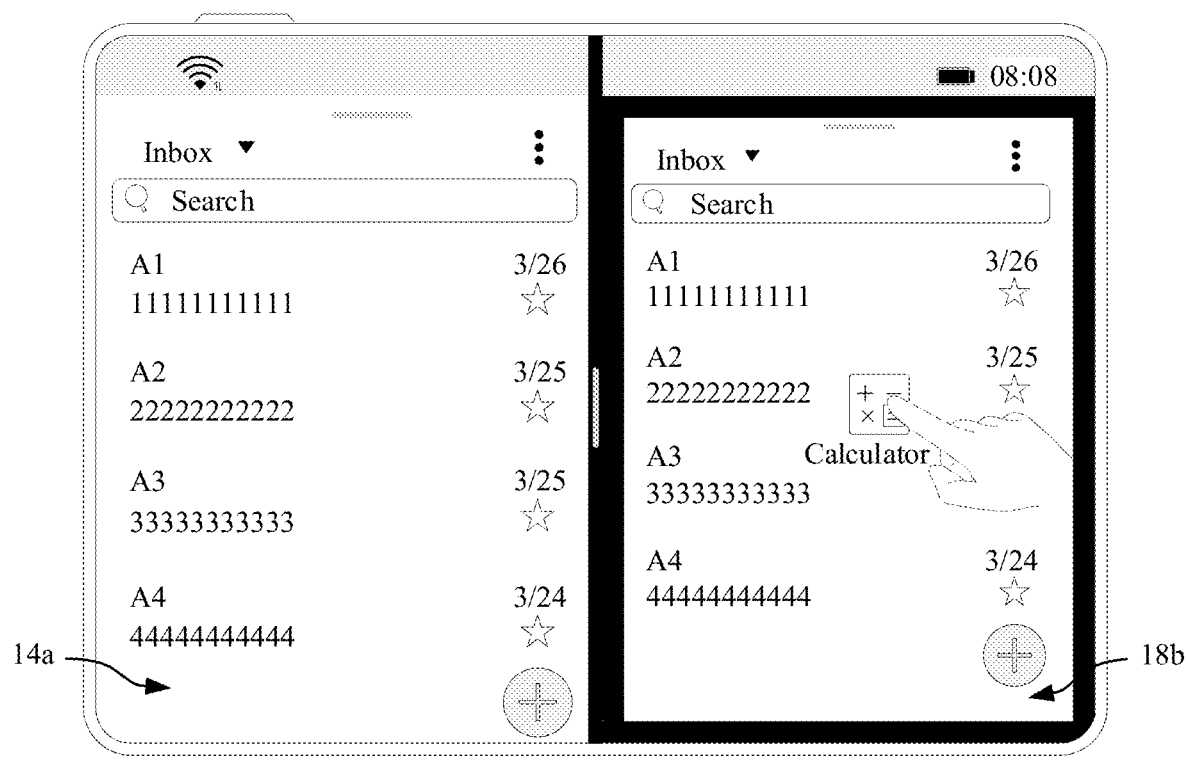

With reference to FIG. 3A to FIG. 3S, the following describes a implementation process in which the Dock starts a plurality of instances of the application 1 in a plurality of window forms. For ease of description, in FIG. 3A to FIG. 3S, an example in which the electronic device is a tablet computer and the application 1 is an email application is used for illustration.

Refer to FIG. 3A to FIG. 3S. FIG. 3A to FIG. 3S are schematic diagrams of human-computer interaction interfaces according to an embodiment of this application.

The tablet computer may display a user interface 11 that is shown in FIG. 3A as an example. The user interface 11 may be a home screen of a desktop. The user interface 11 may include but is not limited to a status bar, a navigation bar, a calendar indicator, a weather indicator, and a plurality of application icons, for example, a calculator application icon, a Huawei video application icon, a browser application icon, a camera application icon, a music application icon, a setting application icon, an email application icon, and a Notepad application icon.

After detecting the operation of opening the multi-task interface that is instructed by the user, the tablet computer may display a user interface 12 shown in FIG. 3B as an example. The user interface 12 may be a current multi-task interface of the tablet computer, that is, indicates whether a background task corresponding to an application exists in a background task list of the tablet computer. In FIG. 3B, if the user interface 12 displays a text "No applications running recently", it may indicate that no application is currently running on the tablet computer, that is, it indicates that no background task corresponding to the application exists in the background task list of the tablet computer.

There may be a plurality of manners in which the user instructs to open a multi-task interface. For example, the user may perform an operation of clicking/tapping a hardware key or a virtual key that is used to open the multi-task interface. For another example, the user may perform an operation of sliding upward from the bottom of the screen, as shown in FIG. 3A. The multi-task interface can be understood as an interface that includes windows corresponding to a plurality of applications that are running on the tablet computer. A plurality of windows on the multi-task interface may be arranged horizontally and in parallel according to a preset sequence policy. In some embodiments, the tablet computer arranges, according to a time sequence for running different applications, windows corresponding to the different applications. In addition, the user may perform, on the multi-task interface, an operation such as deleting, adding, or moving a window corresponding to an application.

After detecting an operation of opening the user interface 11 that is instructed by the user, the tablet computer may change from displaying the user interface 12 shown in FIG. 3B as an example to displaying the user interface 11 shown in FIG. 3C as an example.

The user may open the user interface 11 in a plurality of manners. For example, the user performs an operation of tapping a blank area on the user interface 12. For another example, after detecting no operation of the user within preset duration, the tablet computer may return from the user interface 12 shown in FIG. 3B as an example to the user interface 11 shown in FIG. 3C as an example. A value of the preset duration is not limited in an embodiment of the application.

In conclusion, no application is currently running on the tablet computer. That is, the tablet computer does not start a foreground task corresponding to the email application, and does not run the background task corresponding to the email application, that is, the tablet computer does not start the email application.

It should be noted that an embodiment of the application is not limited to the user interface 12 shown in FIG. 3B as an example. The following describes another implementation of the user interface 12.

For example, the user interface 12 includes a window corresponding to an application other than the email application, that is, it indicates whether a background task corresponding to the application other than the email application exists in the background task list of the tablet computer.

For another example, the user interface 12 includes a window corresponding to the email application, that is, it indicates that a background task corresponding to the email application exists in the background task list of the tablet computer.

For another example, the user interface 12 includes a window corresponding to an application other than the email application and a window corresponding to the email application, that is, it indicates that a background task corresponding to the email application and a background task corresponding to the application other than the email application exist in the background task list of the tablet computer.

One or more background tasks corresponding to the email application may exist in the user interface 12; that is, one or more instances of the email application run in the background of the electronic device, names of activities corresponding to pages displayed when the one or more instances of the email application are started are the same, and IDs of the instances of the activities are different. Pages currently displayed by the one or more instances of the email application may include the same or different content.

In addition, if the electronic device starts another instance of the email application, a name of an activity corresponding to a page displayed when the instance of the email application is started is the same as a name of an activity corresponding to a page displayed when an existing instance of the email application is started, and IDs of the instances of the activities are different. The page displayed when the instance of the email application is started and the page displayed when the existing instance of the email application is started may include the same or different content.

After detecting an operation of opening the Dock that is instructed by the user, the tablet computer may display, on the user interface 11, the Dock interface 201 shown in FIG. 3D as an example. The Dock interface 201 may include but is not limited to icons of a plurality of applications, for example, an icon 201a of an email application, an icon of a Notepad application, an icon of a browser application, an icon 201b of a calculator application, and an adding control 201c.

The icon of the application may be in a tappable/draggable state (for example, normal display), which is used to indicate that the application may support the multi-instance feature, or may be in a non-tappable and non-draggable state (for example, dimmed display or normal display), which is used to indicate that the application does not support the multi-instance feature. For ease of description, in FIG. 3A to FIG. 3P, icons of applications on the Dock interface 201 are in the tappable/draggable state, that is, each application on the Dock interface 201 supports the multi-instance feature, and a plurality of instances of any application on the Dock interface 201 may be started. The adding control 201c may receive an input operation (for example, a tap operation) of the user; and in response to the detected input operation, the tablet computer displays an interface used to add an application.

In an embodiment of the application, parameters such as a layout position (which may be configured based on parameters such as a configuration of the software system and an operation of a user), an interface size, an interface color, and an application icon size of the Dock interface 201 are not limited. In addition, there may be a plurality of operations for instructing the user to open the Dock. For example, the user performs a pause operation after sliding inward from a right side of the screen. Correspondingly, the Dock interface 201 may be displayed at a corresponding position on a right side edge. For another example, the user may perform a click/tap operation on a hardware key or a virtual key that is used to open the Dock.

After the tablet computer detects the operation 1 that is instructed by the user to open the email application on the Dock interface 201, because the tablet computer does not start the email application, the tablet computer may display, based on a type of the operation 1 and a configuration of the software system, any page of the email application in a window form corresponding to the operation 1, to implement an instance (referred to as an instance 1) of the email application.

Different types of the operation 1 indicate different window forms for displaying any page of the email application. A type of the operation 1 is not limited in an embodiment of the application, for example, a tap operation, a drag operation, a touch and hold operation, or a double-tap operation. In some embodiments, if the operation 1 is corresponding to a window form of the floating window, the tablet computer may display, on the user interface 11, a window 202 shown in FIG. 3E as an example. The window 202 may be used to implement the instance 1 of the email application. The window 202 may display any page (for example, a home page) of the email application in the instance 1. The window 202 may include but is not limited to a maximization control 202a, a moving control 202b, a closing control 202c, a search box, and page content.

The maximization control 202a may receive an input operation (for example, a tap operation) of the user; and in response to the detected input operation, the tablet computer may display the window 202 on a full screen. Page content displayed on a full screen of the window 202 may be the same as or different from page content displayed in the floating window 202. The moving control 202b may receive an input operation (for example, a drag operation) of the user; and in response to the detected input operation, the tablet computer may display any page of the moved email application in the instance 1 (for example, display the window 202 in another position, or display the window 202 on a full screen/a split screen). The closing control 202c may receive an input operation (for example, a tap operation) of the user; and in response to the detected input operation, the tablet computer may close the window 202.

Parameters such as a window size, page content, and a window position of the window 202 are not limited in an embodiment of the application. It should be noted that, if the operation 1 is corresponding to a window form of full-screen display, the tablet computer may display any page in any instance of the email application on a full screen.

In this way, the tablet computer may implement an instance of the email application in a window form of a floating window.

It should be noted that, if a background task corresponding to the email application exists in the background task list of the tablet computer, the tablet computer may implement, based on the foregoing content, a plurality of instances of the email application, that is, an instance corresponding to the background task corresponding to the email application and an instance 1; and a name of an activity corresponding to a page displayed when the instance corresponding to the background task corresponding to the email application is started and a name of an activity corresponding to a page displayed when the instance 1 is started are the same, and IDs of the instances of the activities are different. The page displayed when the instance corresponding to the background task corresponding to the email application is displayed and the page displayed when the instance 1 is started may include the same or different content.

After detecting an operation of opening the Dock that is instructed by the user, the tablet computer may display, on the user interface 11, the Dock interface 201 shown in FIG. 3F as an example. For the Dock interface 201, refer to the description shown in FIG. 3D as an example. Details are not described herein again. In addition, a position of the Dock interface 201 shown in FIG. 3F as an example may be the same as or different from a position of the Dock interface 201 shown in FIG. 3D as an example, which may be configured based on parameters such as a configuration of the software system and an operation of a user. For example, when the user invokes the Dock on a same side edge of the tablet computer, the Dock interface 201 may be displayed in a position corresponding to the side edge.

In addition, the window 202 shown in FIG. 3E as an example continues to be displayed on the user interface 11 as shown in FIG. 3F as an example, where the positions of the window 202 in FIG. 3E and FIG. 3F usually remain unchanged. In this way, the tablet computer may further open the Dock when opening the email application.

After detecting an operation 2 that is instructed by the user to open the email application on the Dock interface 201, based on a type of the operation 2 and a configuration of the software system, the tablet computer may display any page of the email application in a window form corresponding to the operation 2, to implement another instance (referred to as an instance 2) of the email application. The instance 2 is different from the instance 1, and names of activities corresponding to pages displayed when the instance 2 and the instance 1 are started are the same, and IDs the instances of the activities are different. Pages displayed when the instance 2 and the instance 1 are started may include the same or different content.

Different types of the operation 2 indicate different window forms for displaying any page of the email application. A type of the operation 2 is not limited in an embodiment of the application, for example, a tap operation, a drag operation, a touch and hold operation, or a double-tap operation.

In some embodiments, if the operation 2 is corresponding to a window form of a floating window, the tablet computer may display, on the user interface 11, a window 203 shown in FIG. 3G as an example. The window 203 may be used to implement the instance 2 of the email application. The window 203 may display any page (for example, a home page) of the email application in the instance 2. A name of an activity corresponding to the page is the same as a name of an activity corresponding to a page displayed when the instance 1 is started, and IDs of the instances of the activities are different. The window 202 may include but is not limited to a maximization control 203a (that is, a first control), a moving control 203b, a closing control 203c (that is, a second control), a search box, and page content.

The maximization control 203a may receive an input operation (for example, a tap operation) of the user; and in response to the detected input operation, the tablet computer displays the window 203 on a full screen. Page content displayed on a full screen of the window 203 may be the same as or different from page content displayed in the floating window 203. The moving control 203b may receive an input operation (for example, a drag operation) of the user; and in response to the detected input operation, the tablet computer may display any page of the moved email application in the instance 2 (for example, display the window 203 in another position, or display the window 203 on a full screen/a split screen). The closing control 203c may receive an input operation (for example, a tap operation) of the user; and in response to the detected input operation, the tablet computer may close the window 203.

Parameters such as a window size, page content, and a window position of the window 203 are not limited in an embodiment of the application. In addition, parameters such as a window size, page content, and a window position of the window 202 and the window 203 may be the same or different. This is not limited in an embodiment of the application. It should be noted that, if the operation 2 is corresponding to a window form of full-screen display, the tablet computer may display a page of the email application in the instance 1 in a floating window, and at the same time, display a page of the email application in the instance 2 on a full screen, so that the tablet computer implements two instances of the email application in a window combination form of "full screen+floating window". If the operation 2 is corresponding to a window form of split-screen display, the tablet computer may display a page of the email application in the instance 1 and a page of the email application in the instance 2 in split screens, so that the tablet computer implements two instances of the email application in a window combination form of "left split screen+right split screen".

In addition, the tablet computer may continue to display, on the user interface 11, the window 202 shown in FIG. 3G as an example. In this way, the tablet computer may display a page of the email application in the instance 1 in a floating window, and at the same time, display a page of the email application in the instance 2 in a floating window, so that the tablet computer implements two instances of the email application in a window combination form of "floating window+floating window".

It should be noted that, the electronic device may further implement three or more instances of the email application by referring to the description about implementing two instances (the instance 1 and the instance 2) of an email application by the electronic device. For example, when a background task corresponding to the email application exists in the background task list of the tablet computer, the tablet computer may implement, based on the foregoing content, the instance corresponding to the background task corresponding to the email application, the instance 1, and the instance 2. In addition, an embodiment of the application includes but is not limited to the foregoing implementation for implementing, by the tablet computer, a plurality of instances of the email application in a window combination form of "floating window+floating window".

After detecting an operation input by the user on the maximization control 202a of the window 202, the tablet computer may change the window 202 to display, on the user interface 11, the user interface 13 shown in FIG. 3H as an example, so that the user interface 13 covers the user interface 11, and the window 202 does not continue to be displayed. The user interface 13 may be used to implement the instance 1 of the email application. The user interface 13 may display any page (for example, a home page) of the email application in the instance 1. A name of an activity corresponding to the page is the same as a name of an activity corresponding to a page displayed when the instance 1 is started, and IDs of the instances of the activities are different.

An embodiment of the user interface 13 is not limited in an embodiment of the application. In addition, page content in the window 202 may overlap or may not overlap with that on the user interface 13.

In addition, the tablet computer may display, on the user interface 13, the window 203 shown in FIG. 3H as an example. In this way, the tablet computer may display a page of the email application in the instance 1 on a full screen, and at the same time, display a page of the email application in the instance 2 in a floating window, so that the tablet computer implements two instances of the email application in a window combination form of "full screen+floating window".

It should be noted that an embodiment of the application includes but is not limited to the foregoing implementation for implementing, by the tablet computer, a plurality of instances of the email application in a window combination form of "full screen+floating window".

After detecting an operation input by the user on the moving control 203b of the window 203, the tablet computer may move the window 203, and display a user interface 16 and a window 206 that are shown in FIG. 3Q as an example. The user interface 16 is a thumbnail of the user interface 13, and is used to display the display content of an email application corresponding to the user interface 13. The user interface 16 is illustrated by using an example in which a thumbnail of the user interface 13 is displayed in a rectangular ring. The window 206 is a thumbnail of the window 203, and is used to display the display content of the email application corresponding to the window 203. The window 206 is illustrated by using an example in which an icon of the email application is displayed in a rounded rectangular box.

After detecting that a finger of the user leaves the pressed window 206 on the right side of the display area of the tablet computer, the tablet computer may change from displaying a user interface 17a and a user interface 17b shown in FIG. 3R as an example to displaying a user interface 14a and a user interface 14b shown in FIG. 3I as an example. The user interface 17a is displayed on a left split screen and the user interface 17b is displayed on a right split screen, to indicate that two instances of the email application are displayed on a left split screen and a right split screen. For ease of description, the icon of the email application is used in both the user interface 17a and the user interface 17b as an example for illustration. In this way, the user interface 14a is displayed on a left split screen, and the user interface 14b is displayed on a right split screen. In addition, after it is detected that the finger of the user leaves the pressed window 206 on the left side of the display area of the tablet computer, the user interface 17a is displayed on a right split screen and the user interface 17b is displayed on a left split screen, so that the user interface 14a may also be displayed on a right split screen and the user interface 14b may be displayed on a left split screen. This is not limited in an embodiment of the application. The user interface 14a may be used to implement the instance 1 of the email application, and the user interface 14a may display any page (for example, a home page) of the email application in the instance 1. The user interface 14b may be used to implement the instance 2 of the email application, and the user interface 14b may display any page (for example, a home page) of the email application in the instance 2. In addition, a name of an activity corresponding to any page of the email application in the instance 1 is the same as a name of an activity corresponding to any page of the email application in the instance 2, and IDs of the instances of the activities are different.

An embodiment of the user interface 14a and the user interface 14b are not limited in an embodiment of the application. In addition, page content on the user interface 14a may overlap or may not overlap with that on the user interface 13. The page content on the user interface 14b may overlap or not overlap with that in the window 203.

In this way, the tablet computer may display a page of the email application in the instance 1 on a left split screen, and at the same time, display a page of the email application in the instance 2 on a right split screen, so that the tablet computer implements two instances of the email application in a window combination form of "left split screen+right split screen".

It should be noted that an embodiment of the application includes but is not limited to the foregoing implementation for implementing, by the tablet computer, a plurality of instances of the email application in a window combination form of "left split screen+right split screen".

After detecting an operation of opening the Dock that is instructed by the user, the tablet computer may display, on the user interface 14b, the Dock interface 201 shown in FIG. 3J as an example. For the Dock interface 201, refer to the description shown in FIG. 3D or FIG. 3F as an example. Details are not described herein again. In addition, a position of the Dock interface 201 shown in FIG. 3J as an example may be the same as or different from a position of the Dock interface 201 shown in FIG. 3D or FIG. 3F as an example, which may be specifically configured based on parameters such as a configuration of the software system and an operation of a user. For example, when the user invokes the Dock on a same side edge of the tablet computer, the Dock interface 201 may be displayed in a position corresponding to the side edge.

After detecting an operation 3 that is instructed by the user to open the email application on the Dock interface 201, based on a type of the operation 3 and a configuration of the software system, the tablet computer may display any page of the email application in a window form corresponding to the operation 3, to implement another instance (referred to as an instance 3) of the email application. The instance 3 is different from both the instance 2 and the instance 1. Names of activities corresponding to pages displayed when the instance 3, the instance 2, and the instance 1 are started are the same, and IDs of the instances of the activities are different. Pages displayed when the instance 3, the instance 2, and the instance 1 are started may include the same or different content.

Different types of the operation 3 indicate different window forms for displaying any page of the email application. A type of the operation 3 is not limited in an embodiment of the application, for example, a tap operation, a drag operation, a touch and hold operation, or a double-tap operation.

In some embodiments, if the operation 3 is corresponding to a window form of a floating window, the tablet computer may display, on the user interface 14a, a window 204 shown in FIG. 3K as an example. The window 204 may be used to implement the instance 3 of the email application. The window 204 may display any page (for example, a home page) of the email application in the instance 3. A name of an activity corresponding to the page is the same as names of activities corresponding to pages displayed when the instance 1 and the instance 2 are started, and IDs of the instances of the activities are different. The window 204 may include but is not limited to a maximization control 204a, a moving control 204b, a closing control 204c, a search box, and page content.

The maximization control 204a may receive an input operation (for example, a tap operation) of the user; and in response to the detected input operation, the tablet computer displays the window 204 on a full screen. Page content displayed on a full screen of the window 204 may be the same as or different from page content displayed in the floating window 204. The moving control 204b may receive an input operation (for example, a drag operation) of the user; and in response to the detected input operation, the tablet computer may display any page of the moved email application in the instance 3 (for example, display the window 204 in another position, or display the window 204 on a full screen/a split screen). The closing control 204c may receive an input operation (for example, a tap operation) of the user; and in response to the detected input operation, the tablet computer may close the window 204.

In an embodiment of the application, parameters such as a window size, page content, and a window position (in addition to the user interface 14a, the window 204 may be on the user interface 14a and the user interface 14b, or may be on the user interface 14b) of the window 204 are not limited. In addition, parameters such as a window size, page content, and a window position of the window 202, the window 203, and the window 204 may be the same or different. This is not limited in an embodiment of the application. It should be noted that, if the operation 3 is corresponding to a window form of split-screen/full-screen display, the tablet computer may display a page of the email application in the instance 3 on a split screen/a full screen.

In this way, the tablet computer may display a page of the email application in the instance 1 on a left split screen, and at the same time, display a page of the email application in the instance 2 on a right split screen, and at the same time, display an application of the email application in the instance 3 in the floating window, so that the tablet computer implements three instances of the email application in a window combination form "floating window+left split screen+right split screen".

It should be noted that an embodiment of the application includes but is not limited to the foregoing implementation for implementing, by the tablet computer, a plurality of instances of the email application in a window combination form of "floating window+left split screen+right split screen".

After detecting an operation input by the user on the closing control 204c of the window 204, the tablet computer may close the window 204, so that the tablet computer displays the user interface 14a and the user interface 14b shown in FIG. 3L as an example; that is, the instance 3 of the email application is closed, and the instance 1 and the instance 2 of the email application are running. For the user interface 14a and the user interface 14b, refer to the description of the example shown in FIG. 3J. Details are not described herein again.

After detecting an operation of opening the Dock that is instructed by the user, the tablet computer may display, on the user interface 14b, the Dock interface 201 shown in FIG. 3M as an example. For the Dock interface 201, refer to the description shown in FIG. 3D, FIG. 3F, or FIG. 3J as an example. Details are not described herein again. In addition, a position of the Dock interface 201 shown in FIG. 3M as an example may be the same as or different from a position of the Dock interface 201 shown in FIG. 3D, FIG. 3F, or FIG. 3J as an example, which may be configured based on parameters such as a configuration of the software system and an operation of a user. For example, when the user invokes the Dock on a same side edge of the tablet computer, the Dock interface 201 may be displayed in a position corresponding to the side edge.

After detecting an operation 4 that is instructed by the user to open the calculator application on the Dock interface 201, the tablet computer may display, based on a type of the operation 4 and a configuration of the software system, any page of the calculator application in a window form corresponding to the operation 4, to implement an instance of the calculator application.

Different types of the operation 4 indicate different window forms for displaying any page of the calculator application. A type of the operation 4 is not limited in an embodiment of the application, for example, a tap operation, a drag operation, a touch and hold operation, or a double-tap operation.

In some embodiments, if the operation 4 is corresponding to a window form of a split screen, the tablet computer may display the user interface 14a and the user interface 18b that are shown in FIG. 3S as an example. The user interface 18b includes a thumbnail of the user interface 14b and an icon of a computer application, and is used to display the display content of an email application corresponding to the user interface 14b and indicate that the display content of the computer application is used to replace the display content of the email application corresponding to the user interface 14b, that is, an instance (that is, the instance 3) of the email application that is run by the tablet computer in the background. Correspondingly, the instance of the email application is referred to as a background task of the email application.

After detecting that the finger of the user leaves the right side of the display area of the tablet computer, the tablet computer may display the user interface 15a and the user interface 15b that are shown in FIG. 3N as an example, so that the user interface 15a is displayed on a left split screen and the user interface 15b is displayed on a right split screen. In addition, after the finger of the user leaves the left side of the display area of the tablet computer, the user interface 15a may also be displayed on a right split screen and the user interface 15b may be displayed on a left split screen. This is not limited in an embodiment of the application.

The user interface 15a may be used to implement an instance (for example, the instance 1 or the instance 2) of the email application, and the user interface 15a may display any page (for example, a home page) of the email application in the instance. The user interface 15b may be used to implement an instance of the calculator application, and the user interface 15b may display any page (for example, a home page) of the calculator application in the instance.

An embodiment of the user interface 15a and the user interface 15b are not limited in an embodiment of the application. In addition, page content on the user interface 15a may overlap or may not overlap that on the user interface 14a or the user interface 14b.

In this way, the tablet computer may display a page of an email application in an instance on a left split screen, and at the same time, display a page of a calculator application in an instance on a right split screen, and run another instance of the email application in the background, so that the tablet computer may display the email application and the computer application on a left split screen and a right split screen.

After detecting an operation of opening the Dock that is instructed by the user, the tablet computer may display, on the user interface 15b, the Dock interface 201 shown in FIG. 3O as an example. For the Dock interface 201, refer to the description shown in FIG. 3D, FIG. 3F, FIG. 3J, or FIG. 3M as an example. Details are not described herein again. In addition, a position of the Dock interface 201 shown in FIG. 3O as an example may be the same as or different from a position of the Dock interface 201 shown in FIG. 3D, FIG. 3F, FIG. 3J, or FIG. 3M as an example, which may be configured based on parameters such as a configuration of the software system and an operation of a user. For example, when the user invokes the Dock on a same side edge of the tablet computer, the Dock interface 201 may be displayed in a position corresponding to the side edge.

After detecting an operation 5 that is instructed by the user to open the email application on the Dock interface 201, the tablet computer may display, based on a type of the operation 5 and a configuration of the software system, any page of the email application in a window form corresponding to the operation 5, to implement an instance of the email application.

Different types of the operation 5 indicate different window forms for displaying any page of the email application. A type of the operation 5 is not limited in an embodiment of the application, for example, a tap operation, a drag operation, a touch and hold operation, or a double-tap operation.

In some embodiments, if the operation 5 is corresponding to a window form of a floating window, the tablet computer may display, on the user interface 15a, the window 205 shown in FIG. 3P as an example. The window 205 may be used to implement the instance 4 of the email application. Names of activities corresponding to pages displayed when the instance 4, the instance 3, the instance 2, and the instance 1 are started are the same, and IDs of the instances of the activities are different. Pages displayed when the instance 4, the instance 3, the instance 2, and the instance 1 are started may include the same or different content. The window 205 may display any page (for example, a home page) of the email application in the instance 4. A name of an activity corresponding to the page is the same as names of activities corresponding to pages displayed when the instance 1, the instance 2, and the instance 3 are started, and IDs of the instances of the activities are different. The window 205 may include but is not limited to a maximization control 205a, a moving control 205b, a closing control 205c, a search box, and page content.

The maximization control 205a may receive an input operation (for example, a tap operation) of the user; and in response to the detected input operation, the tablet computer displays the window 205 on a full screen. Page content displayed on a full screen of the window 205 may be the same as or different from page content displayed in the floating window 205. The moving control 205b may receive an input operation (for example, a drag operation) of the user; and in response to the detected input operation, the tablet computer may display any page of the moved email application in the instance 4 (for example, display the window 205 in another position, or display the window 205 on a full screen/a split screen). The closing control 205c may receive an input operation (for example, a tap operation) of the user; and in response to the detected input operation, the tablet computer may close the window 205.

In an embodiment of the application, parameters such as a window size, page content, and a window position (in addition to the user interface 15a, the window 205 may be on the user interface 15a and the user interface 15b, or may be on the user interface 15b) of the window 205 are not limited. In addition, parameters such as a window size, page content, and a window position of the window 202, the window 203, the window 204, and the window 205 may be the same or different. This is not limited in an embodiment of the application. It should be noted that, if the operation 5 is corresponding to a window form of split-screen/full-screen display, the tablet computer may display a page of the email application in the instance 4 on a split screen/a full screen.

In this way, the tablet computer may display a page of the email application in the instance 1 or the instance 2 on a left split screen, and at the same time, display an application of the email application in the instance 4 in a floating window, so that the tablet computer implements three instances of the email application in a window combination form of "floating window+split screen". The three instances mentioned herein are respectively the instance 1 and the instance 4 of the email application displayed by the tablet computer, and the instance 2 of the email application running in the background of the tablet computer. Alternatively, the three instances mentioned herein are respectively the instance 2 and the instance 4 of the email application displayed by the tablet computer, and the instance 1 of the email application running in the background of the tablet computer.

It should be noted that an embodiment of the application includes but is not limited to the foregoing implementation for implementing, by the tablet computer, a plurality of instances of the email application in a window combination form of "floating window+split screen". In addition, the implementation sequence of the window combination forms of "split screen+floating window", "full screen+floating window", "floating window+floating window", "left split screen+right split screen", and "left split screen+right split screen+floating window" is not limited, and there is no necessary association between the window combination forms.

In addition, the electronic device includes but is not limited to an execution sequence of the foregoing manner to display a plurality of instances of any application.

Figure 4A:
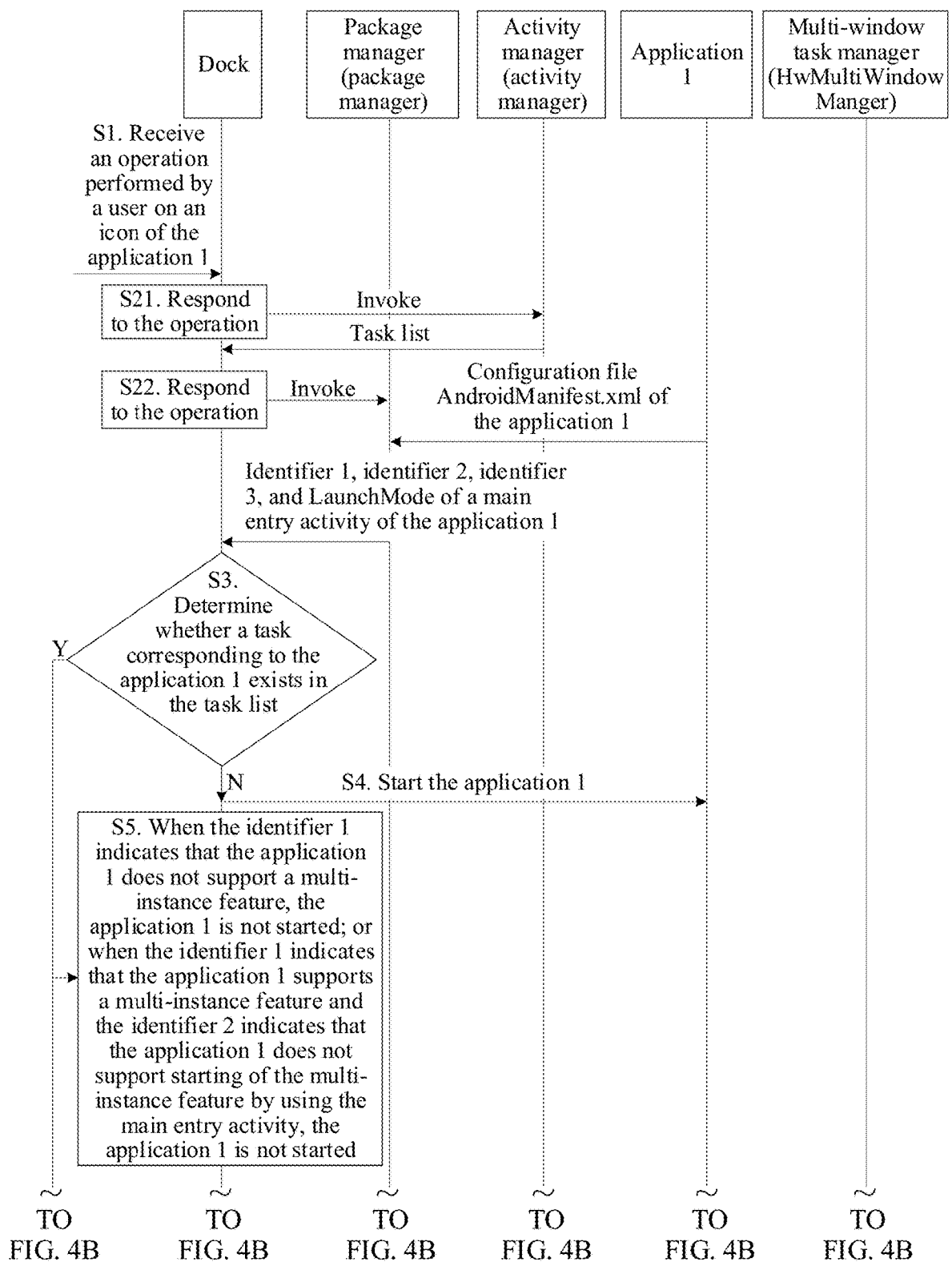
FIG. 4A to FIG. 4C are a signaling interaction diagram of a method for starting any instance of an application by a Dock according to an embodiment of this application.
Figure 4B:
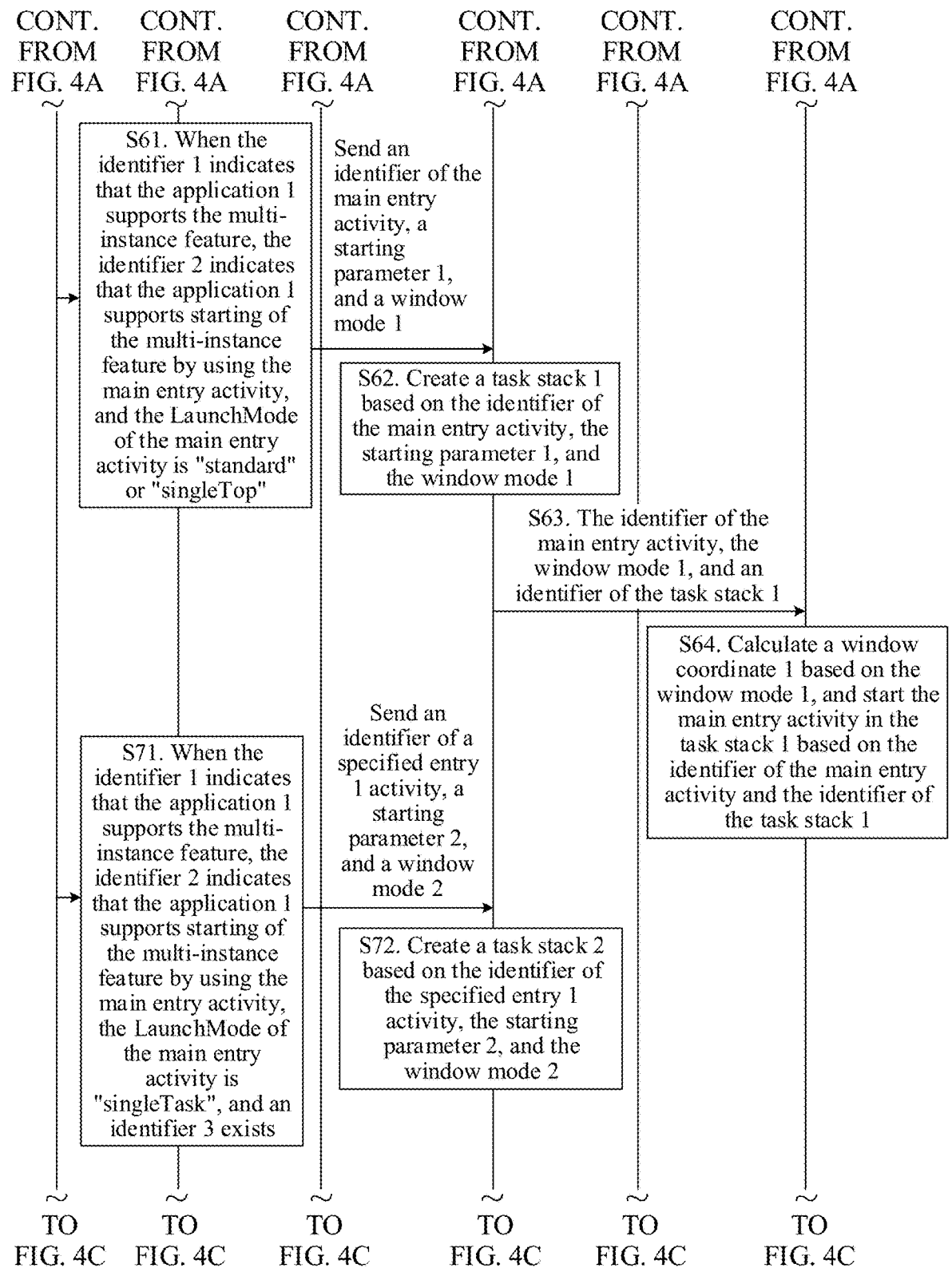
Figure 4C:
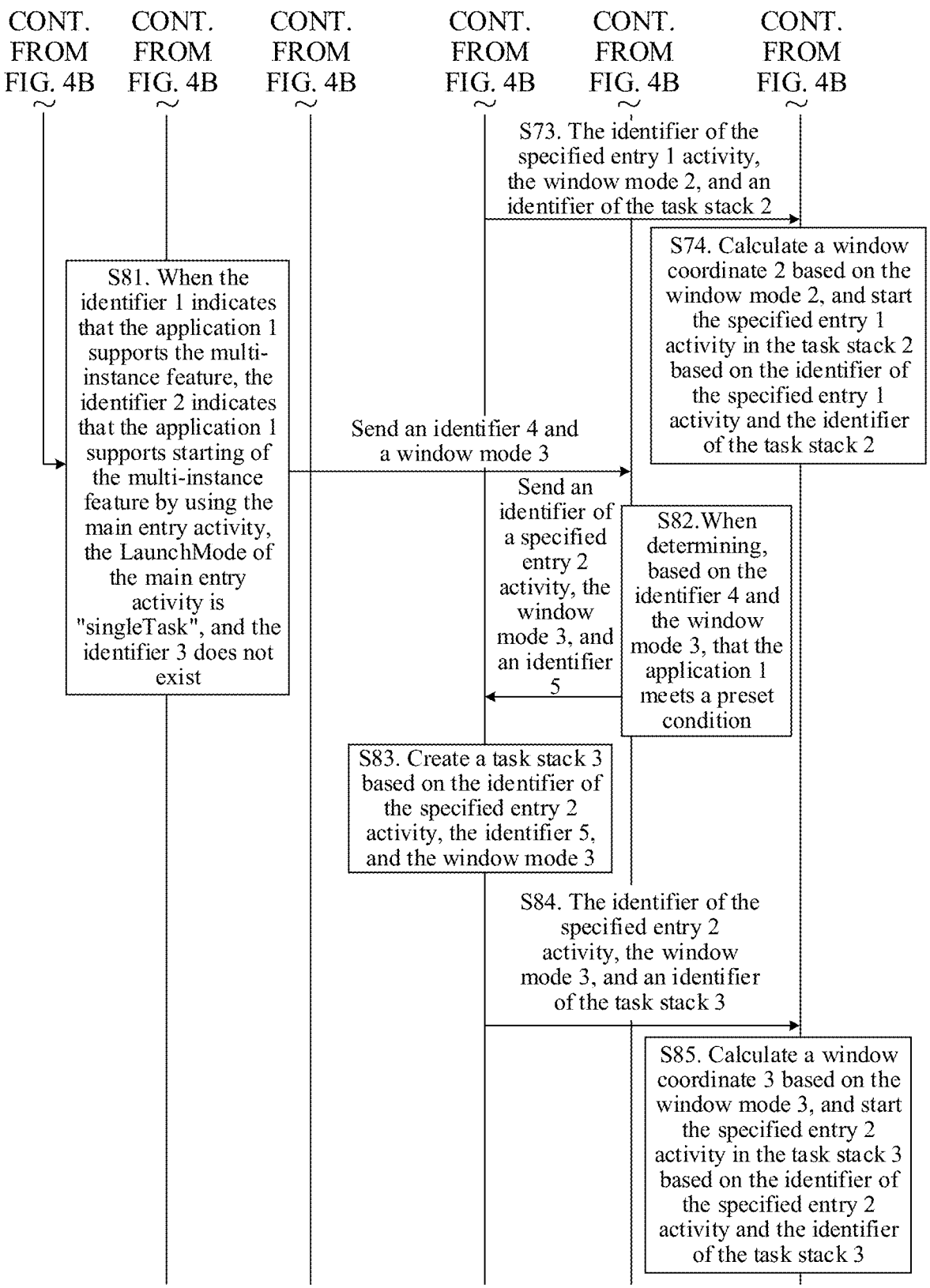

Based on the foregoing description, with reference to FIG. 4A to FIG. 4C, an operating principle of any instance of triggering/starting the application 1 by the Dock is described. The application 1 is any application.

FIG. 4A to FIG. 4C are a signaling interaction diagram of a method for starting any instance of an application by a Dock according to an embodiment of this application. As shown in FIG. 4A to FIG. 4C, a method for starting any instance of the application 1 by the Dock may include the following operations:

S1. The Dock receives an operation performed by a user on an icon of the application 1.

The foregoing operation may include but is not limited to an operation such as tap, drag, touch and hold, or double-tap.

S21. In response to the foregoing operation, the Dock may invoke an activity manager at an application framework layer to obtain a task list. For example, the Dock may send a second message to the activity manager to obtain the task list. In response to the second message, the activity manager may return a fourth message to the Dock, where the fourth message carries the task list.

In an embodiment of the application, the task list is used to store tasks corresponding to all third-party applications currently running on the electronic device. Generally, the types of tasks can include background tasks and foreground tasks. Any task in the task list may be represented by using at least one of a letter, a character string, a digit, a character, or the like. This is not limited in an embodiment of the application. In addition, when the task list is empty, it may indicate that the electronic device is not running any third-party application.

S22. In response to the foregoing operation, the Dock may invoke a package manager at the application framework layer, for example, obtain a configuration file AndroidManifest.xml of the application 1 by using a PackageManger.getApplicationInfo method, and obtain a configuration parameter of the application 1 from the configuration file AndroidManifest.xml of the application 1. For example, the Dock may send a first message to the package manager, to obtain the configuration file AndroidManifest.xml of the application 1. In response to the first message, the package manager may return a third message to the Dock, where the third message carries the configuration file AndroidManifest.xml of the application 1, and the configuration file of the application 1 includes a configuration parameter of the application 1.

In an embodiment of the application, the Dock may obtain the configuration file AndroidManifest.xml of the application 1 in a plurality of manners.

In some embodiments, the Dock sends a request 1 to the package manager, where the request 1 is used to request the configuration file AndroidManifest.xml of the application 1. The package manager may send a request 2 (that is, a twelfth message) to the application 1, where the request 2 is used to request the configuration file AndroidManifest.xml of the application 1. The application 1 sends a response 1 (that is, a thirteenth message) to the package manager, where the response 1 carries the configuration file AndroidManifest.xml of the application 1. The package manager sends a response 2 to the Dock, where the response 2 carries the configuration file AndroidManifest.xml of the application 1. An embodiment of the message 1, the message 2, the response 1, and the response 2 are not limited in an embodiment of the application.

In some other embodiments, the Dock sends a request 3 to the package manager, where the request 3 is used to request the configuration file AndroidManifest.xml of the application 1. Because the package manager pre-stores the configuration file AndroidManifest.xml of the application 1, the package manager may send a response 3 to the Dock, where the response 3 carries the configuration file AndroidManifest.xml of the application 1. An embodiment of the message 3 and the response 3 are not limited in an embodiment of the application.

In some other embodiments, the Dock sends a request 4 to the package manager, where the request 4 is used to request the configuration file AndroidManifest.xml of the application 1. Because the package manager learns an application programming interface (API) of the application 1 in advance, the package manager may obtain the configuration file AndroidManifest.xml of the application 1 from the API of the application 1; and the package manager sends a response 4 to the Dock, where the response 4 carries the configuration file AndroidManifest.xml of the application 1. An embodiment of the message 4 and the response 4 are not limited in an embodiment of the application.

It should be noted that an embodiment of the application includes but is not limited to the foregoing three feasible implementations.

In an embodiment of the application, the configuration parameter is used to indicate a parameter related to a multi-instance feature of the application 1. The configuration parameter may include an identifier 1, or may include an identifier 1 and an identifier 2, or may include an identifier 1, an identifier 2, and a LaunchMode of the main entry activity, or may include an identifier 1, an identifier 2, a LaunchMode of the main entry activity, and an identifier 3. A specific implementation of the configuration parameter is not limited in an embodiment of the application.

The identifier 1 is used to indicate whether the application 1 supports the multi-instance feature, and may be represented in at least one manner such as a letter, a character string, a digit, or a text. This is not limited in an embodiment of the application. For the identifier 1 mentioned herein, refer to the description of the character configured for "com.huawei.android.multiwindow.multiniistance.enable" shown in Table 1.

The identifier 2 is used to indicate whether the application 1 supports starting of the multi-instance feature by using the main entry activity, and may be represented in at least one manner such as a letter, a character string, a digit, or a text. This is not limited in an embodiment of the application. For the identifier mentioned herein, refer to the description of the value configured for com.huawei.android.multiwindow-.multiinistance.level shown in Table 2.

Existence of the identifier 3 is used to indicate that the application 1 supports starting of the multi-instance feature by a specified entry activity (targetActivity), and may be represented in at least one manner such as a letter, a character string, a digit, or a text. This is not limited in an embodiment of the application. For details about the identifiers mentioned herein, refer to the foregoing description of the configuration of "com.huawei.android. multiwindow.multiinstance.targetactivity". Absence of the identifier 3 is used to indicate that the application 1 does not support starting of the multi-instance feature by using specified entry activity (targetActivity).

It should be noted that there is no time sequence between operation S21 and operation S22. Operation S21 and operation S22 may be performed synchronously or in sequence. This is not limited in an embodiment of the application.

S3. The Dock determines whether a task corresponding to the application 1 exists in the task list.

If it is determined that the task corresponding to the application 1 does not exist in the task list, operation S4 is performed. If it is determined that the task corresponding to the application 1 exists in the task list, it may indicate that the electronic device has run at least one instance of the application 1, and operation S5, or operations S61 to S64, or operations S71 to S74, or operations S81 to S85 are performed.

S4. The Dock starts the application 1.

In operation S4, in response to the foregoing operation, the Dock may start the application 1 when determining that the task corresponding to the application 1 does not exist in the task list. It should be noted that the foregoing operation herein may be corresponding to the operation 1 in FIG. 3A to FIG. 3P, and details are not described herein again. In addition, after the Dock starts the application 1, the electronic device may run an instance of the application 1.

In this way, the electronic device may display an instance of the application 1, for example, any page (for example, a home page) of the application 1. For details, refer to the description of displaying, by the tablet computer, the window 2 shown in FIG. 3E on the user interface 11. Details are not described herein again.

In an embodiment of the application, after determining that the task corresponding to the application 1 exists in the task list, the Dock may determine whether the identifier 1 indicates that the application 1 supports the multi-instance feature, and determine whether the identifier 2 indicates that the application 1 does not support starting of the multi-instance feature by using the main entry activity.

If the identifier 1 indicates that the application 1 does not support the multi-instance feature, operation S5 is performed. If the identifier 1 indicates that the application 1 does not support the multi-instance feature, and the identifier 2 indicates that the application 1 does not support starting of the multi-instance feature by using the main entry activity, operation S5 is performed. If the identifier 1 indicates that the application 1 supports the multi-instance feature and the identifier 2 indicates that the application 1 supports starting of the multi-instance feature by using the main entry activity, operations S61 to S64, operations S71 to S74, or operations S81 to S85 are performed, so that a plurality of instances of the application 1 can be implemented.

S5. The Dock does not start the application 1.

In an embodiment of the application, when the identifier 1 indicates that the application 1 does not support the multi-instance feature, the Dock cannot start the application 1. Alternatively, when the identifier 1 indicates that the application 1 supports the multi-instance feature and the identifier 2 indicates that the application 1 does not support starting of the multi-instance feature by using the main entry activity, the Dock cannot start the application 1.

There are a plurality of manners for implementing that the icon of the application 1 in the Dock is in an untappable/undraggable state. For example, the icon of the application 1 is dimmed. For another example, the icon of the application 1 is normally displayed, but the Dock does not respond to a tap/drag operation of the user.

S61. When determining that the LaunchMode of the main entry activity is set to "standard" or "singleTop", the Dock sends an identifier of the main entry activity, a starting parameter 1, and a window mode 1 to the activity manager at the application framework layer.

The identifier of the main entry activity is used to represent the main entry activity, and may be represented in at least one manner such as a letter, a character string, a digit, or a text. This is not limited in an embodiment of the application. The starting parameter 1 is used to request/indicate/notify to establish or apply for establishing anew task stack (task stack 1 for short), and the task stack 1 is different from a task stack corresponding to the task corresponding to the application 1 in the task list. The starting parameter 1 may include but is not limited to intent flags such as FLAG_ACTIVITY_NEW_TASK, FLAG_ACTIVITY_MULTIPLE_TASK, and FLAG_HW_ACTIVITY_MULTIPLE_TASK.

The window mode 1 is related to the type of the operation in operation S1. For example, when the operation in operation S1 is a tap operation, the window mode 1 may be set to a floating window display mode. When the operation in operation S1 is a drag operation, the window mode 1 may be set to a split-screen display mode.

It should be noted that the Dock may add the identifier of the main entry activity, the starting parameter 1, and the window mode 1 to a message 1, and send the message 1 (that is, a fifth message) to the activity manager. An embodiment of the message 1 is not limited in an embodiment of the application.

S62. The activity manager creates a task stack 1 based on the identifier of the main entry activity, the starting parameter 1, and the window mode 1. The task stack 1 is different from all the existing task stacks corresponding to the application 1 in the task list.

S63. The activity manager sends the identifier of the main entry activity, the window mode 1, and the identifier of the task stack 1 to the multi-window task manager.

The identifier of the task stack 1 is used to represent the task stack 1, and may be represented in at least one manner such as a letter, a character string, a digit, or a text. This is not limited in an embodiment of the application.

It should be noted that the activity manager may add the identifier of the main entry activity, the window mode 1, and the identifier of the task stack 1 to a message 2, and send the message 2 (that is, a sixth message) to the multi-window task manager. An embodiment of the message 2 is not limited in an embodiment of the application.

S64. The multi-window task manager calculates a window coordinate 1 based on the window mode 1, and starts the main entry activity in the task stack 1 based on the identifier of the main entry activity and the identifier of the task stack 1.

Based on the descriptions of operations S61 to S64, the electronic device may start an instance of the application 1 in the task stack 1, and display the instance of the application 1 based on a window form corresponding to the window coordinate 1. A specific representation manner of the window coordinate 1 is not limited in an embodiment of the application. In addition, the instance of the application 1 mentioned herein is an instance of the main entry activity, and has a same name as all the existing instances of the main entry activity corresponding to the application 1 in the task list, but IDs of the instances of the main entry activity are different.

For example, based on the foregoing description, the electronic device may run the instance 1 and the instance 2 of the email application mentioned in the embodiments in FIG. 3A to FIG. 3S, or the instance 1, the instance 2, and the instance 3 of the email application, or the instance 1 and the instance 4 of the email application, or the instance 2 and the instance 4 of the email application.

Activities corresponding to pages displayed when the instance 1, the instance 2, the instance 3, and the instance 4 are started are all main entry activities; names of the activities corresponding to pages displayed when the instance 1, the instance 2, the instance 3, and the instance 4 are started are the same; and IDs of the instances of the activities are different, and may be used to distinguish between the instance 1, the instance 2, the instance 3, and the instance 4. In addition, pages displayed when the instance 1, the instance 2, the instance 3, and the instance 4 are started may include the same or different content.

In conclusion, because the task corresponding to the application 1 exists in the task list, it may indicate that the electronic device has run at least one instance of the application 1. Therefore, the electronic device may run two or more instances of the application 1, so that the electronic device implements a plurality of instances of the application 1.

When the identifier 1 indicates that the application 1 supports the multi-instance feature, the identifier 2 indicates that the application 1 supports starting of the multi-instance feature by using the main entry activity, and it is determined that LaunchMode of the main entry activity is set to "singleTask", the Dock may determine whether the identifier 3 exists. If it is determined that the identifier 3 exists, operations S71 to S74 are performed. If it is determined that the identifier 3 does not exist, operations S81 to S85 are performed. In this way, a plurality of instances of the application 1 are implemented.

S71. When determining that the LaunchMode of the main entry activity is set to "singleTask" and the identifier 3 exists, the Dock sends, to the activity manager at the application framework layer, an identifier of a specified entry 1 activity (targetActivity1) corresponding to the identifier 3, a starting parameter 2, and a window mode 2.

The specified entry 1 activity (targetActivity1) is any entry activity other than the main entry activity. An identifier of the specified entry 1 activity (targetActivity1) is used to represent the specified entry 1 activity (targetActivity1), and may be represented in at least one manner such as a letter, a character string, a digit, or a text. This is not limited in an embodiment of the application. The starting parameter 2 is used to instruct/notify to establish or apply for establishing a new task stack (task stack 2 for short), and the task stack 2 is different from a task stack corresponding to the task corresponding to the application 1 in the task list. The starting parameter 2 may include but is not limited to intent attributes such as FLAG_ACTIVITY_NEW_TASK, FLAG_ACTIVITY_MULTIPLE_TASK, and FLAG_HW_ACTIVITY_MULTIPLE_TASK.

The window mode 2 is related to the type of the operation in operation S1. For example, when the operation in operation S1 is a tap operation, the window mode 2 may be set to a floating window display mode. When the operation in operation S1 is a drag operation, the window mode 2 may be set to a split-screen display mode.

It should be noted that the Dock may add, to a message 3 (that is, a seventh message), the identifier of the specified entry 1 activity (targetActivity 1) corresponding to the identifier 3, the starting parameter 2, and the window mode 2, and send the message 3 to the activity manager. An embodiment of the message 3 is not limited in an embodiment of the application.

S72. The activity manager creates a task stack 2 based on the identifier of the specified entry 1 activity (targetActivity 1), the starting parameter 2, and the window mode 2. The task stack 2 is different from all the existing task stacks corresponding to the application 1 in the task list.

S73. The activity manager sends the identifier of the specified entry 1 activity (targetActivity1), the window mode 2, and an identifier (that is, an eighth message) of the task stack 2 to the multi-window task manager.

The identifier of the task stack 2 is used to represent the task stack 2, and may be represented in at least one manner such as a letter, a character string, a digit, or a text. This is not limited in an embodiment of the application.

It should be noted that the activity manager may add the identifier of the specified entry 1 activity (targetActivity1), the window mode 2, and the identifier of the task stack 2 to a message 4, and send the message 4 to the multi-window task manager. An embodiment of the message 4 is not limited in an embodiment of the application.

S74. The multi-window task manager calculates a window coordinate 2 based on the window mode 2, and starts the specified entry 1 activity (targetActivity1) in the task stack 2 based on the identifier of the specified entry 1 activity (targetActivity1) and the identifier of the task stack 2.

Based on the descriptions of operations S71 to S74, the electronic device may start an instance of the application 1 in the task stack 2, and display the instance of the application 1 based on a window form corresponding to the window coordinate 2. A specific representation manner of the window coordinate 2 is not limited in an embodiment of the application. In addition, the window coordinate 1 and the window coordinate 2 may be the same or different. This is not limited in an embodiment of the application. In addition, the instance of the application 1 mentioned herein is an instance of the specified entry 1 activity, and has a same name as all the existing instances of the specified entry 1 activity corresponding to the application 1 in the task list, but IDs of the instances of the specified entry 1 activity are different.

For example, based on the foregoing description, the electronic device may run the instance 1 and the instance 2 of the email application mentioned in the embodiments in FIG. 3A to FIG. 3S, or the instance 1, the instance 2, and the instance 3 of the email application, or the instance 1 and the instance 4 of the email application, or the instance 2 and the instance 4 of the email application.

Activities corresponding to the pages displayed when the instance 1, the instance 2, the instance 3, and the instance 4 are all specified entry 1 activities; names of ActivityIDs corresponding to the pages displayed when the instance 1, the instance 2, the instance 3, and the instance 4 are the same; and IDs of the instances of the activities are different, which may be used to distinguish between the instance 1, the instance 2, the instance 3, and the instance 4. In addition, pages displayed when the instance 1, the instance 2, the instance 3, and the instance 4 are started may include the same or different content.

In conclusion, because the task corresponding to the application 1 exists in the task list, it may indicate that the electronic device has run at least one instance of the application 1. Therefore, the electronic device may run two or more instances of the application 1, so that the electronic device implements a plurality of instances of the application 1.

S81. When determining that LaunchMode of a main entry activity is set to "singleTask" and the identifier 3 does not exist, the Dock sends an identifier 4 and a window mode 3 to the application 1.

The identifier 4 is used to instruct the application 1 to start a new instance of the application 1, and may be represented in at least one manner such as a letter, a character string, a digit, or a text. This is not limited in an embodiment of the application. The window mode 3 is related to the type of the operation in operation S1. For example, when the operation in operation S1 is a tap operation, the window mode 3 may be set to a floating window display mode. When the operation in operation S1 is a drag operation, the window mode 3 may be set to a split-screen display mode.

It should be noted that the Dock may add the identifier 4 and the window mode 3 to a message 5, and send the message 5 (that is, the ninth message) to the application 1. An embodiment of the message 5 is not limited in an embodiment of the application.

S82. When determining, based on the identifier 4 and the window mode 3, that the application 1 meets a preset condition, the application 1 sends an identifier of a specified entry 2 activity (targetActivity2), the window mode 3, and an identifier 5 (a tenth message) to the activity manager at the application framework layer.

In an embodiment of the application, when receiving the identifier 4, the application 1 may determine whether the application 1 meets the preset condition.

Specific content of the preset condition is not limited in an embodiment of the application. For example, the preset condition may be that the application 1 supports the multi-instance feature. For another example, the preset condition may be that the application 1 supports the multi-instance feature, and a sum of a quantity of current task stack records corresponding to the application 1 plus 1 is less than or equal to a preset maximum value.

In some embodiments, the application 1 may record a corresponding quantity of times that the application 1 applies to the electronic device for establishing a new task stack each time, and determine the quantity of times as a quantity of current task stack records corresponding to the application 1. In some other embodiments, the application 1 may query the electronic device for the quantity of current task stacks corresponding to the application 1. The preset maximum value may be set based on a configuration of the application 1. The preset maximum value is not limited in an embodiment of the application.

In addition, when the sum of the quantity of current task stacks corresponding to the application 1 plus 1 is greater than the preset maximum value, the application 1 may close an instance of the application 1 that is first started, or close an instance of the application 1 that is not started within preset duration, so that the sum of the quantity of current task stacks corresponding to the application 1 plus 1 is less than or equal to the preset maximum value.

In this way, when determining that the application 1 meets the preset condition, the application 1 may send the identifier of the specified entry 2 activity (targetActivity2), the window mode 3, and the identifier 5 to the activity manager at the application framework layer.

The specified entry 2 activity (targetActivity2) is any entry activity other than the main entry activity, and the specified entry 2 activity (targetActivity2) is defined by the application 1. The identifier of the specified entry 2 activity (targetActivity2) is used to represent the specified entry 2 activity (targetActivity2), and may be represented in at least one manner such as a letter, a character string, a digit, or a text. This is not limited in an embodiment of the application. The identifier 5 is used to request/instruct/notify to establish or apply for establishing a new task stack (task stack 3 for short), and may be represented in at least one manner such as a letter, a character string, a digit, or a text. This is not limited in an embodiment of the application. The task stack 3 is different from a task stack corresponding to the task corresponding to the application 1 in the task list.

The window mode 3 is related to the type of the operation in operation S1. For example, when the operation in operation S1 is a tap operation, the window mode 3 may be set to a floating window display mode. When the operation in operation S1 is a drag operation, the window mode 3 may be set to a split-screen display mode.

It should be noted that the application 1 may add the identifier of the specified entry 2 activity (targetActivity2), the window mode 3, and the identifier 5 to a message 5, and send the message 5 to the activity manager. An embodiment of the message 5 is not limited in an embodiment of the application.

S83. The activity manager creates a task stack 3 based on the identifier of the specified entry 2 activity (targetActivity2), the identifier 5, and the window mode 3. The task stack 3 is different from all the existing task stacks corresponding to the application 1 in the task list.

S84. The activity manager sends the identifier of the specified entry 2 activity (targetActivity2), the window mode 3, and an identifier (that is, an eleventh message) of the task stack 3 to the multi-window task manager.

The identifier of the task stack 3 is used to represent the task stack 3, and may be represented in at least one manner such as a letter, a character string, a digit, or a text. This is not limited in an embodiment of the application.

It should be noted that the activity manager may add the identifier of the specified entry 2 activity (targetActivity2), the window mode 3, and the identifier of the task stack 3 to a message 6, and send the message 6 to the multi-window task manager. An embodiment of the message 6 is not limited in an embodiment of the application.

S85. The multi-window task manager calculates a window coordinate 3 based on the window mode 3, and starts the specified entry 2 activity (targetActivity2) in the task stack 3 based on the identifier of the specified entry 2 activity (targetActivity2) and the identifier of the task stack 3.

Based on the descriptions of operations S81 to S85, the electronic device may start an instance of the application 1 in the task stack 3, and display the instance of the application 1 based on a window form corresponding to the window coordinate 3. A specific representation manner of the window coordinate 3 is not limited in an embodiment of the application. In addition, the window coordinate 1, the window coordinate 2, and the window coordinate 3 may be the same or different. This is not limited in an embodiment of the application. In addition, the instance of the application 1 mentioned herein is a specified entry 2 activity corresponding to a page displayed when the application 1 is started; and a name of the specified entry 2 activity may be the same as or different from names of all the existing entry activities corresponding to the application 1 in the task list. When the names of the two are the same, the IDs of the instances of the entry activities of the two are different.

For example, based on the foregoing description, the electronic device may run the instance 1 and the instance 2 of the email application mentioned in the embodiments in FIG. 3A to FIG. 3S, or the instance 1, the instance 2, and the instance 3 of the email application, or the instance 1 and the instance 4 of the email application, or the instance 2 and the instance 4 of the email application.

Activities corresponding to pages displayed when the instance 1, the instance 2, the instance 3, and the instance 4 are started are all specified entry 2 activities. In addition, pages displayed when the instance 1, the instance 2, the instance 3, and the instance 4 are started may include the same or different content.

In conclusion, because the task corresponding to the instance of the application 1 exists in the task list, it may indicate that the electronic device has run at least one instance of the application 1. Therefore, the electronic device may run two or more instances of the application 1, so that the electronic device implements a plurality of instances of the application 1.

It should be noted that in the foregoing descriptions, for descriptions of implementing a plurality of instances of the application 1 by the electronic device, reference may be made to descriptions of implementing a plurality of instances of the email application by the tablet computer in the window combination forms such as "split screen+floating window", "full screen+floating window", "floating window+floating window", "left split screen+right split screen", and "left split screen+right split screen+floating window" in FIG. 3A to FIG. 3P. Details are not described herein again.

In conclusion, for any application that is installed in the electronic device and that supports the multi-instance feature, based on configurations of the application layer and the application framework layer in the software system of the electronic device, the electronic device that supports a floating window and split-screen display may have a single-application multi-instance feature. In this way, the Dock triggers any application to start the multi-instance feature of the application, and the electronic device may simultaneously display a plurality of windows of the application on a display in a plurality of window combination forms, so that multi-instance coordination processing and operation may be performed on a same application, thereby improving speed and efficiency of running the same application by the electronic device, maximizing continuation of an operating habit of a user on a PC, improving office efficiency and working efficiency of the user, and bringing experience closer to that on a desktop-level operating system to the user.

Based on the foregoing description, an embodiment of this application may provide an application starting method. The application starting method is applied to an electronic device, the electronic device includes a first application, a second application, a first software module, a second software module, and a third software module, and the first application is different from the second application.

For an embodiment of the first application, refer to the foregoing description of the Dock; for an embodiment of the second application, refer to the foregoing description of the third-party application (such as the email application and the application 1); for an embodiment of the first software module, refer to the foregoing description of the package manager; for an embodiment of the second software module, refer to the foregoing description of the activity manager; and for an embodiment of the third software module, refer to the foregoing description of the multi-window task manager (HwMultiWindowManger). Details are not described herein again.

In some embodiments, the application starting method in an embodiment of the application may include operation S101 to operation S108.

S101. An electronic device displays a first interface of a first application, where the first interface includes an icon of a second application.

S102. In response to the first operation performed on the icon of the second application, the first application sends a first message to a first software module, and the first application sends a second message to a second software module.

S103. In response to receiving the first message, the first software module sends a third message to the first application, where the third message carries a first configuration item of the second application and a starting mode of a main entry activity of the second application.

S104. In response to receiving the second message, the second software module sends a fourth message to the first application, where the fourth message carries a task list, and the task list is used to store a task corresponding to an application in the electronic device.

S105. When determining that a task corresponding to a first instance of the second application exists in the task list, the first configuration item indicates that the second application supports a multi-instance feature, the second application supports starting of the multi-instance feature by using the main entry activity, and a starting mode of the main entry activity is a first mode, sending, by the first application, a fifth message to the second software module, where the fifth message carries an identifier of the main entry activity and a first identifier, and the first identifier is used to request to establish a first task stack.

S106. In response to receiving the fifth message, the second software module establishes a first task stack based on the identifier of the main entry activity and the first identifier, where the first task stack is different from a task stack corresponding to the second application in the task list.

S107: The second software module sends a sixth message to a third software module, where the sixth message carries the identifier of the main entry activity and an identifier of the first task stack.

S108: In response to receiving the sixth message, the third software module starts the main entry activity in the first task stack based on the identifier of the main entry activity and the identifier of the first task stack, to run a second instance of the second application.

For an embodiment of operation S101, refer to the description of the embodiment in FIG. 3D; for an embodiment of the first interface, refer to the description of the window 201 in the embodiment in FIG. 3D; for an embodiment of the icon of the second application, refer to the description of the icon 201a of the email application in the embodiment in FIG. 3D; for an embodiment of operation S102, refer to the description of operation S21 and operation S22 in the embodiment in FIG. 4A to FIG. 4C; for an embodiment of operation S103, refer to the description of operation S22 in the embodiment in FIG. 4A to FIG. 4C; for an embodiment of operation S104, refer to the description of operation S21 in the embodiment in FIG. 4A to FIG. 4C; for an embodiment of operation S105, refer to the description of operation S3 and operation S61 in the embodiment in FIG. 4A to FIG. 4C; for an embodiment of operation S106, refer to the description of operation S62 in the embodiment in FIG. 4A to FIG. 4C; for an embodiment of operation S107, refer to the description of operation S63 in the embodiment in FIG. 4A to FIG. 4C; for an embodiment of operation S108, refer to the description of operation S64 in the embodiment in FIG. 4A to FIG. 4C; for an embodiment of the first operation, refer to the description of the operation performed by the user on the icon of the application 1 in operation S1 in the embodiment in FIG. 4A to FIG. 4C; for a task list, refer to the description of the operation of the task list in operation S21 in the embodiment in FIG. 4A to FIG. 4C; for an embodiment of the first configuration item, refer to descriptions of the identifier 1 and the identifier 2 in the embodiment in FIG. 4A to FIG. 4C; for an embodiment of the main entry activity, refer to the description of the main entry activity in the embodiment in FIG. 4A to FIG. 4C; for an embodiment of the first identifier, refer to the description of the starting parameter 1 in the embodiment in FIG. 4A to FIG. 4C; and for an embodiment of the first task stack, refer to the description of the task stack 1 in the embodiment in FIG. 4A to FIG. 4C. Details are not described herein again.

In an embodiment of the application, the multi-instance feature of the second application can be triggered by the first application, and one instance of the second application is started each time by using the main entry activity of the second application, so that the electronic device implements two or more instances of the second application, thereby improving speed and efficiency of running a same application by the electronic device, maximizing continuation of an operating habit of a user on a PC, improving office efficiency and working efficiency of the user, and bringing experience closer to that on a desktop-level operating system to the user.

In some embodiments, the method includes: the first application sends the fifth message to the second software module, where the fifth message carries the identifier of the main entry activity, the first identifier, and a first window mode, and the first window mode is related to a type of the first operation; in response to receiving the fifth message, the second software module establishes the first task stack based on the identifier of the main entry activity, the first identifier, and the first window mode; the second software module sends the sixth message to the third software module, where the sixth message carries the identifier of the main entry activity, the identifier of the first task stack, and the first window mode; and in response to receiving the sixth message, the third software module starts the main entry activity in the first task stack based on the identifier of the main entry activity, the identifier of the first task stack, and the first window mode, where a page display manner of the main entry activity is related to the first window mode.

For an embodiment of the foregoing solution, refer to descriptions of operation S61 to operation S64 in the embodiment in FIG. 4A to FIG. 4C; and for an embodiment of the first window mode, refer to the description of the window mode 1 in the embodiment in FIG. 4A to FIG. 4C. Details are not described herein again.

In some other embodiments, the application starting method in an embodiment of the application may include operation S201 to operation S208.

S201. An electronic device displays a first interface of a first application, where the first interface includes an icon of a second application.

S202. In response to receiving a first operation performed on the icon of the second application, the first application sends a first message to a first software module, and the first application sends a second message to a second software module.

S203. In response to receiving the first message, the first software module sends a third message to the first application, where the third message carries a first configuration item of the second application and a starting mode of a main entry activity of the second application.

S204. In response to receiving the second message, the second software module sends a fourth message to the first application, where the fourth message carries a task list, and the task list is used to store a task corresponding to an application in the electronic device.

S205. When determining that a task corresponding to a first instance of the second application exists in the task list, the first configuration item indicates that the second application supports a multi-instance feature, the second application supports starting of the multi-instance feature by using the main entry activity, a starting mode of the main entry activity is a second mode, and the third message further carries an identifier of a first entry activity, the first application sends a seventh message to the second software module, where the seventh message carries the identifier of the first entry activity and a second identifier, the first mode is different from the second mode, the first entry activity is an entry activity other than the main entry activity, and the second identifier is used to request to establish a second task stack.

S206. In response to receiving the seventh message, the second software module establishes a second task stack based on the identifier of the first entry activity and the second identifier, where the second task stack is different from a task stack corresponding to the second application in the task list.

S207. The second software module sends an eighth message to the third software module, where the eighth message carries the identifier of the first entry activity and an identifier of the second task stack.

S208. In response to receiving the eighth message, the third software module starts the first entry activity in the second task stack based on the identifier of the first entry activity and the identifier of the second task stack, to run a second instance of the second application.

For an embodiment of operation S201, refer to the description of the embodiment in FIG. 3D; for an embodiment of the first interface, refer to the description of the window 201 in the embodiment in FIG. 3D; for an embodiment of the icon of the second application, refer to the description of the icon 201a of the email application in the embodiment in FIG. 3D; for an embodiment of operation S202, refer to the description of operation S21 and operation S22 in the embodiment in FIG. 4A to FIG. 4C; for an embodiment of operation S203, refer to the description of operation S22 in the embodiment in FIG. 4A to FIG. 4C; for an embodiment of operation S204, refer to the description of operation S21 in the embodiment in FIG. 4A to FIG. 4C; for an embodiment of operation S205, refer to the description of operation S5 and operation S71 in the embodiment in FIG. 4A to FIG. 4C; for an embodiment of operation S206, refer to the description of operation S72 in the embodiment in FIG. 4A to FIG. 4C; for an embodiment of operation S207, refer to the description of operation S73 in the embodiment in FIG. 4A to FIG. 4C; for an embodiment of operation S208, refer to the description of operation S74 in the embodiment in FIG. 4A to FIG. 4C; for an embodiment of the first operation, refer to the description of the operation performed by the user on the icon of the application 1 in operation S1 in the embodiment in FIG. 4A to FIG. 4C; for a task list, refer to the description of the operation of the task list in operation S21 in the embodiment in FIG. 4A to FIG. 4C; for an embodiment of the first configuration item, refer to descriptions of the identifier 1 and the identifier 2 in the embodiment in FIG. 4A to FIG. 4C; for an embodiment of the first entry activity, refer to the description of the specified entry activity 1 in the embodiment in FIG. 4A to FIG. 4C; for an embodiment of the second identifier, refer to the description of the starting parameter 2 in the embodiment in FIG. 4A to FIG. 4C; and for an embodiment of the second task stack, refer to the description of the task stack 2 in the embodiment in FIG. 4A to FIG. 4C. Details are not described herein again.

In an embodiment of the application, the multi-instance feature of the second application can be triggered by the first application, and one instance of the second application is started each time by using the first entry activity of the second application, so that the electronic device implements two or more instances of the second application, thereby improving speed and efficiency of running a same application by the electronic device, maximizing continuation of an operating habit of a user on a PC, improving office efficiency and working efficiency of the user, and bringing experience closer to that on a desktop-level operating system to the user.

In some embodiments, the method specifically includes: the first application sends the seventh message to the second software module, where the seventh message carries the identifier of the first entry activity, the second identifier, and a second window mode, and the second window mode is related to a type of the first operation; in response to receiving the seventh message, the second software module establishes the second task stack based on the identifier of the first entry activity, the second identifier, and the second window mode; the second software module establishes the eighth message to the third software module, where the eighth message carries the identifier of the first ingress activity, an identifier of the second task stack, and the second window mode; and in response to receiving the eighth message, the third software module starts the first entry activity in the second task stack based on the identifier of the first entry activity, the identifier of the second task stack, and the second window mode, where a page display manner of the first entry activity is related to the second window mode.

For an embodiment of the foregoing solution, refer to descriptions of operation S71 to operation S74 in the embodiment in FIG. 4A to FIG. 4C; and for an embodiment of the second window mode, refer to the description of the window mode 2 in the embodiment in FIG. 4A to FIG. 4C. Details are not described herein again.

In some other embodiments, the application starting method in an embodiment of the application may include operation S301 to operation S309.

S301. An electronic device displays a first interface of a first application, where the first interface includes an icon of a second application.

S302. In response to the first operation performed on the icon of the second application, the first application sends a first message to a first software module, and the first application sends a second message to a second software module.

S303. In response to receiving the first message, the first software module sends a third message to the first application, where the third message carries a first configuration item of the second application and a starting mode of a main entry activity of the second application.

S304. In response to receiving the second message, the second software module sends a fourth message to the first application, where the fourth message carries a task list, and the task list is used to store a task corresponding to an application in the electronic device.

S305: When determining that a task corresponding to a first instance of the second application exists in the task list, the first configuration item indicates that the second application supports the multi-instance feature, the second application supports starting of the multi-instance feature by using the main entry activity, a starting mode of the main entry activity is a second mode, and the third message does not carry an identifier of the first entry activity, the first application sends a ninth message to the second application, where the ninth message carries a third identifier, the first mode is different from the second mode, the first entry activity is an entry activity other than the main entry activity, and the third identifier is used to request the second application to start a new instance of the second application.

S306. In response to receiving the ninth message, the second application sends a tenth message to the second software module, where the tenth message carries an identifier of a second entry activity and a fourth identifier, the second entry activity is any entry activity, and the fourth identifier is used to request to establish a third task stack.

S307. In response to receiving the tenth message, the second software module establishes the third task stack based on the identifier of the second entry activity and the fourth identifier, where the third task stack is different from a task stack corresponding to the second application in the task list.

S308: The second software module sends an eleventh message to the third software module, where the eleventh message carries the identifier of the second entry activity and an identifier of the third task stack.

S309. In response to receiving the eleventh message, the third software module starts the second entry activity in the third task stack based on the identifier of the second entry activity and the identifier of the third task stack, to run a second instance of the second application.

For an embodiment of operation S301, refer to the description of the embodiment in FIG. 3D; for an embodiment of the first interface, refer to the description of the window 201 in the embodiment in FIG. 3D; for an embodiment of the icon of the second application, refer to the description of the icon 201*a* of the email application in the embodiment in FIG. 3D; for an embodiment of operation S302, refer to the description of operation S21 and operation S22 in the embodiment in FIG. 4A to FIG. 4C; for an embodiment of operation S303, refer to the description of operation S22 in the embodiment in FIG. 4A to FIG. 4C; for an embodiment of operation S304, refer to the description of operation S21 in the embodiment in FIG. 4A to FIG. 4C; for an embodiment of operation S305, refer to the description of operation S5 and operation S81 in the embodiment in FIG. 4A to FIG. 4C; for an embodiment of operation S306, refer to the description of operation S82 in the embodiment in FIG. 4A to FIG. 4C; for an embodiment of operation S307, refer to the description of operation S83 in the embodiment in FIG. 4A to FIG. 4C; for an embodiment of operation S308, refer to the description of operation S84 in the embodiment in FIG. 4A to FIG. 4C; for an embodiment of operation S309, refer to the description of operation S85 in the embodiment in FIG. 4A to FIG. 4C; for an embodiment of the first operation, refer to the description of the operation performed by the user on the icon of the application 1 in operation S1 in the embodiment in FIG. 4A to FIG. 4C; for the task list, refer to the description of the operation of the task list in operation S21 in the embodiment in FIG. 4A to FIG. 4C; for an embodiment of the first configuration item, refer to the descriptions of the identifier 1 and the identifier 2 in the embodiment in FIG. 4A to FIG. 4C; for an embodiment of the second entry activity, refer to the description of the specified entry activity 2 in the embodiment in FIG. 4A to FIG. 4C; for an embodiment of the third identifier and the fourth identifier, refer to the descriptions of the identifier 5 in the embodiment in FIG. 4A to FIG. 4C; and for an embodiment of the third task stack, refer to the description of the task stack 3 in the embodiment in FIG. 4A to FIG. 4C. Details are not described herein again.

In an embodiment of the application, the multi-instance feature of the second application can be triggered by the first application, and one instance of the second application is started each time by using the second entry activity specified by the second application, so that the electronic device implements two or more instances of the second application, thereby improving speed and efficiency of running a same application by the electronic device, maximizing continuation of an operating habit of a user on a PC, improving office efficiency and working efficiency of the user, and bringing experience closer to that on a desktop-level operating system to the user.

In some embodiments, the method includes: the first application sends the ninth message to the second application, where the ninth message carries the third identifier and a third window mode, and the third window mode is related to a type of the first operation; in response to receiving the ninth message, the second application sends the tenth message to the second software module, where the tenth message carries the identifier of the second entry activity, the fourth identifier, and the third window mode; in response to receiving the tenth message, the second software module establishes the third task stack based on the identifier of the second entry activity, the fourth identifier, and the third window mode; the second software module sends the eleventh message to the third software module, where the eleventh message carries the identifier of the second entry activity, the identifier of the third task stack, and the third window mode; and in response to receiving the eleventh message, the third software module starts the second entry activity in the third task stack based on the identifier of the second entry activity, the identifier of the third task stack, and the third window mode, where a page display manner of the second entry activity is related to the third window mode.

For an embodiment of the foregoing solution, refer to descriptions of operation S81 to operation S85 in the embodiment in FIG. 4A to FIG. 4C; and for an embodiment of the third window mode, refer to the description of the window mode 3 in the embodiment in FIG. 4A to FIG. 4C. Details are not described herein again.

Based on the descriptions of operation S101 to operation S108, operation S201 to operation S208, and operation S301 to operation S309, in some embodiments, when the type of the first operation is a tap operation, the window mode is a page in a window form; or when the type of the first operation is a drag operation, the window mode is a page displayed on a full screen or displayed on a split screen.

For a page displayed in a window form, refer to the foregoing descriptions of the window 202, the window 203, the window 204, and the window 205 in the embodiments in FIG. 3A to FIG. 3P; for a page displayed on a full screen, refer to the foregoing descriptions of the user interface 13 in the embodiments in FIG. 3A to FIG. 3P; and for a page displayed on a split screen, refer to the foregoing descriptions of the user interface 14*a* and the user interface 14*b* in the embodiments in FIG. 3A to FIG. 3P. Details are not described herein again.

Therefore, manners in which the electronic device displays the second instance of the second application vary with different types of the first operation. In this way, the electronic device may simultaneously display a plurality of windows of the second application on the display in a plurality of window combination forms, so that multi-instance coordination processing and operation may be performed on a same application in the plurality of windows, thereby improving speed and efficiency of running a same application by the electronic device, maximizing continuation of an operating habit of a user on a PC, improving office efficiency and working efficiency of the user, and bringing experience closer to that on a desktop-level operating system to the user.

Based on the descriptions of operation S101 to operation S108, operation S201 to operation S208, and operation S301 to operation S309, in some embodiments, when the first instance of the second application and the second instance of the second application are run in the electronic device, the method includes: the electronic device displays, in a first area of the display, a page corresponding to the first instance of the second application in a window form, and displays, in a second area of the display, a page corresponding to the second instance of the second application in a window form.

For the first area and the second area, refer to the descriptions of the area corresponding to the window 202 and the area corresponding to the window 203 in the embodiment in FIG. 3G; and for an embodiment of the window form, refer to the description of displaying the instance 1 of the email application by using the floating window 202 and displaying the instance 2 of the email application by using the floating window 203 in the embodiment in FIG. 3G. Details are not described herein again.

Based on the descriptions of operation S101 to operation S108, operation S201 to operation S208, and operation S301 to operation S309, in some embodiments, when the first instance of the second application and the second instance of the second application are run in the electronic device, the method includes: the electronic device displays a page corresponding to the first instance of the second application on a full screen, and displays, in a third area of the display, the page corresponding to the second instance of the second application in a window form.

For the third area, refer to the description of the area corresponding to the window 203 in the embodiment in FIG. 3H; for an embodiment of the window form, refer to the description of displaying the instance 2 of the email application in the floating window 203 in the embodiment in FIG. 3H; and for an embodiment of full-screen display, refer to the description of displaying the instance 1 of the email application in the area corresponding to the user interface 13 in the embodiment in FIG. 3H. Details are not described herein again.

Based on the descriptions of operation S101 to operation S108, operation S201 to operation S208, and operation S301 to operation S309, in some embodiments, when the first instance of the second application and the second instance of the second application are run in the electronic device, the method includes: the electronic device displays, in a fourth area of the display, a page corresponding to the first instance of the second application, and displays, in a fifth area of the display, a page corresponding to the second instance of the second application, where the fourth area and the fifth area do not overlap.

For the fourth area and the fifth area, refer to the descriptions of the area corresponding to the user interface 14a and the area corresponding to the user interface 14b in the embodiment in FIG. 3I; and for an embodiment of the foregoing solution, refer to the description of displaying the instance 1 of the email application in the area corresponding to the user interface 14a and displaying the instance 2 of the email application in the area corresponding to the user interface 14b in the embodiment in FIG. 3I. Details are not described herein again.

Based on the descriptions of operation S101 to operation S108, operation S201 to operation S208, and operation S301 to operation S309, in some embodiments, when the first instance of the second application and the second instance of the second application are run in the electronic device, the method includes: the electronic device displays, in a sixth area of the display, a page corresponding to the first instance of the second application, displays, in a seventh area of the display, a page corresponding to the second instance of the second application, and displays, in an eighth area of the display, a page corresponding to the third instance of the second application in a window form, where the sixth area and the seventh area do not overlap, the eighth area partially overlaps an area that is jointly formed by the sixth area and the seventh area, and the third instance of the second application are different from both the first instance of the second application and the second instance of the second application.

For the sixth area and the seventh area, refer to the descriptions of the area corresponding to the user interface 14a and the area corresponding to the user interface 14b in the embodiment in FIG. 3K; for the eighth area, refer to the description of the area corresponding to the window 204 in the embodiment in FIG. 3K; and for an embodiment of the foregoing solution, refer to the description of displaying the instance 1 of the email application in the area corresponding to the user interface 14a, displaying the instance 2 of the email application in the area corresponding to the user interface 14b, and displaying the instance 3 of the email application in the floating window in the area corresponding to the window 204 in the embodiment in FIG. 3K. Details are not described herein again.

Based on the descriptions of operation S101 to operation S108, operation S201 to operation S208, and operation S301 to operation S309, in some embodiments, when the first instance of the second application and the second instance of the second application are run in the electronic device, the method includes: the electronic device displays, in a ninth area of the display, a page corresponding to the first instance of the second application, displays, in a tenth area of the display, a page corresponding to a third application, and displays, in an eleventh area of the display, a page corresponding to the second instance of the second application in a window form, where the ninth area and the tenth area do not overlap, and the third application is different from both the first application and the second application.

For an embodiment of the third application, refer to the description of the computer application in the embodiment in FIG. 3P; for the ninth area and the tenth area, refer to the descriptions of the area corresponding to the user interface 15a and the area corresponding to the user interface 15b in the embodiment in FIG. 3P; for the eleventh area, refer to the description of the area corresponding to the window 205 in the embodiment in FIG. 3P; and for an embodiment of the foregoing solution, refer to the description of displaying the instance 1 of the email application in the area corresponding to the user interface 15a, displaying the computer application in the area corresponding to the user interface 15b, and displaying instance 4 of the email application in the floating window in the area corresponding to the window 205 in the embodiment in FIG. 3P. Details are not described herein again.

In this way, the electronic device may implement a plurality of instances of the second application in window combination forms such as "split screen+floating window", "full screen+floating window", "floating window+floating window", "left split screen+right split screen", and "left split screen+right split screen+floating window". This provides rich window forms for the user, and meets various use requirements of the user.

Based on the descriptions of operations S101 to S108, operation S201 to operation S208, and operation S301 to operation S309, in some embodiments, when the electronic device displays a page corresponding to the second instance of the second application in the window form, the page includes a first control and a second control, and the first control is different from the second control. The method further includes: when receiving a second operation performed on the first control, the electronic device displays, on a full screen in response to the second operation, the page corresponding to the second instance of the second application; and when receiving a third operation performed on the second control, the electronic device closes, in response to the third operation, the page corresponding to the second instance of the For an embodiment of the first control, refer to the foregoing descriptions of the maximization control 202a in the window 202, the maximization control 203a in the window 203, the maximization control 204a in the window 204, and the maximization control 205a in the window 205 in the embodiments in FIG. 3A to FIG. 3P; and for an embodiment of the second control, refer to the foregoing descriptions of the closing control 202c in the window 202, the closing control 203c in the window 203, the closing control 204c in the window 204, and the closing control 205c in the window 205 in the embodiments in FIG. 3A to FIG. 3P. Details are not described herein again.

Therefore, when a page corresponding to any instance of the second application is displayed in a floating manner, based on a user's intention, the electronic device can not only quickly close the page corresponding to the any instance of the second application, but also switch to a full screen to display the page corresponding to the any instance of the second application.

Based on the descriptions of operations S101 to S108, operation S201 to operation S208, and operation S301 to operation S309, in some embodiments, the first interface is located in a side area of the display. For an embodiment of the first interface, refer to the foregoing description of the window 201 in the embodiments in FIG. 3A to FIG. 3P. Details are not described herein again. In this way, the first application can be quickly started, and the electronic device can easily implement a new instance of the second application from the first interface of the first application, without blocking page content currently displayed by the electronic device.

Based on the descriptions of operation S101 to operation S108, operation S201 to operation S208, and operation S301 to operation S309, in some embodiments, the method further includes: when determining that the task corresponding to the first instance of the second application exists in the task list, and the first configuration item indicates that the second application does not support the multi-instance feature, the first application shields the first operation; or when determining that the task corresponding to the first instance of the second application exists in the task list, the first configuration item indicates that the second application supports the multi-instance feature, and the second application does not support starting of the multi-instance feature by using the main entry activity, the first application shields the first operation.

For an embodiment of the foregoing solution, refer to the description of operation S5 in the embodiment in FIG. 4A to FIG. 4C. Details are not described herein again.

Based on the descriptions of operation S101 to operation S108, operation S201 to operation S208, and operation S301 to operation S309, in some embodiments, the method further includes: the first application starts the second application when the task corresponding to the instance of the second application does not exist in the task list.

For an embodiment of the foregoing solution, refer to the description of operation S4 in the embodiment in FIG. 4A to FIG. 4C. Details are not described herein again.

Based on the descriptions of operation S101 to operation S108, operation S201 to operation S208, and operation S301 to operation S309, in some embodiments, the first application is a sidebar application Dock, the second application is any application program other than the sidebar application Dock, the first software module is a package manager, the second software module is an activity manager, the third software module is a multi-window task manager, the first mode is standard or singleTop, and the second mode is singleTask.

Based on the descriptions of operation S101 to operation S108, operation S201 to operation S208, and operation S301 to operation S309, in some embodiments, the first software module is further configured to send a twelfth message to the second application, where the twelfth message is used to request a configuration file of the second application; and the second application is further configured to: in response to receiving the twelfth message, send a thirteenth message to the first software module, where the thirteenth message carries the first configuration item of the second application and the starting mode of the main entry activity of the second application.

For an embodiment of the configuration file of the second application, refer to the foregoing configuration file AndroidManifest.xml. Details are not described herein again. In addition, the first software module includes but is not limited to obtaining the first configuration item of the second application and the starting mode of the main entry activity of the second application in the foregoing manner. For an embodiment, refer to the description in operation S3 in the embodiment in FIG. 4A to FIG. 4C. Details are not described herein again.

For example, an embodiment of this application provides an application starting apparatus, including: a display module, configured to display a first interface of a first application, where the first interface includes an icon of a second application, and the first application is different from the second application; the first application, configured to: in response to receiving a first operation performed on an icon of the second application, send a first message to a first software module, and send a second message to a second software module; the first software module, configured to: in response to receiving the first message, send a third message to the first application, where the third message carries a first configuration item of the second application and a starting mode of a main entry activity of the second application; the second software module, configured to: in response to receiving the second message, send a fourth message to the first application, where the fourth message carries a task list, and the task list is used to store a task corresponding to an application in the electronic device; the first application, configured to: when determining that a task corresponding to a first instance of the second application exists in the task list, the first configuration item indicates that the second application supports a multi-instance feature, the second application supports starting of the multi-instance feature by using the main entry activity, and a starting mode of the main entry activity is a first mode, send a fifth message to the second software module, where the fifth message carries an identifier of the main entry activity and a first identifier, and the first identifier is used to request to establish a first task stack; the second software module, further configured to: in response to receiving the fifth message, establish the first task stack based on the identifier of the main entry activity and the first identifier, where the first task stack is different from a task stack corresponding to the second application in the task list; the second software module, further configured to send a sixth message to a third software module, where the sixth message carries the identifier of the main entry activity and an identifier of the first task stack; and the third software module, further configured to: in response to receiving the sixth message, start the main entry activity in the first task stack based on the identifier of the main entry activity and the identifier of the first task stack, to run a second instance of the second application.

In some embodiments, the first application is configured to send the fifth message to the second software module, where the fifth message carries the identifier of the main entry activity, the first identifier, and a first window mode, and the first window mode is related to a type of the first operation; the second software module is configured to: in response to receiving the fifth message, establish the first task stack based on the identifier of the main entry activity, the first identifier, and the first window mode; the second software module is configured to send the sixth message to the third software module, where the sixth message carries the identifier of the main entry activity, the identifier of the first task stack, and the first window mode; and the third software module is configured to: in response to receiving the sixth message, start the main entry activity in the first task stack based on the identifier of the main entry activity, the identifier of the first task stack, and the first window mode, where a page display manner of the main entry activity is related to the first window mode.

In some embodiments, when the type of the first operation is a tap operation, the window mode is displaying a page in a window form; or when the type of the first operation is a drag operation, the window mode is displaying a page on a full screen or a split screen.

In some embodiments, when the first instance of the second application and the second instance of the second application are run in the electronic device, the display module is configured to: display, in a first area of a display, a page corresponding to the first instance of the second application in a window form, and display, in a second area of the display, a page corresponding to the second instance of the second application in a window form; or the display module is configured to: display, on a full screen, a page corresponding to the first instance of the second application, and display, in a third area of the display, a page corresponding to the second instance of the second application in a window form; or the display module is configured to: display, in a fourth area of the display, a page corresponding to the first instance of the second application, and display, in a fifth area of the display, a page corresponding to the second instance of the second application, where the fourth area and the fifth area do not overlap; or the display module is configured to: display, in a sixth area of the display, a page corresponding to the first instance of the second application, display, in a seventh area of the display, a page corresponding to the second instance of the second application, and display, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the display module is configured to: display, in a ninth area of the display, a page corresponding to the first instance of the second application, display, in a tenth area of the display, a page corresponding to a third application, and display, in an eleventh area of the display, a page corresponding to the second instance of the second application in a window form, where the ninth area and the tenth area do not overlap, and the third application is different from both the first application and the second application.

In some embodiments, when the display apparatus displays the page corresponding to the second instance of the second application in the window form, the page includes a first control and a second control, and the first control is different from the second control; the display apparatus is further configured to: when receiving a second operation performed on the first control, display, on a full screen in response to the second operation, the page corresponding to the second instance of the second application; and the display apparatus is further configured to: when receiving a third operation performed on the second control, close, in response to the third operation, the page corresponding to the second instance of the second application.

In some embodiments, the first interface is located in a side area of the display. The side area may be an area in which the window 201 in the embodiment in FIG. 3D is located, or may be another display area of the display of the electronic device, for example, an upper display area of the display of the electronic device, a lower display area of the display of the electronic device, or a left display area of the display of the electronic device.

In some embodiments, the first application is further configured to: when determining that the task corresponding to the first instance of the second application exists in the task list, and the first configuration item indicates that the second application does not support the multi-instance feature, shield the first operation; or the first application is further configured to: when determining that the task corresponding to the first instance of the second application exists in the task list, the first configuration item indicates that the second application supports the multi-instance feature, and the second application does not support starting of the multi-instance feature by using the main entry activity, shield the first operation.

In some embodiments, the first application is further configured to: when the task corresponding to the instance of the second application does not exist in the task list, start the second application.

In some embodiments, the first application is a sidebar application Dock, the second application is any application program other than the sidebar application Dock, the first software module is a package manager, the second software module is an activity manager, the third software module is a multi-window task manager, the first mode is standard or singleTop, and the second mode is singleTask.

In an embodiment, the first software module is further configured to send a twelfth message to the second application, where the twelfth message is used to request a configuration file of the second application; and the second application is further configured to: in response to receiving the twelfth message, send a thirteenth message to the first software module, where the thirteenth message carries the first configuration item of the second application and the starting mode of the main entry activity of the second application.

The application starting apparatus in an embodiment of the application may be configured to perform the technical solutions of the electronic device in the foregoing application starting method embodiments. Implementation principles and technical effects of the application starting apparatus are similar to those in the foregoing application starting method embodiments. For operations implemented by the modules, reference may further be made to related descriptions in the method embodiments, and details are not described herein again. The module herein may alternatively be replaced with a component or a circuit.

For example, an embodiment of this application provides an application starting apparatus, including: a display apparatus, configured to display a first interface of a first application, where the first interface includes an icon of a second application, and the first application is different from the second application; the first application, configured to: in response to receiving a first operation performed on an icon of the second application, send a first message to a first software module, and send a second message to a second software module; the first software module, configured to: in response to receiving the first message, send a third message to the first application, where the third message carries a first configuration item of the second application and a starting mode of a main entry activity of the second application; the second software module, configured to: in response to receiving the second message, send a fourth message to the first application, where the fourth message carries a task list, and the task list is used to store a task corresponding to an application in the electronic device; the first application, further configured to: when determining that a task corresponding to a first instance of the second application exists in the task list, the first configuration item indicates that the second application supports a multi-instance feature, the second application supports starting of the multi-instance feature by using the main entry activity, a starting mode of the main entry activity is a second mode, and the third message further carries an identifier of a first entry activity, send a seventh message to the second software module, where the seventh message carries the identifier of the first entry activity and a second identifier, the first mode is different from the second mode, the first entry activity is an entry activity other than the main entry activity, and the second identifier is used to request to establish a second task stack; the second software module, further configured to: in response to receiving the seventh message, establish the second task stack based on the identifier of the first entry activity and the second identifier, where the second task stack is different from a task stack corresponding to the second application in the task list; the second software module, further configured to send an eighth message to the third software module, where the eighth message carries the identifier of the first entry activity and an identifier of the second task stack; and the third software module, further configured to: in response to receiving the eighth message, start the first entry activity in the second task stack based on the identifier of the first entry activity and the identifier of the second task stack, to run a second instance of the second application.

In some embodiments, the first application is configured to send the seventh message to the second software module, where the seventh message carries the identifier of the first entry activity, the second identifier, and a second window mode, and the second window mode is related to a type of the first operation; the second software module is configured to: in response to receiving the seventh message, establish the second task stack based on the identifier of the first entry activity, the second identifier, and the second window mode; the second software module is configured to send the eighth message to the third software module, where the eighth message carries the identifier of the first ingress activity, an identifier of the second task stack, and the second window mode; and the third software module is configured to: in response to receiving the eighth message, start the first entry activity in the second task stack based on the identifier of the first entry activity, the identifier of the second task stack, and the second window mode, where a page display manner of the first entry activity is related to the second window mode.

In an embodiment, when the type of the first operation is a tap operation, the window mode is displaying a page in a window form; or when the type of the first operation is a drag operation, the window mode is displaying a page on a full screen or a split screen.

In some embodiments, when the first instance of the second application and the second instance of the second application are run in the electronic device, the display module is configured to: display, in a first area of a display, a page corresponding to the first instance of the second application in a window form, and display, in a second area of the display, a page corresponding to the second instance of the second application in a window form; or the display module is configured to: display, on a full screen, a page corresponding to the first instance of the second application, and display, in a third area of the display, a page corresponding to the second instance of the second application in a window form; or the display module is configured to: display, in a fourth area of the display, a page corresponding to the first instance of the second application, and display, in a fifth area of the display, a page corresponding to the second instance of the second application, where the fourth area and the fifth area do not overlap; or the display module is configured to: display, in a sixth area of the display, a page corresponding to the first instance of the second application, display, in a seventh area of the display, a page corresponding to the second instance of the second application, and display, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the display module is configured to: display, in a ninth area of the display, a page corresponding to the first instance of the second application, display, in a tenth area of the display, a page corresponding to a third application, and display, in an eleventh area of the display, a page corresponding to the second instance of the second application in a window form, where the ninth area and the tenth area do not overlap, and the third application is different from both the first application and the second application.

In some embodiments, when the display apparatus displays the page corresponding to the second instance of the second application in the window form, the page includes a first control and a second control, and the first control is different from the second control; the display apparatus is further configured to: when receiving a second operation performed on the first control, display, on a full screen in response to the second operation, the page corresponding to the second instance of the second application; and the display apparatus is further configured to: when receiving a third operation performed on the second control, close, in response to the third operation, the page corresponding to the second instance of the second application.

In some embodiments, the first interface is located in a side area of the display.

In some embodiments, the first application is further configured to: when determining that the task corresponding to the first instance of the second application exists in the task list, and the first configuration item indicates that the second application does not support the multi-instance feature, shield the first operation; or the first application is further configured to: when determining that the task corresponding to the first instance of the second application exists in the task list, the first configuration item indicates that the second application supports the multi-instance feature, and the second application does not support starting of the multi-instance feature by using the main entry activity, shield the first operation.

In some embodiments, the first application is further configured to: when the task corresponding to the instance of the second application does not exist in the task list, start the second application.

In some embodiments, the first application is a sidebar application Dock, the second application is any application program other than the sidebar application Dock, the first software module is a package manager, the second software module is an activity manager, the third software module is a multi-window task manager, the first mode is standard or singleTop, and the second mode is singleTask.

In an embodiment, the first software module is further configured to send a twelfth message to the second application, where the twelfth message is used to request a configuration file of the second application; and the second application is further configured to: in response to receiving the twelfth message, send a thirteenth message to the first software module, where the thirteenth message carries the first configuration item of the second application and the starting mode of the main entry activity of the second application.

The application starting apparatus in an embodiment of the application may be configured to perform the technical solutions of the electronic device in the foregoing application starting method embodiments. Implementation principles and technical effects of the application starting apparatus are similar to those in the foregoing application starting method embodiments. For operations implemented by the modules, reference may further be made to related descriptions in the method embodiments, and details are not described herein again. The module herein may alternatively be replaced with a component or a circuit.

For example, an embodiment of this application provides an application starting apparatus, including: a display apparatus, configured to display a first interface of a first application, where the first interface includes an icon of a second application, and the first application is different from the second application; the first application, configured to: in response to receiving a first operation performed on an icon of the second application, send a first message to a first software module, and send a second message to a second software module; the first software module, configured to: in response to receiving the first message, send a third message to the first application, where the third message carries a first configuration item of the second application and a starting mode of a main entry activity of the second application; the second software module, configured to: in response to receiving the second message, send a fourth message to the first application, where the fourth message carries a task list, and the task list is used to store a task corresponding to an application in the electronic device; the first application, further configured to: when determining that a task corresponding to a first instance of the second application exists in the task list, the first configuration item indicates that the second application supports the multi-instance feature, the second application supports starting of the multi-instance feature by using the main entry activity, a starting mode of the main entry activity is a second mode, and the third message does not carry an identifier of the first entry activity, send a ninth message to the second application, where the ninth message carries a third identifier, the first mode is different from the second mode, the first entry activity is an entry activity other than the main entry activity, and the third identifier is used to request the second application to start a new instance of the second application; the second application, configured to: in response to receiving the ninth message, send a tenth message to the second software module, where the tenth message carries an identifier of a second entry activity and a fourth identifier, the second entry activity is any entry activity, and the fourth identifier is used to request to establish a third task stack; the second software module, further configured to: in response to receiving the tenth message, establish the third task stack based on the identifier of the second entry activity and the fourth identifier, where the third task stack is different from a task stack corresponding to the second application in the task list; the second software module, further configured to send an eleventh message to the third software module, where the eleventh message carries the identifier of the second entry activity and an identifier of the third task stack; and the third software module, configured to: in response to receiving the eleventh message, start the second entry activity in the third task stack based on the identifier of the second entry activity and the identifier of the third task stack, to run a second instance of the second application.

In some embodiments, the first application is configured to send the ninth message to the second application, where the ninth message carries the third identifier and a third window mode, and the third window mode is related to a type of the first operation; the second application is configured to: in response to receiving the ninth message, send the tenth message to the second software module, where the tenth message carries the identifier of the second entry activity, the fourth identifier, and the third window mode; the second software module is configured to: in response to receiving the tenth message, establish the third task stack based on the identifier of the second entry activity, the fourth identifier, and the third window mode; the second software module is configured to send the eleventh message to the third software module, where the eleventh message carries the identifier of the second entry activity, the identifier of the third task stack, and the third window mode; and the third software module is configured to: in response to receiving the eleventh message, start the second entry activity in the third task stack based on the identifier of the second entry activity, the identifier of the third task stack, and the third window mode, where a page display manner of the second entry activity is related to the third window mode.

In some embodiments, when the type of the first operation is a tap operation, the window mode is displaying a page in a window form; or when the type of the first operation is a drag operation, the window mode is displaying a page on a full screen or a split screen.

In some embodiments, when the first instance of the second application and the second instance of the second application are run in the electronic device, the display module is configured to: display, in a first area of a display, a page corresponding to the first instance of the second application in a window form, and display, in a second area of the display, a page corresponding to the second instance of the second application in a window form; or the display module is configured to: display, on a full screen, a page corresponding to the first instance of the second application, and display, in a third area of the display, a page corresponding to the second instance of the second application in a window form; or the display module is configured to: display, in a fourth area of the display, a page corresponding to the first instance of the second application, and display, in a fifth area of the display, a page corresponding to the second instance of the second application, where the fourth area and the fifth area do not overlap; or the display module is configured to: display, in a sixth area of the display, a page corresponding to the first instance of the second application, display, in a seventh area of the display, a page corresponding to the second instance of the second application, and display, in an eighth area of the display, a page corresponding to the third instance of the second application in a window form, where the sixth area and the seventh area do not overlap, and the eighth area partially overlaps an area jointly formed by the sixth area and the seventh area, and the third instance of the second application is different from both the first instance of the second application and the second instance of the second application; or the display module is configured to: display, in a ninth area of the display, a page corresponding to the first instance of the second application, display, in a tenth area of the display, a page corresponding to a third application, and display, in an eleventh area of the display, a page corresponding to the second instance of the second application in a window form, where the ninth area and the tenth area do not overlap, and the third application is different from both the first application and the second application.

In some embodiments, when the display apparatus displays the page corresponding to the second instance of the second application in the window form, the page includes a first control and a second control, and the first control is different from the second control; the display apparatus is further configured to: when receiving a second operation performed on the first control, display, on a full screen in response to the second operation, the page corresponding to the second instance of the second application; and the display apparatus is further configured to: when receiving a third operation performed on the second control, close, in response to the third operation, the page corresponding to the second instance of the second application.

In some embodiments, the first interface is located in a side area of the display.

In some embodiments, the first application is further configured to: when determining that the task corresponding to the first instance of the second application exists in the task list, and the first configuration item indicates that the second application does not support the multi-instance feature, shield the first operation; or the first application is further configured to: when determining that the task corresponding to the first instance of the second application exists in the task list, the first configuration item indicates that the second application supports the multi-instance feature, and the second application does not support starting of the multi-instance feature by using the main entry activity, shield the first operation.

In some embodiments, the first application is further configured to: when the task corresponding to the instance of the second application does not exist in the task list, start the second application.

In some embodiments, the first application is a sidebar application Dock, the second application is any application program other than the sidebar application Dock, the first software module is a package manager, the second software module is an activity manager, the third software module is a multi-window task manager, the first mode is standard or singleTop, and the second mode is singleTask.

In an embodiment, the first software module is further configured to send a twelfth message to the second application, where the twelfth message is used to request a configuration file of the second application; and the second application is further configured to: in response to receiving the twelfth message, send a thirteenth message to the first software module, where the thirteenth message carries the first configuration item of the second application and the starting mode of the main entry activity of the second application.

The application starting apparatus in an embodiment of the application may be configured to perform the technical solutions of the electronic device in the foregoing application starting method embodiments. Implementation principles and technical effects of the application starting apparatus are similar to those in the foregoing application starting method embodiments. For operations implemented by the modules, reference may further be made to related descriptions in the method embodiments, and details are not described herein again. The module herein may alternatively be replaced with a component or a circuit.

For example, this application provides an electronic device, including a memory and a processor, where the memory is configured to store program instructions; and the processor is configured to invoke the program instructions in the memory, so that the electronic device performs the application starting methods in the foregoing embodiments.

For example, this application provides a chip system. The chip system is applied to an electronic device including a memory, a display, and a sensor. The chip system includes a processor. When the processor executes a computer instruction stored in the memory, the electronic device performs the application starting methods in the foregoing embodiment.

For example, this application provides a computer readable storage medium storing a computer program, where when the computer program is executed by a processor, an electronic device is enabled to implement the application starting method according to the foregoing embodiments.

For example, this application provides a computer program product, including an executable instruction, where the executable instruction is stored in a readable storage medium; at least one processor of the electronic device may read the executable instruction from the readable storage medium; and the at least one processor executes the executable instruction, so that the electronic device implements the application starting methods in the foregoing embodiments.

In the foregoing embodiments, all or some of the functions may be implemented by using software, hardware, or a combination of software and hardware. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

One of ordinary skilled in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

The invention claimed is:

1. A method applied to an electronic device, comprising:
   displaying, by the electronic device, a first interface of a first application, wherein the first interface comprises an icon of a second application, wherein the electronic device comprises the first application, the second application, a first software module, a second software module, and a third software module, and wherein the first application is different from the second application;
   in response to receiving a first operation performed on the icon of the second application, sending, by the first application, a first message to the first software module, and sending, by the first application, a second message to the second software module;

in response to receiving the first message, sending, by the first software module, a third message to the first application, wherein the third message carries a first configuration item of the second application and a starting mode of a main entry activity of the second application;

in response to receiving the second message, sending, by the second software module, a fourth message to the first application, wherein the fourth message carries a task list, and the task list is used to store a task corresponding to an application in the electronic device;

when determining that a task corresponding to a first instance of the second application exists in the task list, the first configuration item indicates that the second application supports a multi-instance feature, the second application supports starting of the multi-instance feature by using the main entry activity, and a starting mode of the main entry activity is a first mode, sending, by the first application, a fifth message to the second software module, wherein the fifth message carries an identifier of the main entry activity and a first identifier, and the first identifier is used to request to establish a first task stack;

in response to receiving the fifth message, establishing, by the second software module, the first task stack based on the identifier of the main entry activity and the first identifier, wherein the first task stack is different from a task stack corresponding to the second application in the task list;

sending, by the second software module, a sixth message to the third software module, wherein the sixth message carries the identifier of the main entry activity and an identifier of the first task stack; and in response to receiving the sixth message, starting, by the third software module, the main entry activity in the first task stack based on the identifier of the main entry activity and the identifier of the first task stack, to run a second instance of the second application.

2. The method according to claim 1, further comprising:
sending, by the first application, the fifth message to the second software module, wherein the fifth message carries the identifier of the main entry activity, the first identifier, and a first window mode, and wherein the first window mode is related to a type of the first operation;

in response to receiving the fifth message, establishing, by the second software module, the first task stack based on the identifier of the main entry activity, the first identifier, and the first window mode;

sending, by the second software module, the sixth message to the third software module, wherein the sixth message carries the identifier of the main entry activity, the identifier of the first task stack, and the first window mode; and in response to receiving the sixth message, starting, by the third software module, the main entry activity in the first task stack based on the identifier of the main entry activity, the identifier of the first task stack, and the first window mode, wherein a page display manner of the main entry activity is related to the first window mode.

3. The method according to claim 1, wherein
when the type of the first operation is a tap operation, the window mode displays a page in a window form; or
when the type of the first operation is a drag operation, the window mode displays a page on a full screen or a split screen.

4. The method according to claim 1, wherein when the first instance of the second application and the second instance of the second application are running in the electronic device, the method comprises:
displaying, by the electronic device in a first area of a display, a page corresponding to the first instance of the second application in a window form, and displaying, in a second area of the display, a page corresponding to the second instance of the second application in a window form; or displaying, by the electronic device on a full screen, a page corresponding to the first instance of the second application, and displaying, in a third area of the display, a page corresponding to the second instance of the second application in a window form; or displaying, by the electronic device in a fourth area of the display, a page corresponding to the first instance of the second application, and displaying, in a fifth area of the display, a page corresponding to the second instance of the second application, wherein the fourth area and the fifth area do not overlap; or displaying, by the electronic device in a sixth area of the display, a page corresponding to the first instance of the second application, displaying, in a seventh area of the display, a page corresponding to the second instance of the second application, and displaying, in an eighth area of the display, a page corresponding to the third instance of the second application in a window form, wherein the sixth area and the seventh area do not overlap, wherein the eighth area partially overlaps an area jointly formed by the sixth area and the seventh area, and wherein the third instance of the second application is different from both the first instance of the second application and the second instance of the second application; or displaying, by the electronic device in a ninth area of the display, a page corresponding to the first instance of the second application, displaying, in a tenth area of the display, a page corresponding to a third application, and displaying, in an eleventh area of the display, a page corresponding to the second instance of the second application in a window form, wherein the ninth area and the tenth area do not overlap, and wherein the third application is different from both the first application and the second application.

5. The method according to claim 1, wherein when the electronic device displays the page corresponding to the second instance of the second application in the window form, the page comprises a first control and a second control, and wherein the first control is different from the second control; and wherein
the method further comprises:
when receiving a second operation performed on the first control, displaying, by the electronic device on a full screen in response to the second operation, the page corresponding to the second instance of the second application; and
when receiving a third operation performed on the second control, closing, by the electronic device in response to the third operation, the page corresponding to the second instance of the second application.

6. The method according to claim 1, wherein the first interface is located in a side area of the display.

7. The method according to claim 1, further comprising:
when determining that the task corresponding to the first instance of the second application exists in the task list, and the first configuration item indicates that the second application does not support the multi-instance feature, shielding, by the first application, the first operation; or when determining that the task corresponding to the first instance of the second application exists in the task list, the first configuration item indicates that the second application supports the multi-instance feature, and the second application does not support starting of the multi-instance feature by using the main entry activity, shielding, by the first application, the first operation.

8. The method according to claim 1, further comprising: when the task corresponding to the instance of the second application does not exist in the task list, starting, by the first application, the second application.

9. The method according to claim 1, wherein the first application is a sidebar application Dock, the second application is any application other than the sidebar application Dock, the first software module is a package manager, the second software module is an activity manager, the third software module is a multi-window task manager, the first mode is standard or singleTop, and a second mode is singleTask.

10. The method according to claim 1, further comprising: sending, by the first software module, a twelfth message to the second application, wherein the twelfth message is used to request a configuration file of the second application; and in response to receiving the twelfth message, sending, by the second application, a thirteenth message to the first software module, wherein the thirteenth message carries the first configuration item of the second application and the starting mode of the main entry activity of the second application.

11. A method applied to an electronic device comprising: displaying, by the electronic device, a first interface of a first application, wherein the first interface comprises an icon of a second application, wherein the electronic device comprises the first application, the second application, a first software module, a second software module, and a third software module, and wherein the first application is different from the second application;

in response to receiving a first operation performed on the icon of the second application, sending, by the first application, a first message to the first software module, and sending, by the first application, a second message to the second software module;

in response to receiving the first message, sending, by the first software module, a third message to the first application, wherein the third message carries a first configuration item of the second application and a starting mode of a main entry activity of the second application;

in response to receiving the second message, sending, by the second software module, a fourth message to the first application, wherein the fourth message carries a task list, and the task list is used to store a task corresponding to an application in the electronic device;

when determining that a task corresponding to a first instance of the second application exists in the task list, the first configuration item indicates that the second application supports a multi-instance feature, the second application supports starting of the multi-instance feature by using the main entry activity, a starting mode of the main entry activity is a second mode, and the third message further carries an identifier of a first entry activity, sending, by the first application, a seventh message to the second software module, wherein the seventh message carries the identifier of the first entry activity and a second identifier, the first mode is different from the second mode, the first entry activity is an entry activity other than the main entry activity, and the second identifier is used to request to establish a second task stack;

in response to receiving the seventh message, establishing, by the second software module, the second task stack based on the identifier of the first entry activity and the second identifier, wherein the second task stack is different from a task stack corresponding to the second application in the task list;

sending, by the second software module, an eighth message to the third software module, wherein the eighth message carries the identifier of the first entry activity and an identifier of the second task stack; and in response to receiving the eighth message, starting, by the third software module, the first entry activity in the second task stack based on the identifier of the first entry activity and the identifier of the second task stack, to run a second instance of the second application.

12. The method according to claim 11, further comprising:

sending, by the first application, the seventh message to the second software module, wherein the seventh message carries the identifier of the first entry activity, the second identifier, and a second window mode, and wherein the second window mode is related to a type of the first operation;

in response to receiving the seventh message, establishing, by the second software module, the second task stack based on the identifier of the first entry activity, the second identifier, and the second window mode;

sending, by the second software module, the eighth message to the third software module, wherein the eighth message carries the identifier of the first ingress activity, an identifier of the second task stack, and the second window mode; and in response to receiving the eighth message, starting, by the third software module, the first entry activity in the second task stack based on the identifier of the first entry activity, the identifier of the second task stack, and the second window mode, wherein a page display manner of the first entry activity is related to the second window mode.

13. An electronic device, comprising:
a first application,
a second application,
a first software module,
a second software module,
a third software module, wherein the first application is different from the second application,
a processor, and
a memory coupled to the processor to store instructions, which when executed by the processor, cause the device to perform operations, the operations comprising:
displaying a first interface of the first application, wherein the first interface comprises an icon of the second application;

in response to receiving a first operation performed on the icon of the second application, the first application sending a first message to the first software module, and the first application sending a second message to the second software module;

in response to receiving the first message, the first software module sending a third message to the first application, wherein the third message carries a first configuration item of the second application and a starting mode of a main entry activity of the second application;

in response to receiving the second message, the second software module sending a fourth message to the first application, wherein the fourth message carries a task list, and the task list is used to store a task corresponding to an application in the electronic device;

when determining that a task corresponding to a first instance of the second application exists in the task list, the first configuration item indicates that the second application supports a multi-instance feature, the second application supports starting of the multi-instance feature by using the main entry activity, and a starting mode of the main entry activity is a first mode, sending, by the first application, a fifth message to the second software module, wherein the fifth message carries an identifier of the main entry activity and a first identifier, and the first identifier is used to request to establish a first task stack;

in response to receiving the fifth message, the second software module establishing the first task stack based on the identifier of the main entry activity and the first identifier, wherein the first task stack is different from a task stack corresponding to the second application in the task list;

the second software module sending a sixth message to the third software module, wherein the sixth message carries the identifier of the main entry activity and an identifier of the first task stack; and in response to receiving the sixth message, the third software module starting the main entry activity in the first task stack based on the identifier of the main entry activity and the identifier of the first task stack, to run a second instance of the second application.

14. The device according to claim 13, the operations further comprising:
the first application sending the fifth message to the second software module, wherein the fifth message carries the identifier of the main entry activity, the first identifier, and a first window mode, and wherein the first window mode is related to a type of the first operation;
in response to receiving the fifth message, the second software module establishing the first task stack based on the identifier of the main entry activity, the first identifier, and the first window mode;
the second software module sending the sixth message to the third software module, wherein the sixth message carries the identifier of the main entry activity, the identifier of the first task stack, and the first window mode; and
in response to receiving the sixth message, the third software module starting the main entry activity in the first task stack based on the identifier of the main entry activity, the identifier of the first task stack, and the first window mode, wherein a page display manner of the main entry activity is related to the first window mode.

15. The device according to claim 13, wherein
when the type of the first operation is a tap operation, the window mode displays a page in a window form; or
when the type of the first operation is a drag operation, the window mode displays a page on a full screen or a split screen.

16. The device according to claim 13, wherein when the first instance of the second application and the second instance of the second application are running in the electronic device, and the processor configured to execute the instructions to cause the device to perform:
displaying, in a first area of a display, a page corresponding to the first instance of the second application in a window form, and displaying, in a second area of the display, a page corresponding to the second instance of the second application in a window form; or
displaying, on a full screen, a page corresponding to the first instance of the second application, and displaying, in a third area of the display, a page corresponding to the second instance of the second application in a window form; or
displaying, in a fourth area of the display, a page corresponding to the first instance of the second application, and displaying, in a fifth area of the display, a page corresponding to the second instance of the second application, wherein the fourth area and the fifth area do not overlap; or
displaying, in a sixth area of the display, a page corresponding to the first instance of the second application, displaying, in a seventh area of the display, a page corresponding to the second instance of the second application, and displaying, in an eighth area of the display, a page corresponding to the third instance of the second application in a window form, wherein the sixth area and the seventh area do not overlap, wherein the eighth area partially overlaps an area jointly formed by the sixth area and the seventh area, and wherein the third instance of the second application is different from both the first instance of the second application and the second instance of the second application; or
displaying, in a ninth area of the display, a page corresponding to the first instance of the second application, displaying, in a tenth area of the display, a page corresponding to a third application, and displaying, in an eleventh area of the display, a page corresponding to the second instance of the second application in a window form, wherein the ninth area and the tenth area do not overlap, and wherein the third application is different from both the first application and the second application.

17. The device according to claim 13, wherein when the electronic device displays the page corresponding to the second instance of the second application in the window form, the page comprises a first control and a second control, and wherein the first control is different from the second control; and wherein
the operations further comprise:
when receiving a second operation performed on the first control, displaying, on a full screen in response to the second operation, the page corresponding to the second instance of the second application; and
when receiving a third operation performed on the second control, closing, in response to the third operation, the page corresponding to the second instance of the second application.

18. The device according to claim 13, wherein the first interface is located in a side area of the display.

19. The device according to claim 13, the operations further comprising:
when determining that the task corresponding to the first instance of the second application exists in the task list, and the first configuration item indicates that the second application does not support the multi-instance feature, the first application shielding the first operation; or when determining that the task corresponding to the first instance of the second application exists in the task list, the first configuration item indicates that the second application supports the multi-instance feature, and the second application does not support starting of the multi-instance feature by using the main entry activity, the first application shielding the first operation.

20. The device according to claim 13, the operations further comprising:

when the task corresponding to the instance of the second application does not exist in the task list, the first application starting the second application.

* * * * *